US007253216B2

(12) United States Patent
Miyabayashi

(10) Patent No.: US 7,253,216 B2
(45) Date of Patent: Aug. 7, 2007

(54) MICROENCAPSULATED PIGMENT, PRODUCTION PROCESS THEREFOR, AND AQUEOUS DISPERSION AND INK JET RECORDING INK USING THE PIGMENT

(75) Inventor: Toshiyuki Miyabayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 315 days.

(21) Appl. No.: 10/675,865

(22) Filed: Sep. 30, 2003

(65) Prior Publication Data

US 2004/0229974 A1 Nov. 18, 2004

(30) Foreign Application Priority Data

Sep. 30, 2002 (JP) ............. P.2002-287246
Apr. 15, 2003 (JP) ............. P.2003-110787
Aug. 29, 2003 (JP) ............. P.2003-307852
Sep. 26, 2003 (JP) ............. P.2003-335316

(51) Int. Cl.
*C08K 9/10* (2006.01)
*C09D 11/10* (2006.01)

(52) U.S. Cl. .............. 523/205; 523/160; 523/200
(58) Field of Classification Search ........... 523/160, 523/161
See application file for complete search history.

(56) References Cited

U.S. PATENT DOCUMENTS

| 5,415,964 | A * | 5/1995 | Hayashi et al. ........ 430/137.17 |
| 6,271,285 | B1 * | 8/2001 | Miyabayashi et al. ...... 523/160 |
| 6,511,534 | B1 * | 1/2003 | Mishina et al. .......... 106/31.33 |
| 6,602,333 | B2 * | 8/2003 | Miyabayashi ............ 106/31.27 |
| 6,864,302 | B2 * | 3/2005 | Miyabayashi ............... 523/160 |
| 6,866,707 | B2 * | 3/2005 | Kato .......................... 106/31.6 |
| 7,008,977 | B2 * | 3/2006 | Sakai et al. ................. 523/200 |
| 7,030,174 | B2 * | 4/2006 | Yatake ........................ 523/160 |
| 2003/0106462 | A1 * | 6/2003 | Yatake et al. ............. 106/31.59 |
| 2003/0195274 | A1 * | 10/2003 | Nakamura et al. .......... 523/160 |
| 2004/0157956 | A1 * | 8/2004 | Vincent et al. ............. 523/160 |

FOREIGN PATENT DOCUMENTS

| JP | 3-157464 | 7/1991 |
| JP | 5-320276 | 12/1993 |
| JP | 5-339516 | 12/1993 |
| JP | 7-94634 | 10/1995 |
| JP | 8-59715 | 3/1996 |
| JP | 8-81647 | 3/1996 |
| JP | 8-183920 | 7/1996 |
| JP | 8-218015 | 8/1996 |
| JP | 8-295837 | 11/1996 |
| JP | 8-302227 | 11/1996 |
| JP | 8-302228 | 11/1996 |
| JP | 9-3376 | 1/1997 |
| JP | 9-31360 | 2/1997 |
| JP | 9-104834 | 4/1997 |
| JP | 9-151342 | 6/1997 |
| JP | 9-217019 | 8/1997 |
| JP | 9-286939 | 11/1997 |
| JP | 9-316353 | 12/1997 |
| JP | 10-046073 | * 2/1998 |
| JP | 10-46075 | 2/1998 |
| JP | 10-110129 | 4/1998 |
| JP | 10-140065 | 5/1998 |
| JP | 10-292143 | 11/1998 |
| JP | 10-316909 | 12/1998 |
| JP | 11-49974 | 2/1999 |
| JP | 11-80633 | 3/1999 |
| JP | 11-152424 | 6/1999 |
| JP | 11-166145 | 6/1999 |
| JP | 11-199783 | 7/1999 |
| JP | 11-209672 | 8/1999 |
| JP | 11-349870 | 12/1999 |
| JP | 2000-7961 | 1/2000 |
| JP | 2000-44852 | 2/2000 |
| JP | 2000-53897 | 2/2000 |
| JP | 2000-53898 | 2/2000 |
| JP | 2000-53899 | 2/2000 |
| JP | 2000-53900 | 2/2000 |
| JP | 2002-226741 | 8/2002 |
| WO | WO 01/96483 A1 | * 12/2001 |

OTHER PUBLICATIONS

Machine Translation of JP 10-046073 (1998).*
English language translation of JP 2002-226741, Aug. 14, 2002.
English language translation of JP 3-157464, Jul. 5, 1991.
English language translation of JP 10-110129, Apr. 28, 1998.
English language translation of JP 7-94634, Oct. 11, 1995.
English language translation of JP 11-49974, Feb. 23, 1999.
English language translation of JP 8-59715, Mar. 5, 1996.
English language translation of JP 8-302228, Nov. 19, 1996.
English language translation of JP 8-81647, Mar. 26, 1996.
English language translation of JP 5-320276, Dec. 3, 1993.
English language translation of JP 8-218015, Aug. 27, 1996.
English language translation of JP 8-295837, Nov. 12, 1996.

(Continued)

*Primary Examiner*—Callie Shosho
(74) *Attorney, Agent, or Firm*—Ladas and Parry LLP

(57) ABSTRACT

The present invention provides a microencapsulated pigment, wherein pigment particles having an anionic group on the surface are coated with a polymer comprising a repeating structural unit derived from a cationically polymerizable surface active agent and a repeating structural unit derived from an anionically polymerizable surface active agent and/or a hydrophilic monomer having an anionic group; and a process for producing a microencapsulated pigment, wherein the cationically polymerizable surface active agent is added to and mixed with an aqueous dispersion of the pigment particles having an anionic group on the surface, the anionically polymerizable surface active agent and/or the hydrophilic monomer having an anionic group are added thereto and the mixture was emulsified, followed by adding a polymerization initiator and carrying out emulsion polymerization. In addition, an ink jet recording ink comprising at least the above microencapsulated pigment and water.

31 Claims, 4 Drawing Sheets

OTHER PUBLICATIONS

English language translation of JP 9-3376, Jan. 7, 1997.
English language translation of JP 8-183920, Jul. 16, 1996.
English language translation of JP 10-46075, Feb. 17, 1998.
English language translation of JP 10-292143, Nov. 4, 1998.
English language translation of JP 11-80633, Mar. 26, 1999.
English language translation of JP 11-349870, Dec. 21, 1999.
English language translation of JP 2000-7961, Jan. 11, 2000.
English language translation of JP 9-31360, Feb. 4, 1997.
English language translation of JP 9-217019, Aug. 19, 1997.
English language translation of JP 9-316353, Dec. 9, 1997.
English language translation of JP 9-104834, Apr. 22, 1997.
English language translation of JP 9-151342, Jun. 10, 1997.
English language translation of JP 10-140065, May 26, 1998.
English language translation of JP 11-152424, Jun. 8, 1999.
English language translation of JP 11-199783, Jul. 27, 1999.
English language translation of JP 11-209672, Aug. 3, 1999.
English language translation of JP 9-286939, Nov. 4, 1997.
English language translation of JP 2000-44852, Feb. 15, 2000.
English language translation of JP 2000-53897, Feb. 22, 2000.
English language translation of JP 2000-53898, Feb. 22, 2000.
English language translation of JP 2000-53899, Feb. 22, 2000.
English language translation of JP 2000-53900, Feb. 22, 2000.
English language translation of JP 5-339516, Dec. 21, 1993.
English language translation of JP 11-166145, Jun. 22, 1999.
English language translation of JP 8-302227, Nov. 19, 1996.
English language translation of JP 10-316909, Dec. 2, 1998.

* cited by examiner

MICROENCAPSULATED PIGMENT, PRODUCTION PROCESS THEREFOR, AND AQUEOUS DISPERSION AND INK JET RECORDING INK USING THE PIGMENT

FIELD OF THE INVENTION

The present invention relates to a microencapsulated pigment, a production process therefor, an aqueous dispersion, and an ink jet recording ink.

BACKGROUND OF THE INVENTION

Ink jet recording is an image recording technique comprising ejecting ink droplets from fine nozzle heads to form letters or figures on the surface of a recording medium such as paper. Ink jet recording technologies that have been practically used include a method of recording letters or figures on the surface of a recording medium wherein electrical signals are converted to mechanical signals by using a piezoelectric actuator to discontinuously eject ink droplets stored in the nozzle head and a method of recording letters or figures on the surface of a recording medium wherein part of ink is rapidly heated to generate a bubble near the ejecting part of a nozzle head to discontinuously eject ink droplets by the volume expansion of the bubble.

Aqueous pigment inks having a pigment dispersed in water have recently been provided as ink jet recording inks. This is because inks using pigments have characteristics of excellent water resistance and light resistance as compared with inks using water-soluble dyes. It is generally practiced that such aqueous pigment ink is prepared by dispersing a pigment in an aqueous medium with the aid of a dispersant such as a surface active agent or a polymeric dispersant.

For example, in Patent Document 1, in a pigment ink using an acetylene glycol-based penetrant, it is investigated to secure the dispersion stability of the ink by using a polymeric dispersant as a dispersant for pigment particles and using water, a non-volatile organic solvent, or a lower alcohol as an aqueous medium. However, use of a dispersant for dispersing pigment particles leads to an increased number of elements involved in ink preparation, which makes it difficult to control ink physical properties such as viscosity within desired ranges. Besides this, the pigment ink still has the problem that a sufficient print density is hard to obtain.

Furthermore, in the aqueous pigment ink, a dispersant is merely adsorbed on the surface of pigment particles. Since a strong shear force is applied to the ink fluid when it is ejected through a fine nozzle of a nozzle head, the dispersant may come off the surface of pigment particles to deteriorate its dispersing capability, which may result in a tendency of instable ink ejection. A tendency of instable dispersibility may also be observed when the aqueous pigment ink is stored for a long period of time.

A technology of introducing a sulfonic acid group on the surface of pigment particles has been proposed as a technique for dispersing the pigment particles in water. For example, Patent Document 2 discloses a pigment ink containing a surface-sulfonated organic pigment which is obtained by treating an organic pigment dispersed in a solvent having no active protons with a sulfonating agent (conventional art 1). According to the conventional art 1, the pigment ink has excellent dispersion stability and exhibits satisfactory ejection stability from the nozzle of a recording head (the property of being stably ejected from the recording head in a fixed direction).

Moreover, Patent Document 3 describes that an organic pigment mass whose surface is positively charged is prepared by treating a sulfonated organic pigment mass with a monovalent metallic ion and further describes an aqueous ink composition containing a pigment prepared from the positively surface-charged organic pigment mass, a dispersant, and water and having a high storage stability (dispersion stability) (conventional art 2).

Although the ink using the surface-treated pigment particles of the above conventional arts 1 or 2 as a colorant is excellent in dispersion stability and ejection stability as compared with conventional pigment-based ink jet recording inks, the images obtained by printing it on recording media such as plain paper or inkjet recording media (recording media having an ink receiving layer designed for receiving an ink jet recording ink) have still insufficient abrasion resistance. This seems to be due to insufficient fixability of the surface-treated pigment particles on the recording media.

On the other hand, a technology of employing a microencapsulated pigment wherein colorant particles are encapsulated with a polymer is known for the purpose of improving fixability of pigments containing in a pigment-based ink jet ink on a recording medium.

Patent Documents 4 and 5 propose encapsulated pigment particles and Patent Documents 6 to 9 propose pigment particles whose surface is grafted with a polymer. Patent Document 10 proposes a method of microencapsulating a hydrophobic powder with an amphiphilic graft polymer, which has turned out to involve the problem that use of the previously polymerized polymer results in too large particle diameter after encapsulation.

In addition to the above proposals, Patent Documents 11 to 19 disclose inks using pigments coated with a resin capable of forming film at room temperature by phase inversion emulsification. Patent Documents 20 to 29 propose inks using pigments coated with an anionic group-containing organic polymer by acid precipitation.

Furthermore, Patent Documents 30 to 35 propose inks using a polymer emulsion having polymer fine particles impregnated with a colorant by phase inversion emulsification (conventional art 3). However, even using the colorant obtained by phase inversion emulsification or acid precipitation, the polymer adsorbed on the pigment particles may sometimes separate and dissolve in the ink, resulting in insufficient performance in terms of dispersion stability, ejection stability, image quality, and the like of the ink, depending on the kind of organic solvents such as a penetrant to be used in the ink. Because the ink according to the conventional art 3 not a little suffers from separation of the adsorbed polymer from pigment particles, the pigment content in the ink is limited in view of dispersion stability. As a result, the ink only provides recorded matters with low print densities and, when plain paper is used as a recording medium, there arise problems that blurring of an image tends to occur and color developability is also low.

Patent Document 1: JP 03-157464 A
Patent Document 2: JP 10-110129 A
Patent Document 3: JP 11-409974 A
Patent Document 4: JP 07-094634 B
Patent Document 5: JP 08-059715 A
Patent Document 6: JP 05-339516 A
Patent Document 7: JP 08-302227 A
Patent Document 8: JP 08-302228 A
Patent Document 9: JP 08-081647 A
Patent Document 10: JP 05-320276 A
Patent Document 11: JP 08-218015 A
Patent Document 12: JP 08-295837 A Patent Document 13: JP 09-003376 A
Patent Document 14: JP 08-183920 A
Patent Document 15: JP 10-046075 A
Patent Document 16: JP 10-292143 A
Patent Document 17: JP 11-080633 A
Patent Document 18: JP 11-349870 A
Patent Document 19: JP 2000-007961 A
Patent Document 20: JP 09-031360 A
Patent Document 21: JP 09-217019 A
Patent Document 22: JP 09-316353 A
Patent Document 23: JP 09-104834 A
Patent Document 24: JP 09-151342 A
Patent Document 25: JP 10-140065 A
Patent Document 26: JP 11-152424 A
Patent Document 27: JP 11-166145 A
Patent Document 28: JP 11-199783 A
Patent Document 29: JP 11-209672 A
Patent Document 30: JP 09-286939 A
Patent Document 31: JP 2000-44852 A
Patent Document 32: JP 2000-53897 A
Patent Document 33: JP 2000-53898 A
Patent Document 34: JP 2000-53899 A
Patent Document 35: JP 2000-53900 A

SUMMARY OF THE INVENTION

The invention is achieved in consideration of the above problems and an object of the present invention is to provide a microencapsulated pigment capable of providing an ink jet recording ink satisfying all the requirements (1) to (6):
(1) being excellent dispersion stability,
(2) being excellent ejection stability from a recording head,
(3) being capable of obtaining recorded matters excellent in fastness of images,
(4) being capable of obtaining recorded matters with high print density of images,
(5) being capable of obtaining recorded matters excellent in abrasion resistance of images, and
(6) being capable of obtaining recorded matters with images which hardly blur and show high color developability even when plain paper is used as a recording medium;
and also provides a process for producing the microencapsulated pigment; and an aqueous dispersion.

Another object of the present invention is to provide an ink jet recording ink which satisfies all the above requirements (1) to (6).

Other objects and effects of the present invention will become apparent from the following description.

As a result of extensive investigations, the present inventors have surprisingly found that an ink jet recording ink satisfying all the above requirements (1) to (6) can be obtained by preparing a specific microencapsulated pigment and using the microencapsulated pigment as a colorant. The present invention has been accomplished based on this finding. Namely, the technical constitutions of the invention are as follows:

1) A microencapsulated pigment comprising pigment particles having an anionic group on the surface thereof and being coated with a polymer, the polymer comprising a repeating structural unit derived from a cationically polymerizable surface active agent having a cationic group, a hydrophobic group and a polymerizable group and a repeating structural unit derived from an anionically polymerizable surface active agent having an anionic group, a hydrophobic group and a polymerizable group and/or a hydrophilic monomer having an anionic group.

2) A microencapsulated pigment comprising pigment particles having an anionic group on the surface thereof and being coated with a polymer by polymerizing a cationically polymerizable surface active agent having a cationic group, a hydrophobic group and a polymerizable group with an anionically polymerizable surface active agent having an anionic group, a hydrophobic group and a polymerizable group and/or a hydrophilic monomer having an anionic group in an aqueous dispersion in which the pigment particles are dispersed.

3) The microencapsulated pigment as described in the above 1) or 2), wherein the polymer further comprises a repeating structural unit derived from a hydrophobic monomer.

4) The microencapsulated pigment as described in any one of the above 1) to 3), wherein the polymer further comprises a repeating structural unit derived from a crosslinkable monomer and/or a repeating structural unit derived from a monomer represented by the following general formula (1):

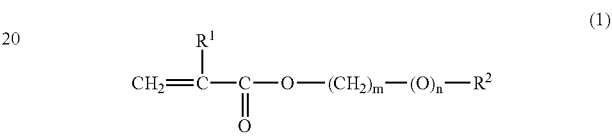

(1)

wherein $R^1$ represents a hydrogen atom or a methyl group, $R^2$ represents a t-butyl group, an alicyclic hydrocarbon group, an aromatic hydrocarbon group, or a heterocyclic group, m represents an integer of 0 to 3, and n represents an integer of 0 or 1.

5) The microencapsulated pigment as described in any one of the above 1) to 4), wherein the pigment constituting the pigment particles is carbon black or an organic pigment.

6) The microencapsulated pigment as described in any one of the above 1) to 5), wherein the anionic group of the pigment particles is a sulfonic acid anion group ($-SO_3^-$) and/or a sulfinic acid anion group ($-RSO_2^-$: R represents a $C_1$-$C_{12}$ alkyl group or a phenyl group and a modified group thereof).

7) The microencapsulated pigment as described in any one of the above 1) to 5), wherein the anionic group of the pigment particles is a carboxylic acid anion group ($-COO^-$).

8) The microencapsulated pigment as described in the above 1) or 2), wherein the cationic group of the cationically polymerizable surface active agent is selected from the group consisting of a primary amine cation, a secondary amine cation, a tertiary amine cation, and a quaternary ammonium cation.

9) The microencapsulated pigment as described in the above 1) or 2), wherein the hydrophobic group of the cationically polymerizable surface active agent is selected from the group consisting of an alkyl group, an aryl group, and a combined group thereof.

10) The microencapsulated pigment as described in the above 1) or 2), wherein the polymerizable group of the cationically polymerizable surface active agent is a radically polymerizable unsaturated hydrocarbon group and is selected from the group consisting of a vinyl group, an allyl group, an acryloyl group, a methacryloyl group, a propenyl group, a vinylidene group, and a vinylene group.

11) A process for producing a microencapsulated pigment by coating pigment particles having an anionic group on the surface thereof with a polymer, which comprises:
adding the cationically polymerizable surface active agent to an aqueous dispersion of the pigment particles having an anionic group on the surface thereof, followed by mixing;

adding thereto the anionically polymerizable surface active agent and/or the hydrophilic monomer having an anionic group to emulsify the mixture; and then adding thereto a polymerization initiator to carry out emulsion polymerization.

12) A process for producing a microencapsulated pigment by coating pigment particles having an anionic group on the surface thereof with a polymer, which comprises:

adding the cationically polymerizable surface active agent to an aqueous dispersion of the pigment particles having an anionic group on the surface thereof, followed by mixing;

adding thereto a hydrophobic monomer, followed by mixing;

further adding thereto an anionically polymerizable surface active agent and/or the hydrophilic monomer having an anionic group to emulsify the mixture; and then adding thereto a polymerization initiator to carry out emulsion polymerization.

13) The process for producing a microencapsulated pigment as described in the above 12), comprising:

a step of adding a cationically polymerizable surface active agent having a cationic group, a hydrophobic group and a polymerizable group to an aqueous dispersion of the pigment particles having an anionic group on the surface thereof, followed by mixing and treatment by irradiation with an ultrasonic wave;

a step of adding a hydrophobic monomer, followed by mixing;

a step of adding an anionically polymerizable surface active agent having an anionic group, a hydrophobic group and a polymerizable group and/or the hydrophilic monomer having an anionic group, followed by mixing and treatment by irradiation with an ultrasonic wave; and a step of adding a polymerization initiator to carry out emulsion polymerization, wherein the process is carried out in the above order of the steps.

14) The process for producing a microencapsulated pigment as described in the above 12), comprising:

a step of adding a cationically polymerizable surface active agent having a cationic group, a hydrophobic group and a polymerizable group to an aqueous dispersion of the pigment particles having an anionic group on the surface thereof, followed by mixing and treatment by irradiation with an ultrasonic wave;

a step of adding a hydrophobic monomer and a crosslinkable monomer and/or a monomer represented by general formula (1) shown below, followed by mixing;

a step of adding an anionically polymerizable surface active agent having an anionic group, a hydrophobic group and a polymerizable group and/or the hydrophilic monomer having an anionic group, followed by mixing and treatment by irradiation with an ultrasonic wave; and a step of adding a polymerization initiator to carry out emulsion polymerization, wherein the process is carried out in the above order of the steps:

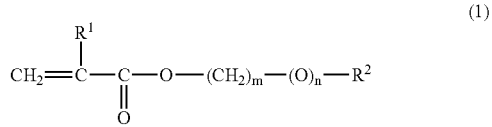

(1)

wherein $R^1$ represents a hydrogen atom or a methyl group, $R^2$ represents a t-butyl group, an alicyclic hydrocarbon group, an aromatic hydrocarbon group, or a heterocyclic group, m represents an integer of 0 to 3, and n represents an integer of 0 or 1.

15) The process for producing a microencapsulated pigment as described in any one of the above 11) to 14), wherein the pigment constituting the pigment particles is carbon lack or an organic pigment.

16) An aqueous dispersion containing a microencapsulated pigment as described in any one of the above 1) to 10).

17) An ink jet recording ink comprising an aqueous dispersion as described in the above 16).

18) The ink jet recording ink as described in the above 17), which is produced by purification treatment of the aqueous dispersion, wherein the concentration of unreacted anionically polymerizable surface active agent and/or hydrophilic monomer having an anionic group after the purification treatment is 50,000 ppm or less based on the aqueous component in the aqueous dispersion.

19) The ink jet recording ink as described in the above 17), which is produced by purification treatment of the aqueous dispersion, wherein the total concentration of unreacted anionically polymerizable surface active agent and/or hydrophilic monomer having an anionic group, and unreacted hydrophobic monomer after the purification treatment is 50,000 ppm or less based on the aqueous component in the aqueous dispersion.

20) The ink jet recording ink as described in the above 17), which is produced by purification treatment of the aqueous dispersion, wherein the total concentration of unreacted cationically polymerizable surface active agent, unreacted anionically polymerizable surface active agent and/or hydrophilic monomer having an anionic group, and unreacted hydrophobic monomer after the purification treatment is 50,000 ppm or less based on the aqueous component in the aqueous dispersion.

21) The ink jet recording ink as described in the above 20), wherein the total amount of unreacted cationically polymerizable surface active agent, unreacted anionically polymerizable surface active agent and/or hydrophilic monomer having an anionic group, and unreacted hydrophobic monomer before the purification treatment is 5 to 40% by weight based on the charged amount thereof.

22) An ink jet recording ink comprising at least a microencapsulated pigment as described in any one of the above 1) to 10) and water.

23) The ink jet recording ink as described in any one of the above 17 to 22, further comprising polymer fine particles, wherein the polymer fine particles has an anionic group on the surface thereof, a glass transition temperature of 30° C. or lower, and a volume average particle size of 10 to 200 nm.

24) The ink jet recording ink as described in the above 23), wherein the anionic group on the surface of the polymer fine particles is the same as the anionic group on the surface of the microencapsulated pigment.

25) The ink jet recording ink as described in the above 23) or 24), wherein the polymer fine particles has such a reactivity with a bivalent metal salt that time required for decreasing the transmittance of a light having a wavelength of 700 nm to 50% of an initial value is $1 \times 10^4$ second or less when 3 parts by volume of a 0.1% by weight aqueous emulsion of the polymer fine particles is brought into contact with 1 part by volume of a 1 mol/l aqueous solution of the bivalent metal salt.

26) The ink jet recording ink as described in any one of the above 17) to 25), further comprising a water-soluble organic solvent.

27) The ink jet recording ink as described in the above 26), wherein the water-soluble organic solvent is a high-boiling water-soluble organic solvent having a boiling point of 180° C. or higher.

28) The ink jet recording ink as described in the above 26) or 27), wherein the water-soluble organic solvent is glycerin.

29) The ink jet recording ink as described in any one of the above 26) to 28), wherein the water-soluble organic solvent is one or more compounds selected from the group consisting of an alkyl ether of a polyhydric alcohol and/or a 1, 2-alkanediol.

30) The ink jet recording ink as described in any one of the above 17) to 29), further comprising a solid wetting agent in an amount of 3 to 20% by weight based on the total weight of the ink jet recording ink.

31) The ink jet recording ink as described in the above 30), wherein the solid wetting agent is one or more compounds selected from the group consisting of trimethylolpropane, 1,2,6-hexanetriol, a saccharide, and a sugar alcohol.

According to the microencapsulated pigment and the production process therefor of the invention, it is possible to provide a microencapsulated pigment capable of providing an ink jet recording ink satisfying all the above requirements (1) to (6):
(1) being excellent dispersion stability,
(2) being excellent ejection stability from a recording head,
(3) being capable of obtaining recorded matters excellent in fastness of images,
(4) being capable of obtaining recorded matters with high print density of images,
(5) being capable of obtaining recorded matters excellent in abrasion resistance of images, and
(6) being capable of obtaining recorded matters with images which hardly blur and show high color developability even when plain paper is used as a recording medium; and also provides a process for producing the microencapsulated pigment; and an aqueous dispersion.

Moreover, according to the ink jet recording ink of the present invention, it is possible to provide an ink jet recording ink which satisfies all the above requirements (1) to (6):
(1) being excellent dispersion stability,
(2) being excellent ejection stability from a recording head,
(3) being capable of obtaining recorded matters excellent in fastness of images,
(4) being capable of obtaining recorded matters with high print density of images,
(5) being capable of obtaining recorded matters excellent in abrasion resistance of images, and
(6) being capable of obtaining recorded matters with images which hardly blur and show high color developability even when plain paper is used as a recording medium.

Figure 1:
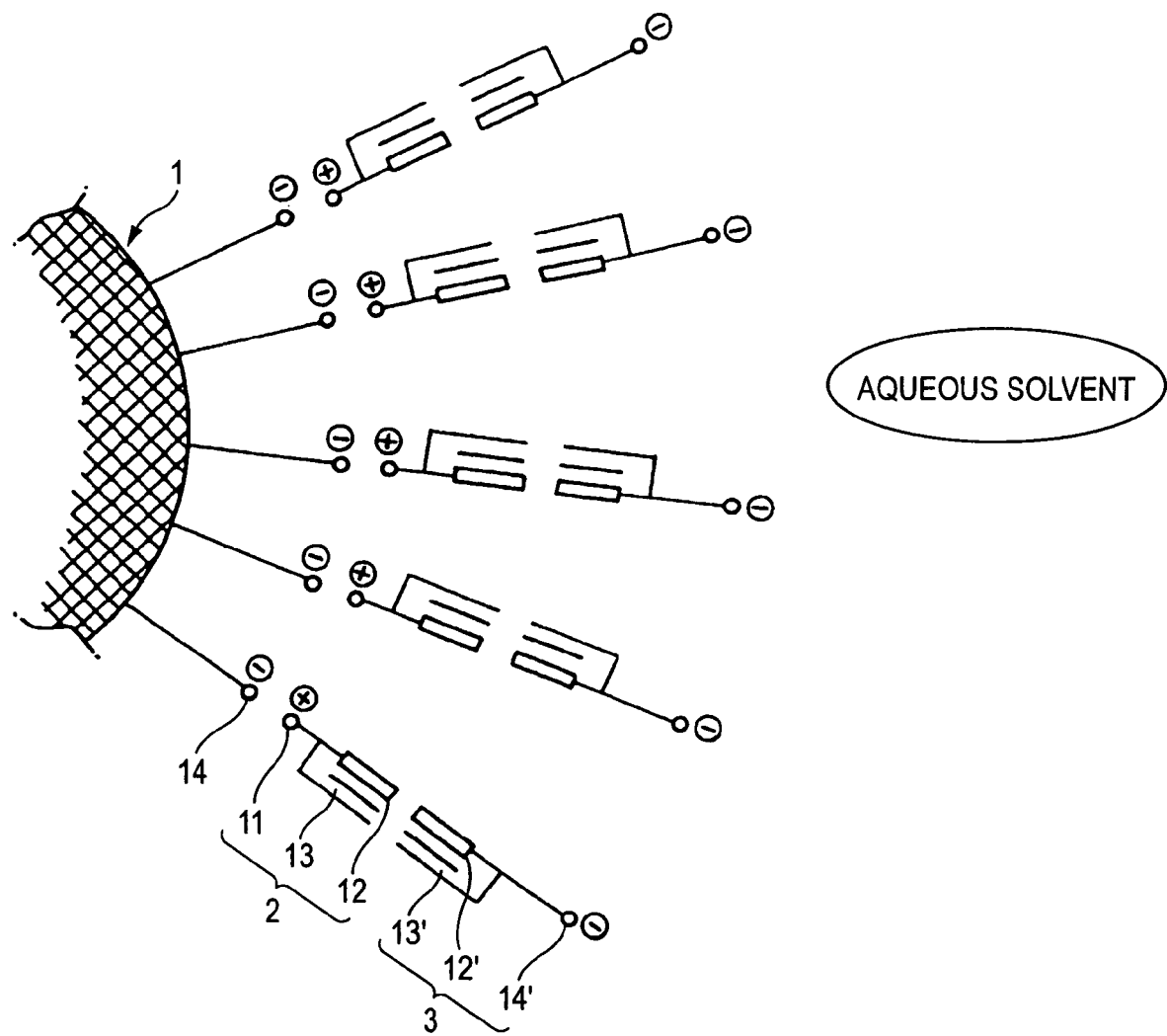
FIG. 1 schematically illustrates a state in which a pigment particle having an anionic group on the surface thereof is dispersed in an aqueous solvent and is coexistent with a cationically polymerizable surface active agent and an anionically polymerizable surface active agent.

The reference numerals in the figures show the followings, respectively.
1: pigment particle
2: cationically polymerizable surface active agent
3: anionically polymerizable surface active agent
10: hydrophilic group
11: cationic group
12, 12': hydrophobic group
13, 13': polymerizable group
14, 14': anionic group
60, 60': polymer layer (polymer)
100, 100': microencapsulated pigment

DETAILED DESCRIPTION OF THE INVENTION

The microencapsulated pigment according to the present invention is characterized in that pigment particles having an anionic group on the surface thereof are coated with a polymer comprising a repeating structural unit derived from a cationically polymerizable surface active agent having a cationic group, a hydrophobic group and a polymerizable group and a repeating structural unit derived from an anionically polymerizable surface active agent having an anionic group, a hydrophobic group and a polymerizable group and/or a hydrophilic monomer having an anionic group.

Such microencapsulated pigment can be suitably produced by a process for producing a microencapsulated pigment comprising coating pigment particles having an anionic group on the surface thereof with a polymer,
wherein the cationically polymerizable surface active agent is added to and mixed with an aqueous dispersion of the pigment particles having an anionic group on the surface thereof, then the anionically polymerizable surface active agent and/or the hydrophilic monomer having an anionic group are added thereto and the mixture was emulsified, followed by adding a polymerization initiator and carrying out emulsion polymerization.

According to such emulsion polymerization, the anionic group on the surface of the pigment particles having the anionic group is first ionically bonded to the cationic group of the cationically polymerizable surface active agent to form a structure in which the hydrophobic group of the cationically polymerizable surface active agent faces the hydrophobic group of the anionically polymerizable surface active agent and the anionic group of the anionically polymerizable surface active agent is oriented toward the aqueous phase side. Polymerization in this state forms a polymer layer maintaining the above structure on the pigment particle surface. Namely, arrangement of the cationic polymerizable surface active agent and the anionically polymerizable surface active agent present around the pigment particles before the polymerization are extremely highly controlled and a state that the anionic groups are oriented toward the aqueous phase is formed at the outermost shell. Then, by emulsion polymerization, the cationic polymerizable surface active agent and the anionically polymerizable surface active agent are converted into a polymer with the highly controlled state.

Therefore, the microencapsulated pigment of the invention should have an extremely accurately controlled structure. Thereby, the microencapsulated pigment according to the invention is capable of providing an ink jet recording ink satisfying all the above requirements:
(1) being excellent dispersion stability,
(2) being excellent ejection stability from a recording head,
(3) being capable of obtaining recorded matters excellent in fastness of images,
(4) being capable of obtaining recorded matters with high print density of images,
(5) being capable of obtaining recorded matters excellent in abrasion resistance of images, and
(6) being capable of obtaining recorded matters with images which hardly blur and show high color developability even when plain paper is used as a recording medium;

In contrast, it seems that a microencapsulated pigment in which pigment is coated with a previously prepared polymer by means of, for example, phase inversion emulsification or acid precipitation fails to achieve such a coated state of the pigment particles with the polymer that satisfy all the above requirements (1) to (6) presumably because a coated state of the pigment particles is limited since the polymer is previously prepared.

In the invention, the microencapsulated pigment preferably has an aspect ratio (a ratio of the major diameter to the minor diameter) of 1.0 to 1.3 and a Zingg index of 1.0 to 1.3, particularly 1.0 to 1.2. Thereby, the above requirements (1), (2), (4), and (6) are securely fulfilled.

When the minor diameter, major diameter, and thickness of a particle are shown by b, l, and t, respectively, provided that $1 \geq b \geq t > 0$, the aspect ratio and the flatness are represented by $l/b$ ($\geq 1$) and $b/t$ ($\geq 1$), respectively, and the Zingg index is represented by aspect ratio/flatness=$(l \cdot t)/b^2$. That is, a true sphere has an aspect ratio of 1 and a Zingg index of 1.

When the Zingg index is greater than 1.3, there is a tendency to fail to exhibit satisfactory results with respect to the above requirements (1), (2), (4), and (6), which may be ascribable to a flatter shape and lower the isotropy of the microencapsulated pigments. While methods for controlling the aspect ratio and Zingg index within the above ranges are not particularly restricted, it is notable that a microencapsulated pigment in which the pigment particles having an anionic group on the surface thereof are coated with a polymer by emulsion polymerization readily satisfies these requirements.

When a microencapsulated pigment is produced by techniques other than emulsion polymerization, such as acid precipitation and phase inversion emulsification, it is difficult to achieve an aspect ratio and a Zingg index controlled within the above ranges.

The microencapsulated pigment whose aspect ratio and Zingg index fall within the above ranges becomes like a true sphere. Thus, inks containing such microencapsulated pigments easily exhibit Newtonian flow behavior and excellent ejection stability. Since the pigments are like a true sphere, it is assured that the ejected encapsulated particles are arranged on a recording medium such as paper at a high density to realize print density and color development with high efficiency. Also, since the pigments are like a true sphere, the inks are excellent in dispersibility and dispersion stability.

The following will describe the embodiments of the invention with reference to possible dispersion states of the pigment particles in the above-mentioned preferred production methods. However, it is to be noted that the following description on the dispersion state of the pigment particles contains theoretical assumptions.

FIG. 1 illustrates a state in which a pigment particle 1 having an anionic group 14 on the surface thereof as a hydrophilic group is dispersed in a solvent mainly comprising water (hereinafter also referred to as an aqueous solvent) and is coexistent with a cationically polymerizable surface active agent 2 having a cationic group 11, a hydrophobic group 12, and a polymerizable group 13 and an anionically polymerizable surface active agent 3 having an anionic group 14', a hydrophobic group 12', and a polymerizable group 13'. The cationically polymerizable surface active agent 2 is arranged so that the cationic group 11 faces the anionic group 14 of the pigment particle 1 and is adsorbed through an ionic strong bonding. And, the hydrophobic group 12' and polymerizable group 13' of the anionic polymerizable surface active agent 3 faces the hydrophobic group 12 and polymerizable group 13 of the cationic polymerizable surface active agent 2 through hydrophobic interaction and the other anionic group 14' of the anionic polymerizable surface active agent 3 faces in the direction that the aqueous solvent exists, i.e., in the direction away from the pigment particle 1.

Figure 2:
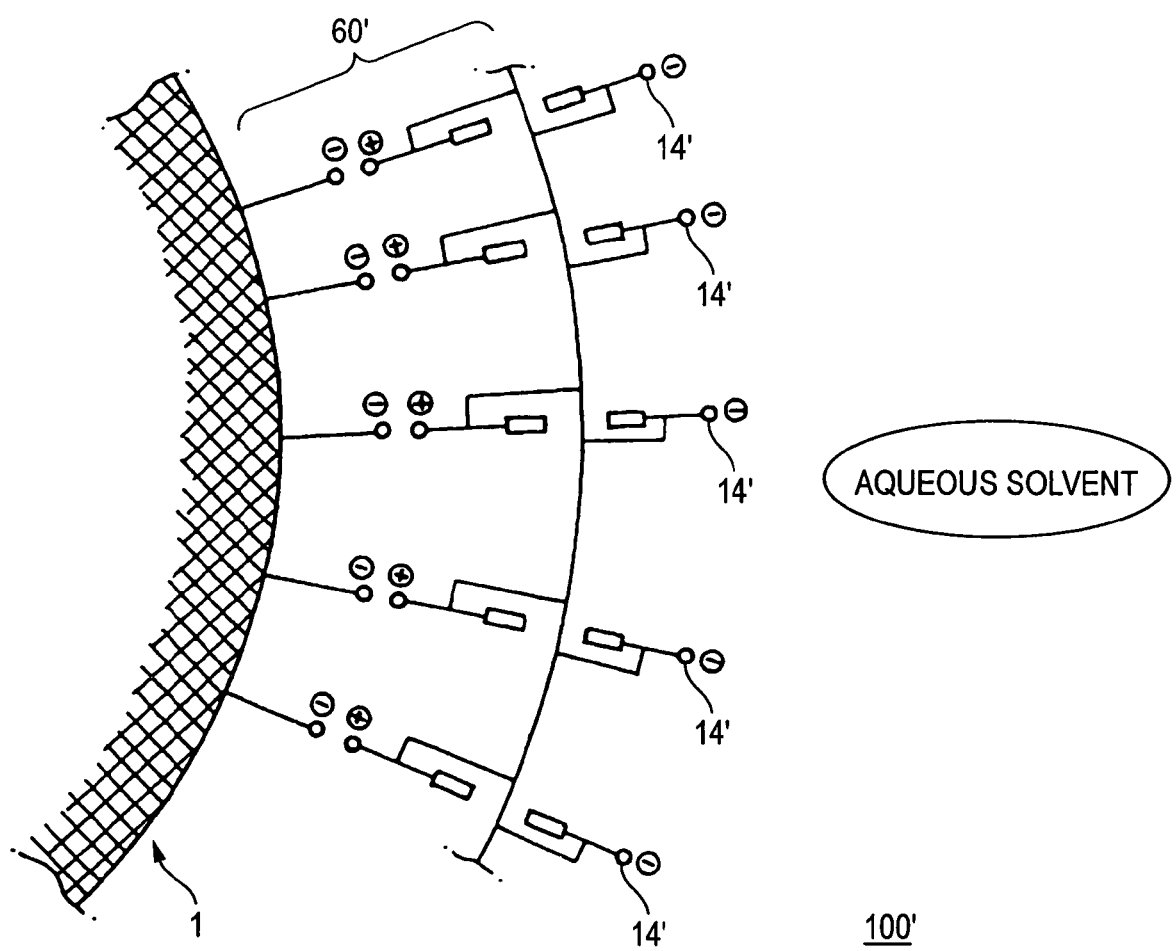
FIG. 2 schematically illustrates the dispersed state shown in FIG. 1 in which the cationically polymerizable surface active agent and the anionically polymerizable surface active agent have been copolymerized.

When the polymerizable groups 13 of the cationically polymerizable surface active agent 2 and the polymerizable groups 13' of the anionically polymerizable surface active agent 3 are polymerized by, for example, addition of a polymerization initiator to such aqueous dispersion, there is produced a microencapsulated pigment 100' wherein the pigment particle 1 is encapsulated with a polymer layer 60' as shown in FIG. 2. Since the polymer layer 60' has the anionic groups 14' on its surface, the microencapsulated pigment 100' is dispersible in the aqueous solvent. In the case that the hydrophilic monomer having an anionic group as a hydrophilic group is used instead of the anionically polymerizable surface active agent 3, the microencapsulated pigment can be produced in a similar manner. If necessary, a comonomer copolymerizable with the cationically polymerizable surface active agent and the anionically polymerizable surface active agent and/or the hydrophilic monomer having an anionic group may be present in the aqueous dispersion in the step of polymerization. In this case, the polymer layer may be a copolymer layer comprising the cationically polymerizable surface active agent, the anionically polymerizable surface active agent and/or the hydrophilic monomer having an anionic group, and the comonomer.

Figure 3:
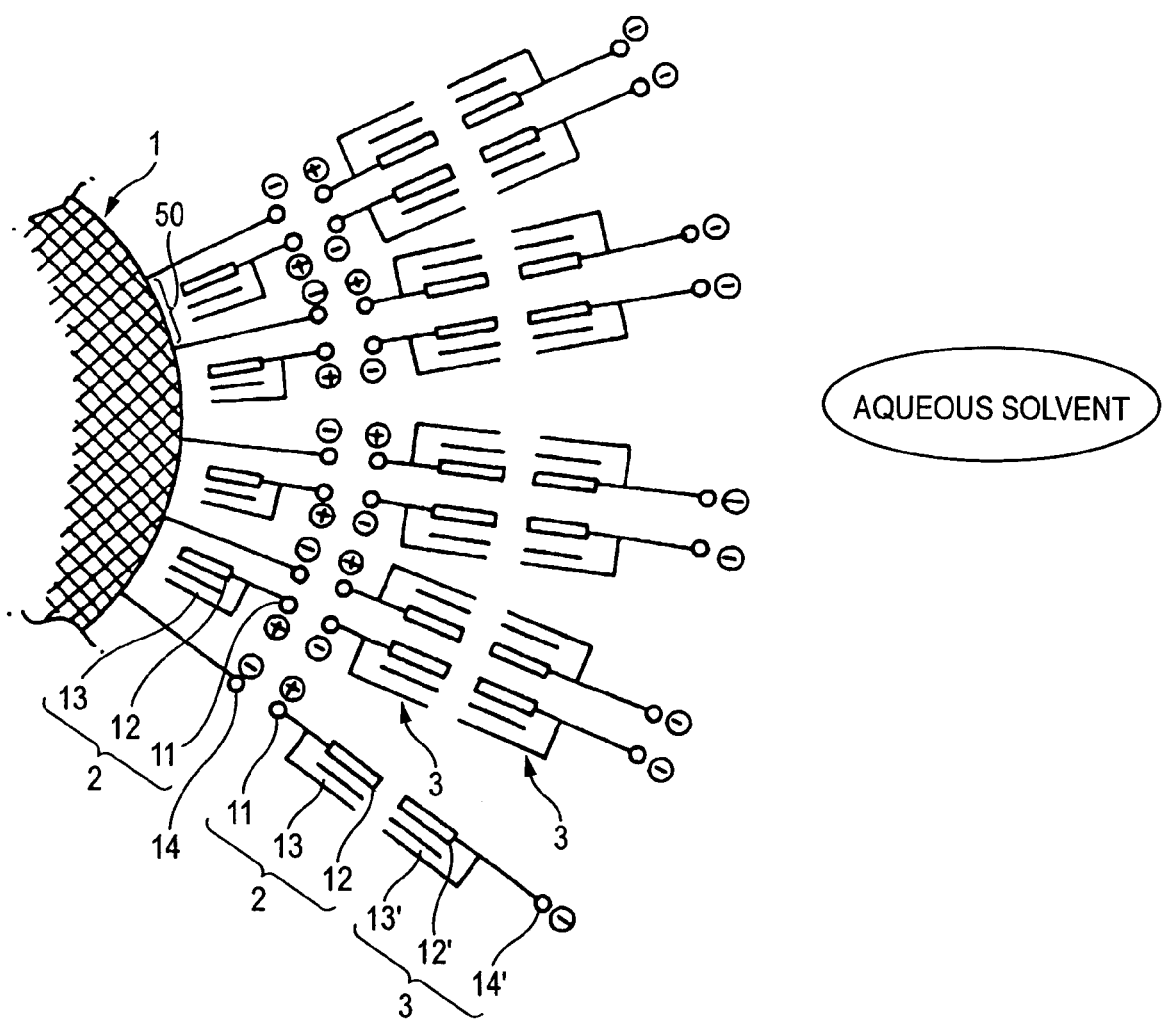
FIG. 3 schematically illustrates a state in which a pigment particle having an anionic group on the surface thereof is dispersed in an aqueous solvent and is coexistent with a cationically polymerizable surface active agent and an anionically polymerizable surface active agent.

Moreover, in addition to the above, a dispersion state of the pigment particles in the above-mentioned preferred production process is mentioned. FIG. 3 illustrates a state in which a pigment particle 1 having an anionic group 14 on the surface thereof as a hydrophilic group is dispersed in a solvent mainly comprising water (hereinafter also referred to as an aqueous solvent) and is coexistent with a cationically polymerizable surface active agent 2 having a cationic group 11, a hydrophobic group 12, and a polymerizable group 13 and an anionically polymerizable surface active agent 3 having an anionic group 14', a hydrophobic group 12', and a polymerizable group 13'. The cationically polymerizable surface active agent 2 is arranged so that the cationic group 11 faces the anionic group 14 of the pigment particle 1 and is adsorbed through an ionic strong bonding. And, the hydrophobic group 12' and polymerizable group 13' of the anionic polymerizable surface active agent 3 faces the hydrophobic group 12 and polymerizable group 13 of the cationic polymerizable surface active agent 2 through hydrophobic interaction and the other anionic group 14' of the anionic polymerizable surface active agent 3 faces in the direction that the aqueous solvent exists, i.e., in the direction away from the pigment particle 1.

The pigment particle 1 has on its surface anionic groups 14 bonded through chemical bonding at a specific density and hydrophobic regions 50 among the anionic groups 14. For example, the hydrophobic group 12 and polymerizable group 13 of the cationically polymerizable surface active agent 2 faces the hydrophobic regions 50. And, the anionically polymerizable surface active agent 3 is arranged so that the anionic group 14' faces the cationic group 11 of the cationically polymerizable surface active agent 2 and is adsorbed through an ionic strong bonding. And, the hydrophobic group 12' and polymerizable group 13' of the anionic polymerizable surface active agent 3 is faced by the hydrophobic group 12' and polymerizable group 13' of the other anionic polymerizable surface active agent 3 through hydrophobic interaction and the anionic group 14' of the anionic polymerizable surface active agent 3 faces in the direction that the aqueous solvent exists, i.e., in the direction away from the pigment particle 1.

Figure 4:
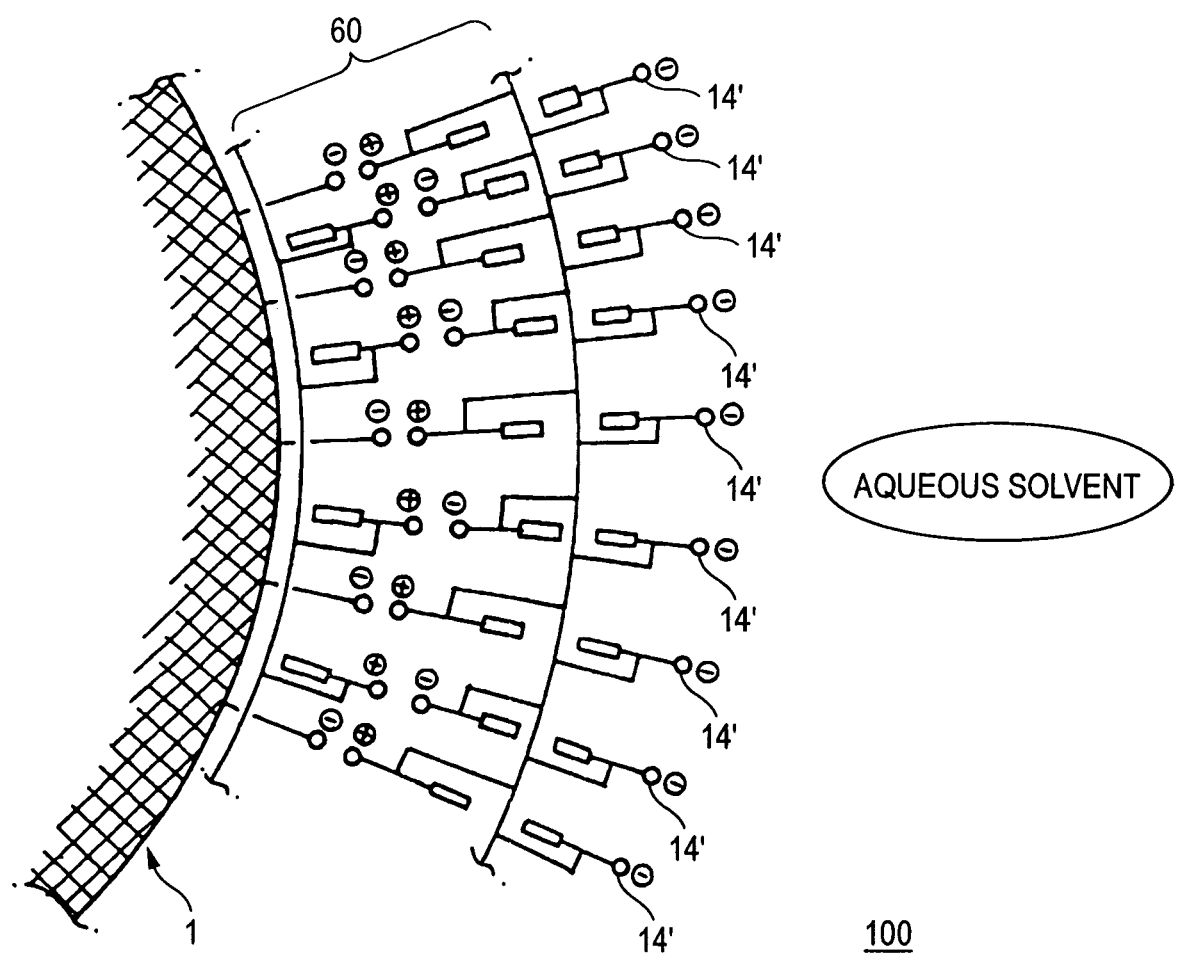
FIG. 4 schematically illustrates the dispersed state shown in FIG. 3 in which the cationically polymerizable surface active agent and the anionically polymerizable surface active agent have been copolymerized.

When the polymerizable groups 13 of the cationically polymerizable surface active agent 2 and the polymerizable groups 13' of the anionically polymerizable surface active agent 3 are polymerized by, for example, addition of a polymerization initiator to such aqueous dispersion, there is produced a microencapsulated pigment 100 wherein the pigment particle 1 is encapsulated with a polymer layer 60 as shown in FIG. 4. Since the polymer layer 60 has the anionic groups 14' on its surface, the microencapsulated pigment 100 is dispersible in the aqueous solvent. In the case that the hydrophilic monomer having an anionic group as a hydrophilic group is used instead of the anionically polymerizable surface active agent 3, the microencapsulated pigment can be produced in a similar manner. If necessary, a comonomer copolymerizable with the cationically polymerizable surface active agent and the anionically polymerizable surface active agent and/or the hydrophilic monomer having an anionic group may be present in the aqueous dispersion in the step of polymerization. In this case, the polymer layer may be a copolymer layer comprising the cationically polymerizable surface active agent, the anionically polymerizable surface active agent and/or the hydrophilic monomer having an anionic group, and the comonomer.

As above, the dispersion states are mentioned with reference to the drawings and the dispersion states begins with the pigment particle 1 being in a dispersed state in an aqueous solvent by virtue of its surface anionic group as a hydrophilic group. The pigment particles 1 achieve a highly dispersed state in an aqueous solvent as compared with the case of pigment particles having no hydrophilic group on their surface dispersed in an aqueous solvent with the aid of a dispersant. According to the microencapsulated pigment wherein pigment particles having an anionic group on their surface are covered with a polymer, improved stability of the microencapsulated pigment in an aqueous solvent can be achieved since the anionic groups of the microencapsulated pigment on the surface are regularly and densely orientated in the direction that the aqueous solvent exists as illustrated in FIGS. 2 and 4. Therefore, When the microencapsulated pigment of the invention is used as a colorant for an ink jet recording ink and an aqueous solvent is used as a solvent for the ink, dispersion stability more excellent to that of conventional microencapsulated pigment inks can be imparted with no viscosity increase and maintenance of a low viscosity even when an increased weight of the microencapsulated pigment is contained in the ink. Excellent dispersion stability leads to reduction of clogging the nozzle of a recording head with the microencapsulated pigment, and thus ejection stability becomes satisfactory. That is, the microencapsulated pigment provides a microencapsulated pigment ink excellent in dispersion stability and ejection stability and also having an enhanced content of colorant (concentration by weight) as compared with the case of the conventional microencapsulated pigment inks.

Moreover, since the microencapsulated pigment of the invention has small particle size and the hydrophilic groups (especially the anionic group) on the particle surface are regularly and densely oriented toward the aqueous phase side, the pigment is most closely packed on the cellulose fibers of plain paper to obtain a satisfactory packing property. Therefore, ink jet recording using the microencapsulated pigment ink having the high content (concentration by weight) of the microencapsulated pigment of the invention can produce recorded matter enjoying not only excellent image fastness but also high print density without occurrence of decrease in chroma.

When more specifically considered, the microencapsulated pigment of the invention is considered to have the anionic groups regularly and densely orientated toward the aqueous solvent side, so that effective electrostatic repulsive force is produced among the microencapsulated pigments. Besides such electrostatic repulsion, an effect of the steric hindrance caused by the polymer covering the pigment particles (polymer effect) seems to also contribute to the excellent dispersion stability of the microencapsulated pigment of the invention in an aqueous medium.

Suppression of blurring when plain paper is used as a recording medium and the high print density achievable are considered to owe largely to the action of the hydrophilic groups of the pigment regularly and densely orientated toward the aqueous solvent side. Upon landing of the ink ejected from a recording head onto plain paper, the ink solvent rapidly penetrates the paper. In the pigment ink using conventional pigment particles dispersed with the aid of a dispersant, being coated with the dispersant, the pigment particles tend to spread in a lateral direction and into a deep portion and are difficult to be adsorbed on the surface cellulose fibers of paper. This is presumably partly because the hydrophilic group content on the pigment surface is lower than that of the microencapsulated pigment of the invention and partly because the hydrophilic groups are not orientated regularly and densely. As a result, the print density is low, and the color developability is insufficient.

To the contrary, the microencapsulated pigment of the invention is easily aggregated through an interaction of the hydrophilic groups (especially anionic groups) present on the surface with various metal ions usually contained in plain paper, such as magnesium, calcium, and aluminum, or is easily adsorbed or aggregated through an interaction of the hydrophilic groups (especially anionic groups) of the microencapsulated pigment with a cationic starch or a cationic polymer in plain paper employed together with a sizing agent in the sizing treatment of the plain paper, or is easily adsorbed onto the cellulose fibers of plain paper through an interaction between the hydrophilic groups (especially anionic groups) and the cellulose fibers. Thus, when an ink containing the microencapsulated pigment of the invention as a colorant is ejected from a recording head and lands onto plain paper, the colorant tends to stay in the vicinity of the landing position to give a high print density with suppressed occurrence of blurring. Moreover, since the microencapsulated pigment of the invention has a small particle size and the hydrophilic groups (especially the anionic group) on the particle surface are regularly and densely oriented toward the aqueous phase side, the pigment is most closely packed on the cellulose fibers of plain paper to obtain a satisfactory packing property. Therefore, decrease in chroma not at all occur, which tend to occur in common pigment inks using a pigment other than the microencapsulated pigment of the invention as a colorant.

Furthermore, since the pigment is coated with a polymer, the ink jet recording ink according to the invention exhibits excellent fixability on a recording medium as compared with inks comprising conventional surface-treated pigment particles as colorant. As a result, printed matters with excellent abrasion resistance can be produced.

The following will describe components constituting the microencapsulated pigment according to the invention in detail.

The pigment particles having a hydrophilic group on their surface are conveniently prepared by treating the surface of pigment particles with a hydrophilic group-imparting agent. Therefore the pigment constituting the pigment particles having a hydrophilic group is not particularly limited as far as it is insoluble in the hydrophilic group-imparting agent. From such a viewpoint, particularly referable pigments for use in the ink of the invention may include the following inorganic pigments and organic pigments.

The inorganic pigments include carbon blacks (C.I. Pigment Black 7), such as furnace black, lamp black, acetylene black, and channel black, and iron oxide pigments. The organic pigments include azo pigments, such as azo lakes, insoluble azo pigments, condensed azo pigments, and chelate azo pigments; polycyclic pigments, such as phthalocyanine pigments, perylene pigments, perinone pigments, anthraquinone pigments, quinacridone pigments, dioxane pigments, thioindigo pigments, isoindolinone pigments, and quinofranone pigments; dye chelates, such as basic dye chelates and acidic dye chelates; nitro pigments, nitroso pigments, and aniline black.

More specific inorganic pigments used for black include carbon blacks, such as No. 2300, No. 900, MCF88, No. 33, No. 40, No. 45, No. 52, MA7, MA8, MA100 and No. 2200B, manufactured by Mitsubishi Chemical Corp.; Raven 5750, Raven 5250, Raven 5000, Raven 3500, Raven 1255, and Raven 700 manufactured by Columbia Corp.; Regal 400R, Regal 330R, and Regal 660R, Mogul L, and Monarch 700, Monarch 800, Monarch 880, Monarch 900, Monarch 1000, Monarch 1100, Monarch 1300, and Monarch 1400 manufactured by Cabot Corp.; and Color Black FW1, Color Black FW2, Color Black FW2V, Color Black FW18, Color Black FW200, Color Black S150, Color Black S160, and Color Black S170, Printex 35, Printex U, Printex V, and Printex 140U, and Special Black 6, Special Black 5, Special Black 4A, and Special Black 4 manufactured by Degussa Corp.

The organic pigments for black include black organic pigments such as aniline black (C.I. Pigment Black 1).

The organic pigments for yellow inks include C.I. Pigment Yellow 1 (Hansa Yellow), 2, 3 (Hansa Yellow 10G), 4, 5 (Hansa Yellow 5G), 6, 7, 10, 11, 12, 13, 14, 16, 17, 24 (Flavanthrone Yellow), 34, 35, 37, 53, 55, 65, 73, 74, 75, 81, 83, 93, 94, 95, 97, 98, 99, 108 (Anthrapyrimidine Yellow), 109, 110, 113, 117 (copper complex salt pigment), 120, 124, 128, 129, 133 (Quinophthalone), 138, 139 (Isoindolinone), 147, 151, 153 (nickel complex pigment), 154, 167, 172, and 180.

The organic pigments for magenta inks include C.I. Pigment Red 1 (Para Red), 2, 3 (Toluidine Red), 4, 5 (ITR Red), 6, 7, 8, 9, 10, 11, 12, 14, 15, 16, 17, 18, 19, 21, 22, 23, 30, 31, 32, 37, 38 (Pyrazolone Red), 40, 41, 42, 48 (Ca), 48 (Mn), 57 (Ca), 57:1, 88 (Thioindigo), 112 (Naphthol AS type), 114 (Naphthol AS type), 122 (Dimethylquinacridone), 123, 144, 146, 149, 150, 166, 168 (Anthoanthrone Orange), 170 (Naphthol AS type) 171, 175, 176, 177, 178, 179 (Perylene Maroon), 184, 185, 187, 202, 209 (Dichloroquinacridone), 219, 224 (perylene type), and 245 (Naphthol AS type); and C.I. Pigment Violet 19 (Quinacridone), 23 (Dioxazine Violet), 32, 33, 36, 38, 43, and 50.

The organic pigments for cyan inks include C.I. Pigment Blue 1, 2, 3, 15, 15:1, 15:2, 15:3, 15:34, 15:4, 16 (metal-free phthalocyanine), 18 (alkali blue toner), 22, 25, 60 (Threne Blue), 65 (Violanthrone), and 66 (Indigo); and C.I. Vat Blue 4 and 60.

Other organic pigments used for color inks other than magenta, cyan or yellow inks include C.I. Pigment Green 7 (Phthalocyanine Green), 10 (Green Gold), 36, and 37; C.I. Pigment Brown 3, 5, 25, and 26; and C.I. Pigment Orange 1, 2, 5, 7, 13, 14, 15, 16, 24, 34, 36, 38, 40, 43, and 63.

These pigments can be used either singly or as a combination of two or more thereof in the microencapsulated pigment of the invention.

As the hydrophilic group-imparting agents for treating the surface of the pigment particles, sulfur-containing treating agents may be first mentioned.

The hydrophilic group-imparting agents include sulfuric acid, fuming sulfuric acid, sulfur trioxide, chlorosulfuric acid, fluorosulfuric acid, amidosulfuric acid, sulfonated pyridine salts, and sulfamic acid. Preferred of them are sulfonating agents, such as sulfur trioxide, sulfonated pyridine salts, and sulfamic acid. They can be used either singly or as a mixture of two or more thereof. The term "sulfonating agent" as used herein denotes a treating agent capable of introducing a sulfonic acid group ($-SO_3H$) and/or a sulfinic acid group ($-RSO_2H$; R is an alkyl group having 1 to 12 carbon atoms, or a phenyl or its modified group).

It is also useful to convert sulfur trioxide into a complex by the action of a mixed solvent of a solvent capable of forming a complex with sulfur trioxide, such as a basic solvent (e.g., N,N-dimethylformamide, dioxane, pyridine, triethylamine, or trimethylamine), nitromethane or acetonitrile, and at least one solvent described below.

In particular, in the case that the reactivity of sulfur trioxide is so high that the pigment itself may be decomposed or denatured or in the case that use of a strong acid such as sulfuric acid is unsuitable due to difficulty of reaction control, it is advisable to use a complex of sulfur trioxide with a tertiary amine to accomplish the surface treatment (sulfonation in this case) of pigment particles.

When a strong acid such as sulfuric acid, fuming sulfuric acid, chlorosulfuric acid or fluorosulfuric acid is used singly, the pigment particles easily dissolve to undergo reaction molecule by molecule. In this case, the reaction must be performed under control, and thus it is necessary to give due consideration to the kind and amount of a solvent used.

The solvent which can be used in the reaction is selected from those which are inert to the sulfur-containing treating agent and in which the above pigment is insoluble or sparingly soluble. Examples thereof are sulfolane, N-methyl-2-pyrrolidone, dimethylacetamide, quinoline, hexamethylphosphoric triamide, chloroform, dichloroethane, tetrachloroethane, tetrachloroethylene, dichloromethane, nitromethane, nitrobenzene, liquid sulfur dioxide, carbon disulfide, and trichlorofluoromethane.

The treatment with the sulfur-containing treating agent is carried out by dispersing pigment particles in the solvent, adding the sulfur-containing treating agent to the dispersion, and heating the mixture under stirring at 60 to 200° C. for 3 to 10 hours. Specifically, it is preferable that the particles in the solvent are converted into a slurry (dispersion) beforehand by high shear dispersion in a high-speed mixer, etc. or impact dispersion in a bead mill, a jet mill, etc. The resulting slurry is then stirred gently, and the sulfur-containing treating agent is added thereto to introduce the hydrophilic group onto the surface of the pigment particles. The amount of the hydrophilic group that can be introduced largely depends on the reaction conditions and the kind of the sulfur-containing treating agent. After successive heat treatment, the solvent and the residual sulfur-containing treating agent are removed from the slurry of the pigment particles. The removal is effected by repetition of washing with water, ultrafiltration, reverse osmosis, centrifugation and filtration, or the like.

The pigment particles having a sulfonic acid group (—$SO_3H$) and/or a sulfinic acid group (—$RSO_2H$; R is an alkyl group having 1 to 12 carbon atoms, or a phenyl or its modified group) can further be treated with an alkali compound to form pigment particles having a sulfonate anion (—$SO_3$) and/or a sulfinate anion (—$RSO_2$; R is an alkyl group having 1 to 12 carbon atoms, or a phenyl or its modified group) on the surface thereof. In the invention, the particles are preferably used in this form.

The alkali compound is selected from those capable of forming an alkali metal cation or a monovalent cation represented by the chemical formula: $(R_1R_2R_3R_4N)^+$, wherein $R_1$, $R_2$, $R_3$, and $R_4$ which may be the same or different, and represent each a hydrogen atom, an alkyl group, a hydroxyalkyl group or a halogenated alkyl group. Preferred alkali compounds are those capable of forming a cation of a lithium ion ($Li^+$), a potassium ion ($K^+$), a sodium ion ($Na^+$), an ammonium ion ($NH_4^+$), or an alkanolamine cation, e.g., a triethanolamine cation.

The anion of the alkali compound is preferably a hydroxide anion. Specific examples of the compounds include ammonia, alkanolamines (e.g., monoethanolamine, diethanolamine, N,N-butylethanolamine, triethanolamine, propanolamine, aminomethylpropanol, and 2-aminoisopropanol), and monovalent alkali metal hydroxides (e.g., LiOH, NaOH, and KOH).

The alkali compound is preferably added in an amount equal to or more than the neutralization equivalent for the sulfonic acid group and/or the sulfinic acid group on the pigment particles. Volatile additives, such as ammonia and alkanolamines, are preferably added in amounts at least 1.5 times the neutralization equivalent.

The treatment is conducted by adding the pigment particles having the sulfonic acid group and/or the sulfinic acid group chemically bonded to the surface into the alkali compound, followed by shaking in a paint shaker, etc.

The hydrophilic group-imparting agents for treating the surface of the pigment particles also suitably include carboxylating agents. The term "carboxylating agent" as used herein denotes a treating agent capable of introducing a carboxyl group (—COOH).

As a carboxylating agent, using an oxidizing agent, such as hypohalite salts (e.g., sodium hypochlorite and potassium hypochlorite), part of the bonds (C=C or C—C) on the surface of the pigment particles are cleaved to achieve oxidation. In addition to the chemical treatment, physical oxidation such as a plasma treatment is also applicable to impart a carboxyl group. In the invention, various techniques are applicable as far as a stable dispersed state in an aqueous medium is achieved. Furthermore, the exemplified treatments for carboxyl introduction sometimes accompanied by introduction of a quinone group and the like, while not much in quantity. Such cases are even within the scope of the present invention as far as the dispersion stability of the microencapsulated pigment in an aqueous solvent is achieved.

The following describes an example of the treatment with a carboxylating agent. Pigment particles are previously dispersed in an aqueous medium by high shear dispersion in a high-speed mixer, etc or impact dispersion in a bead mill, a jet mill, etc. to prepare a slurry (dispersion). The slurry is mixed with a hypohalite salt, such as 10 to 30% sodium hypochlorite, having an effective halogen concentration in an adequate amount of water. The mixture is heated under stirring at 60 to 80° C. for about 5 to 10 hours, preferably 10 hours or longer. Since the operation is accompanied by considerable heat generation, it should be carried out with due care about safety. Thereafter, the solvent and the residual carboxylating agent are removed from the slurry of the surface-treated pigment particles by heat treatment. If necessary, the resulting dispersion is further worked up by repetition of washing with water, ultrafiltration, reverse osmosis, centrifugation and filtration, or the like to obtain a desired aqueous dispersion.

Similarly, the pigment particles having a carboxyl group (—COOH) can be treated with an alkali compound to form pigment particles having a carboxylate anion (—COO) as a hydrophilic group on the surface. In the invention, the particles are preferably used in this form.

The kind of the alkali compound and the method of treating with the alkali compound are the same as described above.

A preferred amount of the hydrophilic group to be introduced onto the surface of pigment particles and a method of investigating the introduced state of the hydrophilic group will then be described.

In the case that hydrophilization of pigment particles is achieved by a sulfonating agent, the amount of the hydrophilic group to be introduced onto the pigment particle surface is preferably 0.01 mmol equivalent or more per gram of the pigment particles. Amounts less than 0.01 mmol equivalent tend to result in aggregation of the pigment particles in the step of microencapsulating the pigment particles in an aqueous solvent, which tends to result in an increased average particle size of the resulting encapsulated pigment. As the average particle size of the microencapsulated pigment particles increases, it becomes harder to obtain an ink jet recording ink excellent in dispersion stability and ejection stability and capable of forming images with high print density.

The upper limit of the amount of the hydrophilic group to be introduced is not particularly limited but is preferably 0.15 mmol/g based on the pigment particles from the standpoint of cost performance, because the introduction of the hydrophilic group in an amount of more than 0.15 mmol/g hardly changes the average particle size of the resulting pigment particles.

Next, the amount of the hydrophilic group introduced on the surface of pigment particles with a carboxylating agent is described. It is believed that a carboxyl group (—COOH) and/or a carboxylate anion (—COO) are introduced on the surface of the pigment particles by the surface treating method adopted in the invention, but it is impossible to directly measure the amount of the groups. In the invention, the introduced amount is determined from the content of surface active hydrogen. Details of the method of the determination will be described later.

The active hydrogen content of the pigment obtained by such a method is preferably 1.0 mmol/g or more, still preferably 1.5 mmol/g or more. With active hydrogen contents lower than 1.0 mmol/g, the pigment particles tend to have poor dispersibility in water and are liable to assemble (particles spontaneously aggregate to form large-sized particles) in the step of microencapsulation.

As above, the pigment particles having a hydrophilic group are described in detail. According to the above-mentioned techniques, it is easy to make an average particle size of pigment particles having a hydrophilic group on the surface 150 nm or smaller. In particular, it is still preferred to control the average particle size in a range of 20 to 80 nm by properly selecting the kinds of the pigment and the hydrophilic group-imparting agent, the amount of a hydrophilic group introduced, and so forth. Thereby, it is possible to obtain a microencapsulated pigment capable of producing more surely an ink jet recording ink having excellent dispersion stability, excellent ejection stability, and also capability of forming images with an increased print density. The term "average particle size" as referred to herein means a value measured by a laser light scattering method.

The pigment particles having a hydrophilic group on the surface are then coated with a polymer comprising a repeating structural unit derived from a cationically polymerizable surface active agent having a cationic group, a hydrophobic group and a polymerizable group and a repeating structural unit derived from an anionically polymerizable surface active agent having an anionic group, a hydrophobic group and a polymerizable group and/or a hydrophilic monomer having an anionic group to form a microencapsulated pigment according to the invention. As stated previously, such a microencapsulated pigment is conveniently prepared by adding the cationically polymerizable surface active agent to an aqueous dispersion of the pigment particles having an anionic group on the surface, mixing them, adding the anionically polymerizable surface active agent and/or the hydrophilic monomer having an anionic group thereto, emulsifying them, adding a polymerization initiator, and carrying out emulsion polymerization.

The cationic group of the cationically polymerizable surface active agent is preferably a cationic group selected from the group consisting of a primary amine cation, a secondary amine cation, a tertiary amine cation, a quaternary ammonium cation. The primary amine cation includes a monoalkylammonium cation ($RNH_3^+$) or the like, the secondary amine cation includes a dialkylammonium cation ($R_2NH_2^+$) or the like, the tertiary amine cation includes a trialkylammonium cation ($R_3NH^+$) or the like, and the quaternary ammonium cation includes ($R_4N^+$) or the like. Herein, R is a hydrophobic group and a polymerizable group, which includes those mentioned below.

The counter anion of the above cationic group includes $Cl^-$, $Br^-$, $I^-$, or the like.

The hydrophobic group is preferably selected from the group consisting of an alkyl group, an aryl group, and a combined group thereof.

The polymerizable group is preferably an unsaturated hydrocarbon group and is still preferably selected from the group consisting of a vinyl group, an allyl group, an acryloyl group, a methacryloyl group, a propenyl group, a vinylidene group, and a vinylene group. Particularly preferred of them are an acryloyl group and a methacryloyl group.

Specific examples of the above cationically polymerizable surface active agent include cationic acrylic acid derivative as described in JP-B-4-65824.

As the cationically polymerizable surface active agent for use in the invention, for example, a compound represented by the general formula $R_{[4-(l+m+n)]}R^1_l R^2_m R^3_n N^+ X^-$ may be mentioned, wherein R is a polymerizable group and $R^1$, $R^2$, and $R^3$ are each an alkyl group or an aryl group, X is Cl, Br, or I, and l, m, and n are each 1 or 0. Examples of the above polymerizable group suitably include hydrocarbon groups having a radically polymerizable unsaturated hydrocarbon group, and more specifically include an allyl group, an acryloyl group, a methacryloyl group, a vinyl group, a propenyl group, a vinylidene group, and a vinylene group.

Specific Examples of the cationically polymerizable surface active agent include dimethylaminoethyl methacrylate methyl chloride, dimethylaminoethyl methacrylate benzyl chloride, methacryloyloxyethyltrimethylammonium chloride, diallyldimethylammonium chloride, and 2-hydroxy-3-methacryloxypropyltrimethylammonium chloride.

A commercially available product may be also used as the cationically polymerizable surface active agent. Examples thereof include acryl ester DMC (Mitsubishi Rayon Co., Ltd.), acryl ester DML60 (Mitsubishi Rayon Co., Ltd.), and C-1615 (Daiichi Kogyo Seiyaku K. K.).

The above exemplified cationically polymerizable surface active agents may be used either singly or as a mixture of two or more thereof.

The amount of the cationically polymerizable surface active agent to be added is preferably in the range of 0.5 to 2 molar equivalents, more preferably in the range of 0.8 to 1.2 molar equivalents based on the total number of moles of the anionic groups of the pigment having an anionic group on the surface used (=weight of the pigment used (g) x anionic group content on the surface of the pigment (mol/g)). The use of the agent in an amount of 0.5 molar equivalent or more achieves strong ionic bonding to the pigment particles having an anionic group as a hydrophilic group and enables facile encapsulation. The use of the agent in an amount of 2 molar equivalent or less enables decrease of the amount of the cationically polymerizable surface active agent not adsorbed on the pigment particles and thus prevention of the formation of polymer particles containing no pigment particle as a core substance (particles composed of the polymer alone).

Specific examples of the anionically polymerizable surface active agents include anionic allyl derivatives described in JP-B-49-46291, JP-B-1-24142, and JP-A-62-104802; anionic propenyl derivatives described in JP-A-62-221431; anionic acrylic acid derivatives described in JP-A-62-34947 and JP-A-55-11525; and anionic itaconic acid derivatives described in JP-B-46-34898 and JP-A-51-30284.

A preferred example of the anionically polymerizable surface active agent for use in the invention is a compound represented by the formula (31):

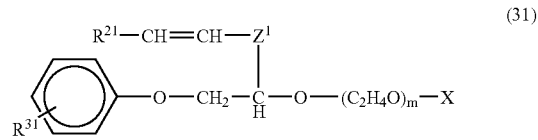

(31)

wherein $R^{21}$ and $R^{31}$ represent each independently a hydrogen atom or a hydrocarbon group having 1 to 12 carbon atoms;

Z represents a carbon-carbon single bond or a group represented by the formula $-CH_2-O-CH_2-$; m represents an integer of 2 to 20; X represents a group represented by —SO₃M¹; and M¹ represents an alkali metal atom, an ammonium salt residue or an alkanolamine residue; or a compound represented by the formula (32):

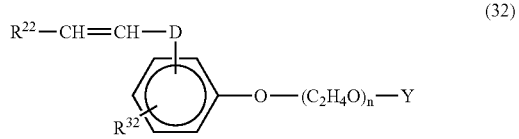

wherein R²² and R³² represent each independently a hydrogen atom or a hydrocarbon group having 1 to 12 carbon atoms;

D represents a carbon-carbon single bond or a group represented by the formula —CH₂—O—CH₂—; n represents an integer of 2 to 20; Y represents a group represented by —SO₃M²; and M² represents an alkali metal atom, an ammonium salt residue or an alkanolamine residue.

The polymerizable surface active agent represented by the formula (31) is disclosed in JP-A-5-320276 or JP-A-10-316909. The hydrophilicity or hydrophobicity of the agent can be adjusted to match the hydrophilicity or hydrophobicity of the pigment particle surface by appropriately selecting the kind of R²¹ and the value of x in the formula (31). Preferred polymerizable surface active agent of the formula (31) is represented by the formula (310). Specifically, compounds represented by the following formulae (31a) to (31d) may be mentioned.

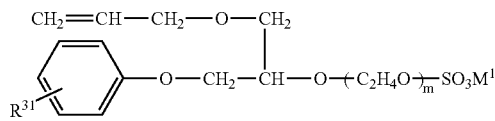

(310)

wherein R³¹, m, and M¹ are the same as in the compound represented by the formula (31).

As the above anionically polymerizable surface active agent, commercially available products can be used in the invention. Examples thereof include Aqualon HS series (Aqualon HS-05, HS-10, HS-20 and HS-1025) available from Daiichi Kogyo Seiyaku K. K. and Adeka Reasope SE-10N and SE-20N available from Asahi Denka Co., Ltd.

Adeka Reasope SE-1ON from Asahi Denka Co., Ltd. is a compound represented by the formula (310) wherein M¹ is NH₄, R³¹ is C₉H₁₉, and m=10. Adeka Reasope SE-20N from Asahi Denka Co., Ltd. is a compound represented by the formula (310) wherein M¹ is NH₄, R³¹ is C₉H₁₉, and m=20.

Moreover, a preferred example of the anionically polymerizable surface active agents for use in the invention is a compound represented by the formula (33):

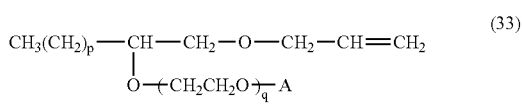

(33)

wherein n is 9 or 11, q is an integer of 2 to 20, A is a group represented by —SO₃M³; and M³ represents an alkali metal atom, an ammonium salt residue or an alkanolamine residue. As a preferred anionically polymerizable surface active agent represented by the formula (33), the following compound may be mentioned.

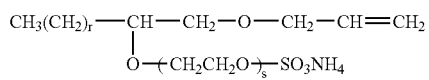

wherein n is 9 or 11 and s is 5 or 10.

As the above anionically polymerizable surface active agent, commercially available products can be used. Examples thereof include Aqualon KH series (Aqualon KH-05 and Aqualon KH-10) from Daiichi Kogyo Seiyaku K. K. Aqualon KH-05 is a mixture of a compound represented by the above formula wherein r is 9 and s is 5 and a

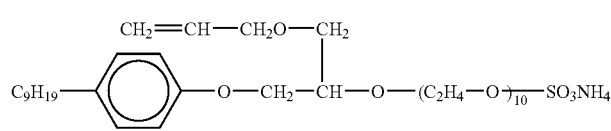

(31a)

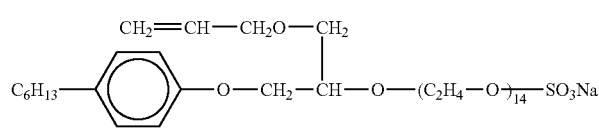

(31b)

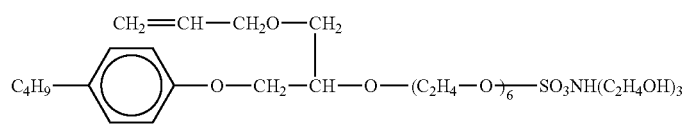

(31c)

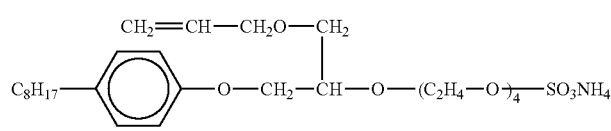

(31d)

compound represented by the above formula wherein r is 11 and s is 5. Aqualon KH-10 is a mixture of a compound represented by the above formula wherein r is 9 and s is 10 and a compound represented by the above formula wherein r is 11 and s is 10.

In addition, a compound represented by the following formula (A) is also preferred as the anionically polymerizable surface active agent:

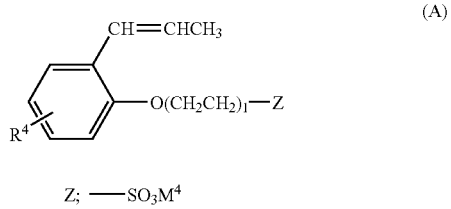

$$Z; \ —SO_3M^4$$

wherein $R^4$ represents a hydrogen atom or a hydrocarbon group having 1 to 12 carbon atoms; 1 represents a numeral of 2 to 20; and $M^4$ represents an alkali metal atom, an ammonium salt residue or an alkanolamine residue.

The above-enumerated anionically polymerizable surface active agents can be used either singly or as a mixture of two or more thereof.

The amount of the anionically polymerizable surface active agent to be added is preferably in the range of 1 to 10 molar equivalents, more preferably in the range of 1.0 to 5 molar equivalents based on the cationically polymerizable surface active agent. The use of the anionically polymerizable surface active agent in an amount of 1 molar equivalent or more achieves excellent dispersibility and dispersion stability of the encapsulated particles and excellent ejection stability. Additionally, adsorbability to paper fibers is increased, and print density and color developability become excellent. The use of the agent in an amount of 10 molar equivalent or less can suppress the occurrence of the anionically polymerizable surface active agent which does not contribute to encapsulation and prevent the formation of polymer particles containing no core substance other than the capsule particle.

After microencapsulation, the anionic group of the above anionically polymerizable surface active agent is considered to be present on the capsule surface, being orienting toward the aqueous phase side. Thereby, dispersibility and dispersion stability of the capsulated particles in the aqueous phase become excellent. Moreover, the above anionic group easily exerts interaction with various metal ions such as magnesium, calcium and aluminum ions, cationic starch, and a cationic polymer which are usually contained in plain paper and also with cellulose fibers. When an ink jet recording ink using such microencapsulated pigment as a colorant is ejected onto plain paper, the colorant tends to stay in the vicinity of the landing position on the plain paper, so that an image with high density is more surely obtained and occurrence of blurring can be suppressed.

The hydrophilic monomer which can be used in the invention is a compound having at least an anionic group as a hydrophilic group and a polymerizable group in the structure, and the hydrophilic group is preferably selected from the group consisting of a sulfonic acid group, a sulfinic acid group, a carboxyl group, a carbonyl group, and a salt thereof.

The polymerizable group is a radically polymerizable unsaturated hydrocarbon group and is preferably selected from the group consisting of a vinyl group, an allyl group, an acryloyl group, a methacryloyl group, a propenyl group, a vinylidene group, and a vinylene group.

The anionic groups such as the sulfonic acid group, sulfinic acid group, carboxyl group, carbonyl group, and salt thereof are considered to be present on the capsule surface, being orienting toward the aqueous phase side. Thereby, excellent dispersibility and dispersion stability of the capsulated particles in the aqueous phase can be achieved. Moreover, the above anionic groups easily exert interaction with various metal ions such as magnesium, calcium and aluminum ions, cationic starch, and a cationic polymer which are usually contained in plain paper and also with cellulose fibers. When a microencapsulated pigment is prepared using a polymerizable monomer having an anionic group as a hydrophilic group and an ink jet recording ink using such microencapsulated pigment as a colorant is ejected onto plain paper, the colorant tends to stay in the vicinity of the landing position on the plain paper, so that an image with high density is more surely obtained and occurrence of blurring can be suppressed.

Preferred specific examples of the hydrophilic monomer having an anionic group include methacrylic acid, acrylic acid, phosphoric acid group-containing (meth)acrylates, sodium vinylsulfonate, 2-sulfoethyl methacrylate, and 2-acrylamido-2-methylpropanesulfonic acid.

The amount of the hydrophilic monomer having an anionic group to be added is preferably in the range of 1 to 10 molar equivalents, more preferably in the range of 1.0 to 5 molar equivalents based on the cationically polymerizable surface active agent. The use of the hydrophilic monomer having an anionic group in an amount of 1 molar equivalent or more achieves excellent dispersibility and dispersion stability of the encapsulated particles and excellent ejection stability. The use of the agent in an amount of 10 molar equivalent or less can suppress the occurrence of the hydrophilic monomer which does not contribute to encapsulation and prevent the formation of polymer particles containing no core substance other than the capsule particle.

In the case that the anionically polymerizable surface active agent and the hydrophilic monomer having an anionic group are used in combination, the total amount thereof to be added is preferably in the range of 1 to 10 molar equivalents, more preferably in the range of 1.0 to 5 molar equivalents based on the cationically polymerizable surface active agent. As mentioned above, the use thereof in an amount of 1 molar equivalent or more achieves excellent dispersibility and dispersion stability of the encapsulated particles and excellent ejection stability. The use thereof in an amount of 10 molar equivalent or less can suppress the occurrence of the hydrophilic monomer which does not contribute to encapsulation and prevent the formation of polymer particles containing no core substance other than the capsule particle.

More specifically, the microencapsulated pigment according to the invention is conveniently produced by the following procedure.

(1) A cationically polymerizable surface active agent is added to an aqueous dispersion of the pigment having an anionic group on the surface. Thus, the cationic group of the cationically polymerizable surface active agent is adsorbed and ionically bonded to the anionic group of the pigment having an anionic group on the surface to be fixed thereto.

(2) A comonomer polymerizable with the cationically polymerizable surface active agent, more specifically, an anionically polymerizable surface active agent having having an anionic group, a hydrophobic group and a polymerizable group and/or a hydrophilic monomer having an anionic group and a polymerization initiator are added thereto, followed by carrying out emulsion polymerization.

By such procedure, a microencapsulated pigment coated with a polymer comprising a repeating structural unit derived from a cationically polymerizable surface active agent and a repeating structural unit derived from an anionically polymerizable surface active agent and/or a hydrophilic monomer having an anionic group can be conveniently produced.

Furthermore, the other monomer(s) may be added particularly for the purpose of controlling the fixability, abrasion resistance, and solvent resistance of recorded images and storage stability of the ink.

The other comonomer includes hydrophilic monomers (hydrophilic monomers other than the hydrophilic monomer having an anionic group) and/or hydrophobic monomers.

In particular, the fixability and abrasion resistance of recorded images can be controlled by appropriately selecting the glass transition point (Tg) of the copolymer which coats the pigment particles of the microencapsulated pigment according to the invention.

When printing is carried out on a recording medium such as plain paper or a specifically designed medium for ink jet recording with an ink using the microencapsulated pigment of the invention at room temperature, an aqueous media (composed of water and/or a water-soluble organic solvent) surrounding the microencapsulated pigment particles of the invention penetrate the recording medium such as plain paper or a specifically designed medium for ink jet recording to be removed from the vicinity of the microencapsulated pigment particles, thereby microencapsulated pigment particles come close to each other. At that time, in the case that the glass transition point (Tg) of the copolymer coating the pigment particles of the microencapsulated pigment is not higher than room temperature, the copolymer coating the pigment particles of the microencapsulated pigment is fused together to form a film in the state that the pigment is wrapped inside the film by capillary pressure generated at the gap between the microencapsulated pigment particles, so that fixability and abrasion resistance of images can be made particularly satisfactory. Moreover, in the case that images are printed out on a specifically designed medium for ink jet recording, especially a glossy medium for ink jet with an ink using the microencapsulated pigment of the invention, the microencapsulated pigment of the invention is most densely packed on the glossy medium to achieve a satisfactory packing property and also a satisfactory gloss is achieved owing to the above-mentioned film-forming property, since the microencapsulated pigment has a small particle size and the hydrophilic groups (especially anionic groups) are regularly and densely oriented toward the aqueous phase.

In general, in a polymer solid, especially an amorphous polymer solid, as the temperature is elevated from a low temperature to a high temperature, there occurs a phenomenon of rapid change from a state where an extremely large force is required for a slight deformation (glass state) into a state where a large deformation is caused by a small force. The temperature at which the phenomenon occurs is called glass transition point (or glass transition temperature). Generally, an intersection point of a tangent line drawn from the bottom part of an endothermic peak toward an initial point of endothermic behavior with the baseline in the differential thermal analysis curve obtained by a temperature-elevating measurement on a differential scanning calorimeter is determined as the glass transition point.

Also, it is known that other physical properties such as modulus of elasticity, specific heat, and index of refraction drastically change at the glass transition point. Therefore, it is known that the glass transition point is also determined by measuring these physical properties. In the invention, the glass transition point obtained by a temperature-elevating measurement on a differential scanning calorimeter is used.

At the printing on a recording medium such as plain paper or a specifically designed medium for ink jet recording with the ink using the microencapsulated pigment of the invention, in order to form a film of the microencapsulated pigment of the invention more preferably at room temperature, the glass transition point (Tg) of the copolymer coating the pigment particles of the microencapsulated pigment is preferably 30° C. or lower, more preferably 15° C. or lower, further preferably 10° C. or lower. Therefore, the copolymer coating the pigment particles of the microencapsulated pigment is preferably designed so as to have a glass transition temperature of preferably 30° C. or lower, more preferably 15° C. or lower, further preferably 10° C. or lower. However, a glass transition point lower than −20° C. tends to result in reduction of solvent resistance.

The glass transition point of such copolymer can be within the above range by suitably selecting the kind and composition ratio of the hydrophobic monomer to be used. In the case that a printed matter can be heated to the temperature equal to or higher than the glass transition point (Tg) of the copolymer coating the pigment particles of the microencapsulated pigment, since film formation is possible as far as the glass transition point is equal to or lower than the heating temperature, the glass transition temperature may be higher than 30° C. In this case, however, it is necessary to attach a heating device to an ink jet recording apparatus and hence there arises a problem that cost of the apparatus increases, so that the glass transition temperature is preferably 30° C. or lower.

The hydrophilic monomer other than the hydrophilic monomer having an anionic group includes those having a hydroxyl group, an ethylene oxide group, an amido group, or an amino group as a hydrophilic group. These hydrophilic groups are considered to be present on the capsule surface, being oriented toward the aqueous phase together with anionic groups, and the hydrophilic groups tend to form hydrogen bonds with OH groups of cellulose fibers of paper. Therefore, when an ink jet recording ink using a microencapsulated pigment obtained by combining a hydrophilic monomer having any of the hydrophilic groups as a colorant is ejected onto plain paper, the colorant more easily adsorbs onto cellulose fibers of the plain paper and tends to stay in the vicinity of the landing position and in the vicinity of the paper surface, so that an image with higher density is obtained and occurrence of blurring can be suppressed.

The hydrophilic monomer other than the hydrophilic monomer having an anionic group includes 2-hydroxyethyl methacrylate, 2-hydroxypropylmethacrylate, 2-hydroxybutyl methacrylate, etc. having an OH group; ethyldiethylene glycol acrylate, polyethylene glycol monomethacrylate, methoxypolyethylene glycol methacrylate, etc. having an ethylene oxide group; acrylamide, N,N-dimethylacrylamide, etc. having an amide group; alkylamino esters of acrylic acid or methacrylic acid such as N-methylaminoethyl methacrylate, N-methylaminoethyl acrylate, dimethylaminoethyl methacrylate, dimethylaminoethyl acrylate, dimthylaminoethyl methacrylate, diethylaminoethyl acrylate, etc. containing an amino group; unsaturated amides having an alkylamino group, such as N-(2-dimethylaminoethyl) acrylamide, N-(2-dimethylaminoethyl)methacrylamide, and N,N-dimethylaminopropylacrylamide, monovinylpyridines such as vinylpyridine, vinyl ethers having an alkylamino group, such as dimethylaminoethyl vinyl ether; vinylimidazoles, N-vinyl-2-pyrrolidone, and the like.

In order to satisfy the required properties such as fixability and abrasion resistance of recorded matters, water resistance, and solvent resistance, a hydrophobic monomer can be conveniently used. Namely, in the microencapsulated pigment of the invention, the pigment particles having an anionic group on the surface may comprise a repeating structural unit derived from a hydrophobic monomer in addition to a repeating structural unit derived from a cationically polymerizable surface active agent having a cationic group, a hydrophobic group and a polymerizable group and a repeating structural unit derived from an anionically polymerizable surface active agent having an anionic group, a hydrophobic group and a polymerizable group and/or a hydrophilic monomer having an anionic group.

The hydrophobic monomer has at least a hydrophobic group and a polymerizable group in the structure and the hydrophobic group can be exemplified by those selected from aliphatic hydrocarbon groups, alicyclic hydrocarbon groups, and aromatic hydrocarbon groups. The aliphatic hydrocarbon groups include a methyl group, an ethyl group, and a propyl group. The alicyclic hydrocarbon groups include a cyclohexyl group, a dicyclopentenyl group, and an isobornyl group. The aromatic hydrocarbon groups include a benzyl group, a phenyl group, and a naphthyl group.

The polymerizable group is a radically polymerizable unsaturated hydrocarbon group and is preferably selected from the group consisting of a vinyl group, an allyl group, an acryloyl group, a methacryloyl group, a propenyl group, a vinylidene group, and a vinylene group.

Examples of the hydrophobic monomers include monomers having a radically polymerizable group, e.g., styrene and styrene derivatives, such as methylstyrene, dimethylstyrene, chlorostyrene, dichlorostyrene, bromostyrene, p-chloromethylstyrene, and divinylbenzene; monofunctional acrylic esters, such as methyl acrylate, ethyl acrylate, n-butyl acrylate, butoxyethyl acrylate, benzyl acrylate, phenyl acrylate, phenoxyethyl acrylate, cyclohexyl acrylate, dicyclopentanyl acrylate, dicyclopentenyl acrylate, dicyclopentenyloxyethyl acrylate, tetrahydrofurfuryl acrylate, and isobornyl acrylate; monofunctional methacrylic esters, such as methyl methacrylate, ethyl methacrylate, n-butyl methacrylate, 2-ethylhexyl methacrylate, butoxymethyl methacrylate, benzyl methacrylate, phenyl methacrylate, phenoxyethyl methacrylate, cyclohexyl methacrylate, dicyclopentanyl methacrylate, dicyclopentenyl methacrylate, dicyclopentenyloxyethyl methacrylate, tetrahydrofurfuryl methacrylate, and isobornyl methacrylate; allyl compounds, such as allylbenzene, allyl-3-cyclohexane propionate, 1-allyl-3,4-dimethoxybenzene, allyl phenoxyacetate, allyl phenylacetate, allylcyclohexane, and polyvalent allyl carboxylates; esters of fumaric acid, maleic acid or itaconic acid; N-substituted maleimides, and cyclic olefins.

The hydrophobic monomer is suitably selected from those satisfying the above required properties and the amount thereof to be added is optionally determined.

Moreover, it is also preferable that the polymer coating the pigment particles further has a repeating structural unit derived from a crosslinkable monomer.

The use of the repeating structural unit derived from a crosslinkable monomer forms a crosslinked structure in the polymer and can improve solvent resistance (a property that a solvent contained in an ink jet recording ink hardly penetrates into the inside of the polymer coating the pigment).

When a solvent penetrates into the inside of the polymer coating the pigment, the polymer is swollen and deformed and the orientation state of the anionic groups of the pigment particles toward the aqueous medium is disturbed, so that dispersion stability of the microencapsulated pigment may sometimes decrease. In such a case, solvent resistance of the microencapsulated pigment is improved by forming a crosslinked structure in the polymer coating the pigment particles, and thus more excellent dispersion stability is achieved in an ink composition in which a water-soluble organic solvent coexists.

The crosslinkable monomer which can be used in the invention is a compound having two or more of at least one type of unsaturated hydrocarbon groups selected from a vinyl group, an allyl group, an acryloyl group, a methacryloyl group, a propenyl group, a vinylidene group or a vinylene group. Examples of the monomer include ethylene glycol diacrylate, diethylene glycol diacrylate, triethylene glycol diacrylate, tetraethylene glycol diacrylate, polyethylene glycol diacrylate, allyl acrylate, bis(acryloxyethyl)hydroxyethyl isocyanurate, bis(acryloxyneopentyl glycol) adipate, 1,3-butylene glycol diacrylate, 1,6-hexanediol diacrylate, neopentyl glycol diacrylate, propylene glycol diacrylate, polypropylene glycol diacrylate, 2-hydroxy-1,3-diacryloxypropane, 2,2-bis[4-(acryloxy)phenyl]propane, 2,2-bis[4-(acryloxyethoxy)phenyl]propane, 2,2-bis[4-(acryloxyethoxy-diethoxy)phenyl]propane, 2,2-bis[4-(acryloxyethoxy-polyethoxy)phenyl]propane, hydroxypivalic acid neopentyl glycol diacrylate, 1,4-butanediol diacrylate, dicyclopentanyl diacrylate, dipentaerythritol hexaacrylate, dipentaerythritol monohydroxypentaacrylate, ditrimethylolpropane tetraacrylate, pentaerythritol triacrylate, tetrabromobisphenol A diacrylate, triglycerol diacrylate, trimethylolpropane triacrylate, tris(acryloxyethyl) isocyanurate, ethylene glycol dimethacrylate, diethylene glycol dimethacrylate, triethylene glycol dimethacrylate, tetraethylene glycol dimethacrylate, polyethylene glycol dimethacrylate, propylene glycol dimethacrylate, polypropylene glycol dimethacrylate, 1,3-butylene glycol dimethacrylate, 1,4-butanediol dimethacrylate, 1,6-hexanediol dimethacrylate, neopentyl glycol dimethacrylate, 2-hydroxy-1,3-dimethacryloxypropane, 2,2-bis[4-(methacryloxy)phenyl]propane, 2,2-bis[4-(methacryloxyethoxy)phenyl]propane, 2,2-bis[4-(methacryloxyethoxydiethoxy)phenyl]propane, 2,2-bis[4-(methacryloxyethoxypolyethoxy)phenyl]propane, tetrabromobisphenol A dimethacrylate, dicyclopentanyl dimethacrylate, dipentaerythritol hexamethacrylate, glycerol dimethacrylate, hydroxypivalic acid neopentyl glycol dimethacrylate, dipentaerythritol monohydroxypentamethacrylate, ditrimethylolpropane tetramethacrylate, pentaerythritol trimethacrylate, pentaerythritol tetramethacrylate, triglycerol dimethacrylate, trimethylolpropane trimethacrylate, tris(methacryloxyethyl) isocyanurate, allyl methacrylate, divinylbenzene, diallyl phthalate, diallyl terephthalate, diallyl isophthalate, and diethylene glycol bisallyl carbonate.

Moreover, it is preferable that the polymer coating the pigment particles further has a repeating structural unit derived from a monomer represented by the following general formula (1):

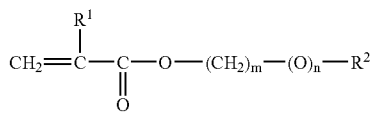

wherein $R^1$ represents a hydrogen atom or a methyl group, $R^2$ represents a t-butyl group, a alicyclic hydrocarbon group, an aromatic hydrocarbon group, or a heterocyclic group, m represent an integer of 0 to 3, and n represents an integer of 0 or 1.

The presence of a bulky group of the above $R^2$ group derived from the monomer represented by the general formula (1) in the polymer reduces flexibility of the polymer molecule, i.e., restrains movement of the molecule and hence improves mechanical strength and thermal resistance of the polymer, so that printed matters obtained with an ink using the microencapsulated pigment of the present embodiment which is coated by the polymer possess excellent abrasion resistance and durability. In addition, the presence of a bulky group of the above $R^2$ group in the polymer suppresses penetration of an organic solvent into the inside of the polymer and hence the microencapsulated pigment of the present embodiment becomes excellent in solvent resistance, so that more stable ejection, dispersibility, and long-term storage stability are achieved in an ink composition In the above general formula (1), the alicycli hydrocarbon group represented by $R^2$ include a cycloalkyl group, a cycloalkenyl group, an isobornyl group, a dicyclopentanyl group, a dicyclopentenyl group, an adamantane group, and a tetrahydrofuran group.

As mentioned above, the polymer comprising the repeating structural unit derived from the crosslinkable monomer and the polymer comprising the repeating structural unit derived from the monomer represented by the general formula (1) exhibit high Tg, and possess advantages of excellent thermal resistance and solvent resistance.

However, the microencapsulated pigment coated with such polymer exhibits insufficient plasticity of the polymer and thus tends to be difficult to adhere to a recording medium. As a result, fixability to the recording medium and abrasion resistance of the microencapsulated pigment sometimes decrease.

On the other hand, since a polymer comprising a repeating structural unit derived from a monomer having a long-chain alkyl group among the above hydrophobic monomers is flexible, a polymer having mechanical strength and solvent resistance without impairing plasticity can be formed by adjusting the ratio of the repeating structural unit derived from the crosslinkable monomer and/or the repeating structural unit derived from the monomer represented by the general formula (1) and the repeating structural unit derived from the monomer having a long-chain alkyl group. The microencapsulated pigment coated with such polymer easily adheres to a recording medium and is excellent in fixability and also solvent resistance. Therefore, an ink using the microencapsulated pigment achieves excellent ejection stability, dispersion stability, and long-term storage stability even in an ink composition in which a water-soluble organic solvent coexists. Moreover, a printed matter obtained with the ink using the microencapsulated pigment is satisfactory in fixability and also excellent in abrasion resistance, durability, and solvent resistance.

Specific examples of the monomer represented by the general formula (1) include the following.

Isobornyl methacrylate

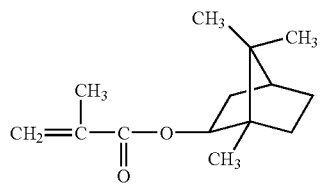

Weather resistance
Homopolymer Tg 155° C.
(180° C.)

Isobornyl acrylate

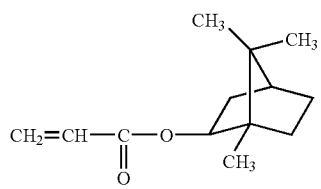

Weather resistance
Homopolymer Tg 94° C.

Dicyclopentenyl acrylate

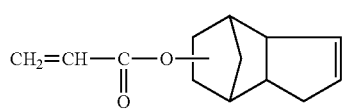

Imparting adhesiveness to acrylic resin
Homopolymer Tg 120° C.

-continued

Dicyclopentenyl methacrylate

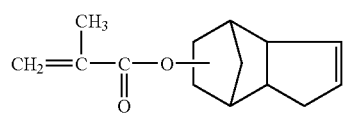

Chemical resistance

Dicyclopentenyloxyethyl acrylate

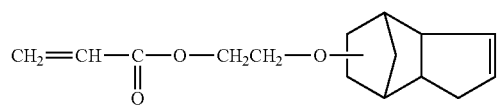

Imparting adhesiveness

Dicyclopentanyl acrylate

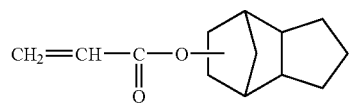

Low hygroscopicity
Weather resistance
Homopolymer Tg 120° C.

Dicyclopentenyloxyethyl methacrylate

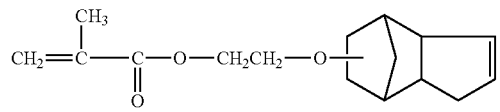

Chemical resistance

Dicyclopentanyl methacrylate

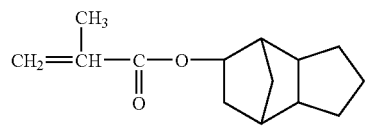

Low hygroscopicity
Weather resistant
Homopolymer Tg 175° C.

t-Butyl methacrylate

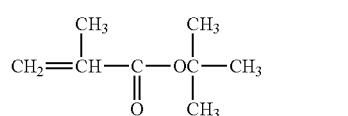

Homopolymer Tg 107° C.

Benzyl methacrylate

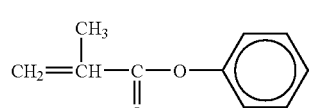

Homopolymer Tg 54° C.

Cyclohexyl methacrylate

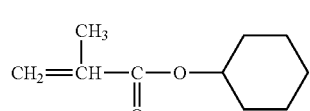

Homopolymer Tg 66° C.

Tetrahydrofurfuryl methacrylate

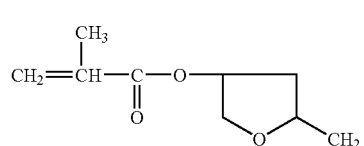

Homopolymer Tg 60° C.

The copolymerization of the cationically polymerizable surface active agent with the anionically polymerizable surface active agent and/or the hydrophilic monomer having an anionic group or the copolymerization of these compounds with the hydrophobic monomer, crosslinkable monomer, or monomer represented by the general formula (1) is preferably initiated by addition of a polymerization initiator. Preferred polymerization initiator is a water-soluble polymerization initiator, which includes potassium persulfate, ammonium persulfate, sodium persuflate, 2,2-azobis-(2-methylpropionamidine) dihydrochloride, and 4,4-azobis-(4-cyanovaleric acid).

The production of the microencapsulated pigment according to the invention can be conveniently carried out by adding the cationically polymerizable surface active agent having a cationic group, a hydrophobic group and a polymerizable group to an aqueous dispersion of pigment particles having an anionic group on the surface thereof as a hydrophilic group, mixing them with adding water or water and an aqueous solvent according to necessity, and treating the mixture by irradiation with an ultrasonic wave for a predetermined period of time, followed by adding the anionically polymerizable surface active agent and/or the hydrophilic monomer having an anionic group (in addition, the above hydrophobic monomer, crosslinkable monomer, or monomer represented by the general formula (1) may be added) and water according to necessity, treating again the mixture by irradiation with an ultrasonic wave for a predetermined period of time to disperse them, and adding a polymerization initiator and activating the initiator to carry out emulsion polymerization.

In the case of using the above hydrophobic monomer, more specifically, it can be conveniently produced by carrying out a process comprising:

a step of adding the cationically polymerizable surface active agent having a cationic group, a hydrophobic group and a polymerizable group to an aqueous dispersion of the pigment particles having an anionic group on the surface thereof, mixing them and treating the mixture by irradiation with an ultrasonic wave, a step of adding the hydrophobic monomer thereto and mixing it, a step of mixing the anionically polymerizable surface active agent having an anionic group, a hydrophobic group and a polymerizable group and/or the hydrophilic monomer having an anionic group, mixing them and treating the mixture by irradiation with an ultrasonic wave, and a step of adding a polymerization initiator and carrying out emulsion polymerization, the process being carried out in the above order of the steps.

In the case of using the above crosslinkable monomer or monomer represented by the above general formula (1), more specifically, it can be conveniently produced by carrying out a process comprising:

a step of adding the cationically polymerizable surface active agent having a cationic group, a hydrophobic group and a polymerizable group to an aqueous dispersion of the pigment particles having an anionic group on the surface thereof, mixing them and treating the mixture by irradiation with an ultrasonic wave, a step of adding the crosslinkable monomer and/or the monomer represented by the above general formula (1) thereto and mixing them, a step of mixing the anionically polymerizable surface active agent having an anionic group, a hydrophobic group and a polymerizable group and/or the hydrophilic monomer having an anionic group, mixing them and treating the mixture by irradiation with an ultrasonic wave, and a step of adding a polymerization initiator and carrying out emulsion polymerization, the process being carried out in the above order of the steps.

Furthermore, in the case of using the above crosslinkable monomer or monomer represented by the above general formula (1), more specifically, it can be conveniently produced by carrying out a process comprising:

a step of adding the cationically polymerizable surface active agent having a cationic group, a hydrophobic group and a polymerizable group to an aqueous dispersion of the pigment particles having an anionic group on the surface thereof, mixing them and treating the mixture by irradiation with an ultrasonic wave, a step of adding the crosslinkable monomer and/or the monomer represented by the above general formula (1) and the monomer having a long-chain alkyl group thereto and mixing them, a step of mixing the anionically polymerizable surface active agent having an anionic group, a hydrophobic group and a polymerizable group and/or the hydrophilic monomer having an anionic group, mixing them and treating the mixture by irradiation with an ultrasonic wave, and a step of adding a polymerization initiator and carrying out emulsion polymerization, the process being carried out in the above order of the steps.

According to the emulsion polymerization of the invention, the cationically polymerizable surface active agent is first adsorbed to the hydrophilic groups (especially, anionic group) of the pigment particle surface having an anionic group on the surface, then a hydrophobic monomer is added thereto, further the anionically polymerizable surface active agent and/or the hydrophilic monomer having an anionic group are added thereto, and the mixture was irradiated with an ultrasonic wave, whereby arrangement of the polymerizable surface active agents and monomers present around the pigment particles are highly controlled and a state that the anionic groups are oriented toward the aqueous phase is formed at the outermost shell. Then, by emulsion polymerization, the monomers are converted into a polymer with the highly controlled state to obtain the microencapsulated pigment according to the invention. According to the above method, formation of a water-soluble oligomer and polymer as by-products can be reduced. Thereby, viscosity of the dispersion of the resulting microencapsulated pigment can be reduced and a purification step such as ultrafiltration can be more easily conducted. An ink using such microencapsulated pigment is excellent in dispersion stability and ejection stability from a recording head and also a printed image with high color developability and high density can be obtained with a little blurring even on plain paper.

The polymerization is preferably carried out using a reaction vessel equipped with an ultrasonic generator, a stirrer, a reflux condenser, a dropping funnel, and a temperature controller.

The polymerization is initiated by elevating the temperature to the cleavage temperature of the water-soluble polymerization initiator added into the reaction system to generate initiator radicals, which attack the unsaturated group of the polymerizable surface active agents and the unsaturated groups of the monomers.

The addition of the polymerization initiator into the reaction system can be conveniently carried out by adding dropwise into a reaction vessel an aqueous solution obtained by dissolving a water-soluble polymerization initiator in pure water. The polymerization initiator in the reaction system can be conveniently activated by elevating the temperature of the aqueous dispersion to a predetermined polymerization temperature.

The polymerization temperature preferably ranges 60 to 90° C. and the polymerization time is preferably 3 to 10 hours. After completion of the polymerization, the reaction mixture is preferably adjusted to a pH of 7.0 to 9.0 and filtered. The filtration is preferably ultrafiltration.

In the case that the pigment particles having an anionic group on the surface as a hydrophilic group are not in the form of an aqueous dispersion, they are preferably subjected to a dispersion treatment as a pre-treatment using a general dispersing machine such as a ball mill, a roll mill, an Eiger mill or a jet mill.

In the microencapsulated pigment thus obtained according to the invention, since pigment particles having a small particle size are completely coated with a polymer layer (no defective part) and also it is considered that the hydrophilic groups of the polymer layer is regularly oriented toward the aqueous phase, the microencapsulated pigment has high dispersion stability to an aqueous solvent.

The microencapsulated pigment according to the invention is described in the above. The microencapsulated pigment preferably has a particle size of 400 nm or smaller, more preferably 300 nm or smaller, particularly preferably 20 to 200 nm.

Aqueous Dispersion

The aqueous dispersion according to an embodiment of the present invention contains the microencapsulated pigment according to the invention, and is preferably the liquid resulting from the emulsion polymerization as carried out according to the above embodiments of the invention. An ink jet recording ink according to an embodiment of the present invention can be produced by adding the other components for ink jet recording thereto according to a usual procedure.

The ink jet recording ink according to an embodiment of the invention is preferably formed by purifying the aqueous dispersion containing the microencapsulated pigment. The aqueous dispersion sometimes contains unreacted substances derived from the monomers used in addition to the microencapsulated pigment, i.e., unreacted substances derived from (a) the cationically polymerizable surface active agent, (b) the hydrophobic monomer, (c) the anionically polymerizable surface active agent and/or the hydrophilic monomer having an anionic group, and the like.

By reducing the content of the unreacted substances derived from the components constituting the coating polymer for the above microencapsulated pigment through such purification of the aqueous dispersion, the ink jet recording ink according to an embodiment of the invention can achieve higher image density (print density) with satisfactory chroma without decrease of chroma of images and also blurring of images is suppressed. Additionally, in the case of using a specifically designed medium for ink jet recording, especially a glossy medium for ink jet, satisfactory gloss is achieved. Particularly, when the glass transition point of the coating polymer for the above microencapsulated pigment is 30° C. or lower, more preferably 15° C. or lower, further preferably 10° C. or lower, the resulting ink has an advantage that images with more excellent glossiness, high chroma, and excellent sharpness are obtained.

The content of unreacted (c) anionically polymerizable surface active agent and/or the hydrophilic monomer having an anionic group in the aqueous dispersion after the purification is preferably 50,000 ppm or lower, more preferably 10,000 ppm or lower based on aqueous components.

The term "aqueous components" used herein means the components excluding water-insoluble components such as microencapsulated pigment and the like contained in the aqueous dispersion. For example, aqueous media, unreacted polymerizable surface active agents, unreacted monomers, and the like are included.

Moreover, the term "unreacted (c) anionically polymerizable surface active agent and/or hydrophilic monomer" means the compounds which do not contribute formation of the coating polymer of the microencapsulated pigment among (c) the anionically polymerizable surface active agent and/or the hydrophilic monomer added. Not only the anionically polymerizable surface active agent and/or the hydrophilic monomer as monomers but also oligomers and polymers formed by polymerization of the (anionically polymerizable surface active agent and/or the hydrophilic monomer are included in the unreacted compounds.

Among the components constituting the coating polymer of the microencapsulated pigment, particularly the (c) anionically polymerizable surface active agent and/or the hydrophilic monomer having an anionic group are preferably added in excess in order to stabilize the encapsulated particles before the polymerization as mentioned above. When (c) is added in excess, the content of unreacted (c) in the aqueous dispersion after the polymerization tends to increase. By controlling the content of the unreacted (c), the above advantage is presumed to become more remarkable.

Moreover, after purification of the aqueous dispersion containing the microencapsulated pigment, the total content of the unreacted (a) and (c) is preferably 50,000 ppm or lower, more preferably 10,000 ppm or lower based on the aqueous components. In this connection, the unreacted hydrophobic monomer is considered to be solubilized by the unreacted polymerizable surface active agents.

Furthermore, in the case that the microencapsulated pigment is formed by adding the (b) hydrophobic monomer in addition to the above polymerizable surface active agents and subjecting them to polymerization, the total content of the unreacted (a), (b), and (c) after the above purification is preferably 50,000 ppm or lower, more preferably 10,000 ppm or lower based on the aqueous components. In this connection, the unreacted hydrophobic monomer is considered to be solubilized by the unreacted polymerizable surface active agents.

The contents of the unreacted substances before the purification are preferably in the range of 5 to 40% by weight for (a), in the range of 5 to 40% by weight for (b), and in the range of 5 to 40% by weight for (c), respectively, based on individual charged amounts.

As a method for purifying the aqueous dispersion containing the microencapsulated pigment, centrifugation, ultrafiltration, or the like may be used.

Moreover, in the invention, the contents of the above (a), (b), and (c) in the aqueous dispersion can be measured by the following first method or second method.

First Method

In advance, spectroscopic properties of the cationically polymerizable surface active agent, the anionically polymerizable surface active agent, and the hydrophilic monomer having an anionic group are measured and a calibration curve of each substance is prepared based on the dissolved amount thereof in ion-exchanged water and the absorbance at a characteristic absorption wavelength. Then, an obtained aqueous dispersion of the microencapsulated pigment is subjected to centrifugation at 20,000 rounds for 30 minutes on a centrifugal machine and the resulting supernatant is diluted to a predetermined dilution rate (e.g., 100-fold). Absorbance of the diluted solution at 200 to 400 nm is measured on a spectrophotometer and an amount of each substance in the supernatant is determined based on the above calibration curve.

Moreover, with regard to the hydrophobic monomer, in advance, spectroscopic property of the hydrophobic monomer dissolved in an organic solvent such as n-hexane is measured and a calibration curve thereof is prepared based on the dissolved amount in an organic solvent such as n-hexane and the absorbance at a characteristic absorption wavelength. Then, an obtained aqueous dispersion of the microencapsulated pigment is mixed with an organic solvent such as n-hexane and the organic solvent phase is collected and diluted to a predetermined dilution rate (e.g., 100-fold). Absorbance of the diluted solution at 200 to 400 nm is measured on a spectrophotometer and an amount of the hydrophobic monomer extracted into the organic solvent such as n-hexane is determined based on the above calibration curve.

Second Method

In advance, by liquid chromatography of the cationically polymerizable surface active agent, the anionically polymerizable surface active agent, and the hydrophilic monomer dissolved in ion-exchanged water, a calibration curve of each substance is prepared based on the dissolved amount in ion-exchanged water and retention time thereof. Then, an obtained aqueous dispersion of the microencapsulated pigment is subjected to centrifugation at 20,000 rounds for 30 minutes on a centrifugal machine and the resulting supernatant is separated by liquid chromatography. A dissolved amount of each of the cationically polymerizable surface active agent, the anionically polymerizable surface active agent, and the hydrophilic monomer in the supernatant are determined based on retention volume at each retention time of the cationically polymerizable surface active agent, the anionically polymerizable surface active agent, and the hydrophilic monomer and the above calibration curve.

With regard to the hydrophobic monomer, in advance, by liquid chromatography of the hydrophobic monomer dissolved in an organic solvent such as n-hexane, a calibration curve thereof is prepared based on the dissolved amount in an organic solvent such as n-hexane and retention time thereof. Then, an obtained aqueous dispersion of the microencapsulated pigment is mixed with an organic solvent such as n-hexane and the organic solvent phase is collected, which is separated by liquid chromatography. An amount of the hydrophobic monomer extracted into the organic solvent such as n-hexane is determined based on retention volume at the retention time of the hydrophobic monomer and the above calibration curve.

Ink Jet Recording Ink

In an embodiment of the invention, the ink jet recording ink contains the aqueous dispersion as mentioned above.

In another embodiment, the ink jet recording ink contains at least the microencapsulated pigment of the invention and water. The microencapsulated pigment content is preferably 1 to 20% by weight, more preferably 3 to 15% by weight, based on the total weight of the ink jet recording ink. A content of 5 to 15% by weight is particularly recommended for achieving high print density and high color developability.

The solvent of the ink jet recording ink according to the invention preferably comprises water and a water-soluble organic solvent as a base solvent. If necessary, other any components may be incorporated.

The water-soluble organic solvent includes alkyl alcohols having 1 to 4 carbon atoms, such as ethanol, methanol, butanol, propanol, and 2-propanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether; formamide, acetamide, dimethyl sulfoxide, sorbitol, sorbitan, acetin, diacetin, triacetin, and sulfolane.

The ink jet recording ink according to the invention preferably contains a wetting agent composed of a high-boiling water-soluble organic solvent for the purpose of imparting water retentiveness and wetting property to the ink jet recording ink. Such a high-boiling water-soluble organic solvent includes a solvent having a boiling point of 180° C. or higher.

Specific examples of the water-soluble organic solvent having a boiling point of 180° C. or higher include ethylene glycol, propylene glycol, diethylene glycol, pentamethylene glycol, trimethylene glycol, 2-butene-1,4-diol, 2-ethyl-1,3-hexanediol, 2-methyl-2,4-pentanediol, tripropylene glycol monomethyl ether, dipropylene glycol monoethyl glycol, dipropylene glycol monoethyl ether, dipropylene glycol monomethyl ether, dipropylene glycol, triethylene glycol monomethyl ether, tetraethylene glycol, triethylene glycol, diethylene glycol monobutyl ether, diethylene glycol monoethyl ether, diethylene glycol monomethyl ether, tripropylene glycol, polyethylene glycols having molecular weights of 2000 or lower, 1,3-propylene glycol, isopropylene glycol, isobutylene glycol, 1,4-butanediol, 1,3-butanediol, 1,5-pentanediol, 1,6-hexanediol, glycerin, mesoerythritol, and pentaerythritol. Preferred are the organic solvents having boiling points of 200° C. or higher. They can be used either singly or as a mixture of two or more thereof. Use of the high-boiling organic solvent provides an ink jet recording ink which retains flowability and re-dispersibility for a long period of time even when the ink is left to stand in an open state (in contact with air at room temperature). Furthermore, clogging of nozzles hardly occurs during printing or on resuming printing after suspension and thus high ejection stability is achieved.

The content of the water-soluble organic solvent is preferably about 10 to 50% by weight, more preferably 10 to 30% by weight, based on the total weight of the ink jet recording ink.

Useful water-soluble organic solvents further include polar solvents such as 2-pyrrolidone, N-methylpyrrolidone, ε-caprolactam, dimethyl sulfoxide, sulfolane, morpholine, N-ethylmorpholine, and 1,3-dimethyl-2-imidazolidinone. One or more solvents may be selected from these polar solvents and used. Addition of the polar solvent is effective on dispersibility and brings about satisfactory ejection stability.

The content of the polar solvent is preferably 0.1 to 20% by weight, more preferably 1 to 10% by weight based on the total weight of the ink jet recording ink.

The ink jet recording ink according to the invention preferably contains a penetrant for the purpose of accelerating penetration of the aqueous solvent into recording media. Rapid penetration of the aqueous solvent into a recording medium assures formation of images with little blurring. As such a penetrant, an alkyl ether of polyhydric alcohol (also called glycol ethers) or a 1,2-alkanediol is preferably used. Specific examples of the alkyl ester of polyhydric alcohol include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl- 1 -methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether. Specific examples of the 1,2-alkanediol include 1,2-pentanediol and 1,2-hexanediol. In addition, the penetrant may also be suitably selected from straight-chain hydrocarbon diols such as 1,3-propanediol, 1,4-butanediol, 1,5-pentanediol, 1,6-hexanediol, 1,7-heptanediol, and 1,8-octanediol.

Particularly in an embodiment of the invention, preferred penetrants are propylene glycol monobutyl ether, dipropylene glycol monobutyl ether, diethylene glycol monobutyl ether, triethylene glycol monobutyl ether, 1,2-pentanediol, and 1,2-hexanediol. The content of the penetrant is preferably 1 to 20% by weight, more preferably 1 to 10% by weight, based on the total weight of the ink jet printing ink. Less than 1% of the content of the penetrant is substantially ineffective on penetrability. More than 20% of the content rather results in disadvantages such as blurring, decrease of print quality, or increased viscosity. Particularly, use of the 1,2-alkanediol, such as 1,2-pentanediol or 1,2-hexanediol, remarkably improves drying properties and blurring after printing.

Furthermore, incorporation of at least one compound selected from the group consisting of a polyhydric alcohol alkyl ether and a 1,2-alkanediol can enhance penetrability of ink solvent components into a recording medium, and hence, in cooperation with the effects of the micro encapsulated pigment, can bring about remarkably improved image quality with greatly reducing bluffing even when printing is conducted on plain paper or regenerated paper.

In the case of using the above glycol ethers, they are preferably used in combination with an acetylene glycol compound to be described below as a surface active agent.

Moreover, the ink jet recording ink according to an embodiment of the invention preferably contains a surface active agent, especially an anionic surface active agent and/or a nonionic surface active agent. Specific examples of the anionic surface active agent include sulfonic acid types, such as alkanesulfonate salts, α-olefinsulfonate salts, alkylbenzenesulfonate salts, alkylnaphthalenesulfonic acids, acylmethyltaurine acids, and dialkylsulfosuccinic acids; alkylsulfuric ester salts, sulfated oils, sulfated olefins, polyoxyethylene alkyl ether sulfuric ester salts; carboxylic acid types, such as fatty acid salts and alkylsarcosine salts; and phosphoric acid ester types, such as phosphoric alkyl ester salts, polyoxyethylene alkyl ether phosphoric ester salts, and glycerite phosphoric ester salts. Specific examples of the nonionic surface active agent include ethylene oxide adduct types, such as polyoxyethylene alkyl ethers, polyoxyethylene alkylphenyl ethers, polyoxyethylene alkyl esters, and polyoxyethylene alkylamides; polyol ester types, such as glycerin alkyl esters, sorbitan alkyl esters, and sugar alkyl esters; polyether types, such as polyhydric alcohol alkyl ethers; and alkanolamide types, such as alkanolamine fatty acid amides.

More specifically, examples of the anionic surface active agent include sodium dodecylbenzenesulfonate, sodium laurate, and a polyoxyethylene alkyl ether sulfate ammonium salt and examples of the nonionic surface active agent include ethers such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ethers, and polyoxyalkylene alkyl ethers; and polyoxyethylene oleic acid, esters such as polyoxyethylene oleate, polyoxyethylene distearate, sorbitan laurate, sorbitan monostearate, sorbitan mono-oleate, sorbitan sesquioleate, polyoxyethylene mono-oleate, and polyoxyethylene stearate.

It is still preferred for the ink jet recording ink of an embodiment of the invention to contain an acetylene glycol surface active agent and/or an acetylene alcohol surface active agent. Thereby, the penetrability of the aqueous solvent into recording media can be enhanced and printing with little blurring can be expected on various recording media.

A preferable specific example of the acetylene glycol compound for use in the invention includes a compound represented by the formula (6):

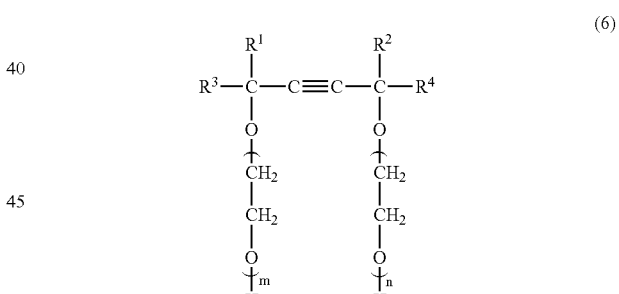

(6)

wherein m and n are numbers satisfying the relationship: $0<=m+n<=50$; and $R^1$, $R^2$, $R^3$, and $R^4$ represent each independently an alkyl group (preferably alkyl group having 6 or less carbon atoms).

Of the compounds represented by the above formula (6), particularly preferred are 2,4,7,9-tetramethyl-5-decyne-4,7-diol, 3,6-dimethyl-4-octyne-3,6-diol, and 3,5-dimethyl-1-hexyn-3-ol. Commercially available products as the acetylene glycol surface active agents can be utilized as the compounds represented by the above formula (6). Specific examples thereof include Surfynol series 104, 82, 465, 485 and TG (available from Air Products and Chemicals, Inc.) and Olfine STG and Olfine E1010 (Trade names, manufactured by Nisshin Chemical Industry Co., Ltd.)

The acetylene alcohol surface active agents include Surfynol 61 (available from Air Products and Chemicals, Inc.)

The content of these surface active agents are preferably 0.01 to 10% by weight, more preferably 0.1 to 5% by weight, based on the total weight of the ink jet recording ink.

In addition, the ink jet recording ink according to an embodiment of the invention may further contain polymer fine particles. Such polymer fine particles are preferably the following particles of 1) to 3).

1) Polymer fine particles having an anionic group on the surface, a glass transition temperature of 30° C. or lower, and a volume-average particle size of 10 to 200 nm.

2) Polymer fine particles having, on the surface, an anionic group the same as the anionic group on the surface of the microencapsulated pigment, a glass transition temperature of 30° C. or lower, and a volume-average particle size of 10 to 200 nm.

3) Polymer fine particles having an anionic group on the surface, a glass transition temperature of 30° C. or lower, and a volume-average particle size of 10 to 200 nm, and having such a reactivity with a bivalent metal salt that time required for decreasing the transmittance of the light having a wavelength of 700 nm to 50% of the initial value is $1 \times 10$ second or less when 3 parts by volume of 0.1% by weight aqueous emulsion of the polymer fine particles is brought into contact with 1 part by volume of 1 mol/L aqueous solution of the bivalent metal salt. In this case, the anionic group on the surface may be the same as or different from the anionic group on the surface of the microencapsulated pigment.

As mentioned above, the microencapsulated pigment coated with the polymer comprising a repeating structural unit derived from a crosslinkable monomer and/or a repeating structural unit derived from a monomer represented by the general formula (1) has high mechanical strength, thermal resistance, and solvent resistance, but the polymer has insufficient plasticity, so that fixability to recording media and abrasion resistance tend to decrease. However, in an ink jet recording ink containing a microencapsulated pigment coated with such polymer having insufficient plasticity and the polymer fine particles, when the polymer fine particles has a film-forming property, the microencapsulated pigment can be coated with the polymer fine particles on recording media. Accordingly, in the particular case that the polymer for coating the pigment has a crosslinked structure and/or a "bulky" group, the resulting ink jet recording ink can possess both of the advantages owing to the above crosslinked structure and/or the "bulky" group and fixability and abrasion resistance.

The term "film-forming property" used herein means that an aqueous emulsion obtained by dispersing the polymer fine particles in water forms a polymer film when the water component of the aqueous emulsion is evaporated. The ink composition of the invention containing the polymer fine particles also has a property of forming a polymer film when the solvent component is evaporated. By the polymer film, the microencapsulated pigment in the ink can be more strongly fixed to the surface of recording media. Thereby, images having more excellent abrasion resistance and water resistance can be realized.

In order that the polymer fine particles have the film-forming property, the glass transition point of the polymer fine particles is preferably 30° C. or lower, more preferably 15° C. or lower, further preferably 10° C. or lower. When images are printed out on a recording medium such as plain paper or a specifically designed medium for ink jet recording with an ink using the microencapsulated pigment of the invention containing the polymer fine particles, an aqueous media (composed of water and/or a water-soluble organic solvent) surrounding the microencapsulated pigment particles of the invention and the polymer fine particles penetrates the recording medium such as plain paper or a specifically designed medium for ink jet recording and is removed from the vicinity of these particles, thereby the particles come close to each other, where the polymer fine particles and/or the coating polymer for the pigment particles of the microencapsulated pigment and/or the polymer fine particles and the coating polymer for the pigment particles of the microencapsulated pigment are fused together to form a film in the state that the pigment particles are wrapped inside the film, so that fixability and abrasion resistance of images can be made particularly satisfactory. The polymer fine particles are preferably designed so that the glass transition point of the polymer is 30° C. or lower, more preferably 15° C. or lower, further preferably 10° C. or lower. The glass transition point of the polymer can be within the above range by suitably selecting the kind and composition ratio of the monomer to be used. Particularly, in the case of using a specifically designed medium for ink jet recording, when the glass transition point of the coating polymer for the above microencapsulated pigment is 30° C. or lower, more preferably 15° C. or lower, further preferably 10° C. or lower, the resulting ink has an advantage that images with more excellent glossiness, high chroma, and excellent sharpness are obtained.

In the case that a printed matter can be heated to the temperature equal to or higher than the glass transition point of the polymer constituting the polymer fine particles, since film formation is possible as far as the glass transition point is equal to or lower than the heating temperature, the glass transition temperature may be higher than 30° C. In this case, however, it is necessary to attach a heating device to an ink jet recording apparatus and hence there arises a problem that cost of the apparatus increases, so that the glass transition temperature is preferably 30° C. or lower.

In the invention, the glass transition point of the polymer of the polymer fine particles is determined by a temperature-elevating measurement on a differential scanning calorimeter (DSC), though it is also determined from modulus of elasticity, specific heat, and index of refraction. Namely, an intersection point of a tangent line drawn from the bottom part of an endothermic peak toward an initial point of endothermic behavior with the baseline in the differential thermal analysis curve obtained by a temperature-elevating measurement on a differential scanning calorimeter is determined as the glass transition point.

Moreover, according to a preferred embodiment of the invention, the polymer fine particles has preferably a lowest film-forming temperature of room temperature or lower, more preferably 30° C. or lower, most preferably 10° C. or lower. This is because the polymer fine particles are preferably formed at room temperature or lower. The lowest film-forming temperature means the lowest temperature at which a clear continuous film is formed when a polymer emulsion obtained by dispersing the polymer fine particles in water is thinly casted on a metal plate such as aluminum and is warmed. A white powdery product may be formed in the temperature range lower than the lowest film-forming temperature. Furthermore, according to a preferred embodiment of the invention, the glass transition point of the polymer fine particles is preferably 30° C. or lower.

Moreover, since the above polymer fine particles have an anionic group on the surface, they can be dispersed stably without aggregation even when they are present together with the microencapsulated pigment of the invention in the ink.

In addition, the above polymer fine particles have such a reactivity with a bivalent metal salt that time required for decreasing the transmittance of the light having a wavelength of 700 nm to 50% of the initial value is $1\times10^4$ second or less when 3 parts by volume of 0.1% by weight aqueous emulsion of the polymer fine particles is brought into contact with 1 part by volume of 1 mol/l aqueous solution of the bivalent metal salt, and hence the particles have a large number of the anionic group on the surface of the polymer fine particles, so that the polymer fine particles are advantageous in view of their satisfactory dispersion stability even when they are present together with the microencapsulated pigment of the invention in the ink.

At that time, when the above time is more than $1\times10^4$ second, the amount of the anionic group on the surface of the polymer fine particles is small and thus dispersion stability tends to be inferior when they are present together with the microencapsulated pigment of the invention in the ink.

Time required for decreasing the transmittance of the light having a wavelength of 700 nm to 50% of the initial value when the polymer fine particles is brought into contact with 1 part by volume of 1 mol/l aqueous solution of the bivalent metal salt is preferably $1\times10^3$ second or less, more preferably $1\times10^2$ second or less.

The polymer fine particles for use in the embodiment of the invention react with the bivalent metal ion when they come into contact therewith to form floating products, whereby transparency of the solution decreases. The amount of the floating products is measured by light transmittance. The bivalent metal ion herein includes $Ca^{2+}$, $Cu^{2+}$, $Ni^{2+}$, $Mg^{2+}$, $Zn^{2+}$ and $Ba^{2+}$, and an anion forming a salt therewith includes $Cl^-$, $NO^{3-}$, $I^-$, $Br^-$, $ClO^{3-}$, and $CH_3COO^-$.

Such high reactivity seems to be attributed to the presence of a number of anionic groups on the surface of the polymer fine particles. An ink comprising polymer fine particles having a number of anionic groups on the surface, which exhibit such high reactivity as above has no affinity to the nozzle plate of a water repellency-imparted ink jet recording head. Therefore, the ink does not wet the nozzle plate and, as a result, has a large advantage that occurrence of deviated flight and defective injection of ink droplets is effectively prevented. The above anionic group includes a sulfonic acid group, a sulfinic acid group, a carboxyl group, and a carbonyl group. Particularly, in the case that the above anionic group is the same as the anionic group on the microencapsulated pigment surface, the ink is excellent when the above polymer fine particles are present in the ink together with the microencapsulated pigment of the invention.

The particle size of the above polymer fine particles is preferably in the range of 50 to 200 nm in volume-average particle size. When the volume-average particle size is more than 200 nm, ejection of the ink tends to be unstable.

In addition, according to a preferable embodiment of the invention, contact angle of the aqueous emulsion obtained by dispersing the polymer fine particles in a water medium in a concentration of 10% by weight is preferably 70° or higher. Furthermore, surface tension of the aqueous emulsion obtained by dispersing the polymer fine particles in a water medium in a concentration of 35% by weight is preferably $40\times10^{-3}$ N/m (40 dyne/cm, 20° C.) or more. By utilizing such polymer fine particles, deviated flight can be further prevented and satisfactory printing is enabled.

Furthermore, utilization of the polymer fine particles having a relatively large amount of anionic groups as mentioned above realizes more satisfactory abrasion resistance and water resistance. The reason therefor is not clear but may be considered as follows. That is, when the ink composition according to the invention is attached to the surface of a recording medium such as paper, water and the water-soluble organic solvent first penetrate the recording medium and the microencapsulated pigment of the invention and polymer fine particles are left in the vicinity of the surface of the recording medium. At that time, the anionic groups on the surface of the polymer fine particles react with the hydroxyl groups and carboxyl groups of cellulose constituting the paper fibers and thereby the polymer fine particles are strongly adsorbed to the paper fibers. Water and the water-soluble organic solvent in the vicinity of the polymer fine particles adsorbed to the paper fibers penetrate into the paper and decrease. As mentioned above, in the images obtained using the ink composition, since the polymer fine particles have film-forming property, the particles themselves are combined each other and the polymer is fused so as to wrap the microencapsulated pigment of the invention when water and the water-soluble organic solvent disappear from the vicinity of the microencapsulated pigment of the invention and the polymer fine particles, whereby the pigment particles form a state that they are coated with the polymer. The polymer film is more strongly fixed to the surface of the recording medium by the presence of the anionic groups. The above explanation is a mere assumption and thus the invention is not limited by the above explanation.

In addition, the ink composition of the invention using such polymer fine particles also has an advantage that excellent storage stability is achieved without deterioration of the performance of the microencapsulated pigment of the invention owing to the high hydrophilicity of the surface of the polymer fine particles.

According to a preferred embodiment of the invention, the polymer fine particles comprises a structure derived from an unsaturated vinyl monomer having an anionic group in an amount of 1 to 10% by weight and also has a structure crosslinked by a crosslinkable monomer having two or more polymerizable double bonds, the structure derived from the crosslinkable monomer being contained in an amount of 0.2 to 4% by weight. By utilizing a crosslinked polymer obtained by three-dimensional crosslinking through copolymerization of a crosslinkable monomer having two or more, more preferably three or more polymerizable double bonds in the polymerization, the surface of the nozzle plate becomes less wettable with an ink composition, so that deviated flight can be more effectively prevented and ejection stability can be more effectively improved.

In the invention, as the polymer fine particles, those having a monoparticle structure can be utilized. On the other hand, it is also possible to utilize polymer fine particles having a core-shell structure composed of a core part and a shell part surrounding the same. In the invention, the "core-shell structure" means a "form where two or more polymers having different compositions are present in a particle in a phase-separated state. Therefore, the structure may be not only a form where the core part is completely coated with the shell part but also a form where part of the core part is coated therewith. Moreover, part of the shell part polymer may form domains within the core particles. Furthermore, the polymer fine particles may have a multilayer structure having three or more layers containing a further layer having a different composition between the core part and the shell part.

The polymer fine particles for use in the invention can be obtained by known emulsion polymerization. That is, the particles can be obtained by emulsion polymerization of an unsaturated vinyl monomer in water in the presence of a polymerization initiator and an emulsifier.

The unsaturated vinyl monomer includes acrylic ester monomers, methacrylic ester monomers, aromatic vinyl monomers, vinyl ester monomers, vinyl cyan compound monomers, halogenated monomers, olefin monomers, and diene monomers. Specific examples thereof include acrylic esters such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, and glycidyl acrylate; methacrylic esters such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, and glycidyl methacrylate; vinyl esters such as vinyl acetate; vinyl cyan compounds such as acrylonitrile and methacrylonitrile; halogenated monomers such as vinylidene chloride and vinyl chloride; aromatic vinyl monomers such as styrene, 2-methylstyrene, vinyltoluene, t-butylstyrene, chlorostyrene, vinylanisole, and vinylnaphthalene; olefins such as ethylene, propylene, and isopropylene; dienes such as butadiene and chloroprene; vinyl monomers such as vinyl ether, vinyl ketone, and vinylpyrrolidone. For the monomer having no carboxyl group, an unsaturated monomer having an unsaturated vinyl monomer having a carboxyl group is necessarily utilized. Preferred examples thereof include acrylic acid, methacrylic acid, itaconic acid, fumaric acid, and maleic acid, and it is preferred to use methacrylic acid. Moreover, the emulsifier usable includes an anionic surface active agent, a nonionic surface active agent, and a mixture thereof.

In addition, as mentioned above, it is preferred in the invention to have a structure where a molecule derived from the above monomer is crosslinked by a crosslinkable monomer having two or more polymerizable double bonds. Examples of the crosslinkable monomer having two or more polymerizable double bonds include diacrylate compounds such as polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, 2,2'-bis (4-acryloxydiethoxyphenyl) propane, 2,2-bis[4-(acryloxyethoxy-diethoxy)phenyl]propane, and 2,2-bis[4-(acryloxyethoxy-polyethoxy)phenyl]propane; triacrylate compounds such as trimethylolpropane triacrylate, trimethylolethane triacrylate, and tetramethylolmethane triacrylate; tetraacrylate compounds such as ditrimethylol tetraacrylate, tetramethylolmethane tetraacrylate, and pentaerythritol tetraacrylate; hexaacrylate compounds such as dipentaerythritol hexaacrylate; dimethacrylate compounds such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, and 2,2'-bis(4-methacryloxydiethoxyphenyl)propane; trimethacrylate compounds such as trimethylolpropane trimethacrylate and trimethylolethane trimethacrylate; methylene-bis-acrylamide, and divinylbenzene.

Furthermore, in addition to the above monomers, printing stability can be further improved by adding an acrylamide or a hydroxyl group-containing monomer. Examples of the acrylamide include acrylamide and N,N'-demethylacrylamide. Also, examples of the hydroxyl group-containing monomer include 20hydroxyethyl acylate, e-hydroxyethylpropyl acrylate, 2-hydroxyethyl methacrylate, and 2-hydroxypropyl methacrylate, and these compounds may be used singly or as a mixture of two or more thereof.

Moreover, the polymer fine particles having a core-shell structure is produced by known methods, generally a multistep emulsion polymerization. For example, the particles can be produced by the method disclosed in JP-A-4-76004. Examples of the unsaturated vinyl monomer for use in the polymerization include the same monomers as mentioned above.

In addition, the polymerization initiator, surface active agent (surfactant), molecular weight regulator, and neutralizing agent for use in the emulsion polymerization may be used in accordance with usual manners.

In the invention, the polymer fine particles may be mixed with other components of the ink composition as a fine particle powder, but preferably, the polymer fine particles is dispersed in a water medium to form a polymer emulsion, which is then mixed with other component of the ink composition. The content of the polymer fine particles in the ink composition is preferably about 0.01 to 10% by weight, more preferably about 0.01 to 5% by weight.

According to another embodiment of the invention, the invention provides polymer fine particles or a polymer emulsion obtained by dispersing the polymer fine particles in water, which is used in an ink composition for ink jet recording. By utilizing the polymer fine particles and the polymer emulsion, an ink composition exhibiting satisfactory performance is obtained, the composition being preferably used in an ink jet recording method.

The ink jet recording ink according to the invention can contain a pH adjuster and the pH is preferably adjusted in the range of 7 to 9, more preferably in the range of 7.5 to 8.5.

Preferable pH adjusters include specifically alkali metal compounds such as sodium hydroxide, potassium hydroxide, lithium hydroxide, sodium carbonate, sodium hydrogen carbonate, potassium carbonate, lithium carbonate, sodium phosphate, potassium phosphate, lithium phosphate, potassium dihydrogen phosphate, dipotassium hydrogen phosphate, sodium oxalate, potassium oxalate, lithium oxalate, sodium borate, sodium tetraborate, potassium hydrogen phthalate, and potassium hydrogen tartrate; ammonia; and amines such as methylamine, ethylamine, diethylamine, trimethylamine, triethylamine, tris(hydroxymethyl)aminomethane hydrochloride, triethanolamine, diethanolamine, diethylethanolamine, triisopropenolamine, butyldiethanolamine, morpholine, and propanolamine.

Among them, addition of an alkali metal hydroxide or an amine alcohol can improve dispersion stability of the pigment particles.

The amount of the alkali metal hydroxide to be added is preferably 0.01 to 5% by weight, more preferably 0.05 to 3% by weight, based on the total amount of ink.

The amount of the amine alcohol to be added is preferably 0.1 to 10% by weight, more preferably 0.5 to 5% by weight, based on the total amount of ink.

The ink jet recording ink according to the invention may contain, for antifungal, antiseptic, and rustproofing purposes, benzoic acid, dichlorophene, hexachlorophene, sorbic acid, p-hydroxybenzoic esters, ethylenediaminetetraacetic acid (EDTA), sodium dehydroacetate, 1,2-benthiazolin-3- one (trade name: Proxel manufactured by Avecia), 3,4-isothiazolin-3-one, and 4,4-dimethyloxazolidine.

The ink jet recording ink according to the invention may contain urea, thiourea and/or ethylene urea for the purpose of preventing the ink from drying at nozzles of a recording head.

A particularly preferred ink jet recording ink according to an embodiment of the invention comprises at least:
(1) the micro encapsulated pigment according to the present invention,
(2) at least one compound (penetrant) selected from the group consisting of diethylene glycol monobutyl ether, triethylene glycol monobutyl ether, and a 1,2-alkanediol having 4 to 10 carbon atoms,
(4) glycerin, and
(5) water.

The above ink jet recording ink is particularly excellent in dispersion stability and ejection stability and assures stable printing without causing nozzle clogging for a prolonged period of time. It has satisfactory drying properties after printed to form high-quality images with high print density and excellent color developability and with no blurring on recording media such as plain paper, regenerated paper and coated paper.

A particularly preferred ink jet recording ink according to another embodiment of the invention comprises at least:
(1) the microencapsulated pigment according to the present invention,
(2) at least one compound (penetrant) selected from the group consisting of diethylene glycol monobutyl ether, triethylene glycol monobutyl ether, and a 1,2-alkanediol having 4 to 10 carbon atoms,
(3) an acetylene glycol surface active agent and/or an acetylene alcohol surface active agent,
(4) glycerin, and
(5) water.

The above ink jet recording ink is particularly excellent in dispersion stability and ejection stability and assures stable printing without causing nozzle clogging for a prolonged period of time. It has satisfactory drying properties after printed to form high-quality images with high print density and excellent color developability and with little blurring on recording media such as plain paper, regenerated paper and coated paper.

In general, in the dispersion of a pigment, a dispersant such as a surface active agent or a polymeric dispersant is used. However, because these dispersants are simply adsorbed on the pigment particle surface, they are liable to separate from the pigment particle surface by some environmental factors. To the contrary, in the embodiments of the present invention, as mentioned above, the surface of the pigment particles having a hydrophilic group on the surface is completely encapsulated with the polymer film or crosslinked polymer film and the polymer film or crosslinked polymer film is very strongly fixed onto the pigment particle surface, so that the film may hardly come off the pigment particle surface.

More specifically, in the case of inks comprising a pigment dispersion prepared by dispersing the pigment using a dispersant such as a surface active agent or a polymeric dispersant and, for improving penetrability, further comprising the above acetylene glycol surface active agent and/or the acetylene alcohol surface active agent and a penetrant such as diethylene glycol monobutyl ether, triethylene glycol monobutyl ether, propylene glycol monobutyl ether, dipropylene glycol monobutyl ether or a 1,2-alkanediol, the dispersant is easily released from the pigment surface due to the strong shear force imposed at the ejection of the ink through fine nozzles, which tends to result in decrease of dispersion stability and cause instable ejection.

Such a phenomenon is not at all observed with the ink jet recording ink of the invention, which is stably ejected. Since the polymer film encapsulates the pigment particles to exhibit satisfactory solvent resistance, the above acceleration of separation of the polymer from the pigment particles or swelling of the polymer induced by the penetrant hardly occur and thus the ink of the invention therefore maintains excellent dispersion stability for a prolonged period of time.

Furthermore, the ink compositions containing a pigment dispersion prepared by dispersing pigment particles using a dispersant such as a surface active agent or a polymeric dispersant and having improved penetrability generally tend to have an increased viscosity on account of the existence of a free dispersant which has failed to be adsorbed by the pigment particles in the very beginning of dispersion and is dissolved in the ink solvent or which has separated from the pigment later. The amount of the pigment that is allowed to exist in inks is therefore limited in many cases. As a result, these ink compositions often fail to provide images with sufficient print density and satisfactory color developability particularly on plain paper or regenerated paper. The ink composition of the invention using the microencapsulated pigment enjoys no viscosity increase because the polymer film is difficult to come off the pigment particles owing to the encapsulation of pigment particles with the polymer film as mentioned above. Therefore, the ink composition has advantages that it is easy to lower the viscosity and it is possible to contain an increased amount of pigment, leading to obtaining sufficient print densities on plain paper or regenerated paper.

In the particularly preferred embodiment of the invention mentioned above, the amount of diethylene glycol monobutyl ether or triethylene glycol monobutyl ether to be added as a penetrant of the component (2) is preferably 10% by weight or less, more preferably 0.5 to 5% by weight, based on the total weight of the ink composition. Addition of diethylene glycol monobutyl ether or triethylene glycol monobutyl ether produces remarkable effects on ink penetrability, which is useful for improving print quality. Addition of diethylene glycol monobutyl ether and/or triethylene glycol monobutyl ether improves solubility of the acetylene glycol surface active agent.

In the particularly preferred embodiment of the invention mentioned above, the amount of the 1,2-alkanediol having 4 to 10 carbon atoms to be added as a penetrant of the component (2) is preferably 15% by weight or less based on the total weight of the ink composition. 1,2-Alkanediol having 3 or fewer carbon atoms are not so effective, and 1,2-alkanediol having 15 or more carbon atoms hardly dissolves in water, both cases being not preferred. Addition of more than 15% by weight tends to result in increase of viscosity. Specifically, 1,2-pentanediol or 1,2-hexanediol is preferably used and these compounds can be used singly or in combination. 1,2-Pentanediol is preferably added in an amount of 3 to 15% by weight. Less than 3% fails to secure satisfactory penetrability. 1,2-Hexanediol is preferably added in an amount of 0.5 to 10% by weight. Less than 0.5% fails to obtain satisfactory penetrability.

In order to improve property of little clogging (reliability against clogging), it is preferred for the ink jet recording ink of the invention to contain a solid wetting agent in an amount of 3 to 20% by weight based on the total weight of the ink composition.

The term "solid wetting agent" as used herein means a water-soluble substance which has a water-retaining function and is solid at ambient temperature (25° C.). Preferred solid wetting agents include saccharides, sugar alcohols, hyaluronic acid salts, trimethylolpropane, and 1,2,6-hexanetriol. The saccharides include monosaccharides, disaccharides, oligosaccharides (including trisaccharides and tetrasaccharides), and polysaccharides. Preferred examples of the saccharides include glucose, mannose, fructose, ribose, xylose, arabinose, galactose, aldonic acids, glucitol (sorbitol), maltose, cellobiose, lactose, sucrose, trehalose, and maltotriose. The term "polysaccharide" as used herein is intended to mean saccharide in its broad sense and to include substances widely occurring in nature such as alginic acid, α-cyclodextrin, and cellulose. The saccharide derivatives include reduced sugars of the above saccharides, such as sugar alcohols represented by the general formula: $HOCH_2(CHOH)_nCH_2OH$, where n is an integer of 2 to 5), oxidized sugars such as aldonic acids and uronic acids, amino acid, and thiosugars. Particularly, sugar alcohols are preferred. Specific examples thereof include maltitol, sorbitol, and xylitol. As the hyaluronic acid salt, a commercially available 1% aqueous solution of sodium hyaluronate (molecular weight: 350,000) can be used. These solid wetting agents can be used either singly or as a mixture of two or more thereof. Particularly preferred solid wetting agents are trimethylolpropane, 1,2,6-hexanetriol, saccharides, and sugar alcohols.

Since use of the solid wetting agent suppresses water evaporation owing to the water retaining function, viscosity of the ink does not increase in the ink flow passageways or near the nozzles and also film is hardly formed. As a result, the ink hardly clogs. Also, since the above solid wetting agents are chemically stable, they do not decompose in ink and retain the performance for a long time. Furthermore, addition of the solid wetting agent does not make the ink wet the nozzle plate and therefore stable ejection can be achieved. Particularly, use of trimethylolpropane, 1,2,6-hexanetriol, saccharides, and sugar alcohol is preferred.

In the invention, the content of the solid wetting agent is preferably 3 to 20% by weight, more preferably 3 to 10% by weight, based on the total weight of the ink composition for ink jet recording. In the case that two or more solid wetting agents are used in combination, the total amount thereof is preferably 3 to 20% by weight, more preferably 3 to 10% by weight, based on the total weight of the ink composition for ink jet recording. In the case that two or more solid wetting agents are used in combination, preferred combinations are those of the group of saccharides, sugar alcohols, and hyaluronic acids and the group of trimethylolpropane and 1,2,6-hexanetriol. The combinations are preferable because it is possible to suppress the increase of ink viscosity that may have resulted from addition of the solid wetting agent. When the content of the solid wetting agent is less than 3% by weight, an insufficient effect on clogging prevention is not obtained. When it is more than 20%, adverse effects of increased viscosity and difficulty of obtaining stable ejection tend to occur.

In the above particularly preferred embodiment of the invention, the amount of the acetylene glycol surface active agent and/or the acetylene alcohol surface active agent of the above (3) to be added is preferably 0.01 to 10% by weight, more preferably 0.1 to 5% by weight, based on the total weight of the ink.

The ink jet recording ink according to the invention is described in the above. Since the microencapsulated pigment used as a colorant in the ink jet recording ink according to the invention has a truly spherical shape as mentioned above, the ink easily exhibit Newtonian behavior. Furthermore, it is considered that the anionic groups on the surface are regularly and densely orientated toward the aqueous solvent, which would result in effective electrostatic repulsive force. Therefore, it is possible to prepare an ink jet recording ink having excellent ejection stability, high dispersibility, and excellent dispersion stability and also having an increased colorant content, as compared with the conventional microencapsulated pigment inks.

Ink jet recording is conveniently carried out by loading a known ink jet printer with the ink jet recording ink according to the invention and printing on plain paper or other ink jet recording media. Thereby, excellent ejection stability of the ink from the recording head can be achieved and also recorded matters having images with excellent fastness, abrasion resistance, and satisfactory color developability, high print density of the images, and little blurring of the image can be obtained. Even when plain paper is used as a recording medium, the ink hardly blurs and exhibits high color developability of images.

EXAMPLES

The present invention will be illustrated in greater detail with reference to the following Examples and Comparative Examples, but the invention should not be construed as being limited thereto.

In Examples and Comparative Examples, "the amounts of hydrophilic groups introduced on the surface of pigment particles" shown below were determined by the following method.

Quantitative Determination of Amount of Anionic Groups Introduced

<Case of Introducing Anionic Group with Sulfonating Agent>

Pigment particles having been surface treated with a sulfonating agent was treated according to the oxygen flask combustion method, followed by absorption into a 0.3% aqueous hydrogen peroxide solution. The sulfate ion (bivalent) was quantitatively determined by ion chromatography (Model 2000i; Dionex Corp.), and the value was calculated in terms of a sulfonic acid group and expressed by molar amount per gram of the pigment (mmol/g).

<Case of Introducing Anionic Group with Carboxylating Agent>

The Zeisel method was used as a method for the determination. Diazomethane was dissolved in an appropriate solvent and the resulting solution was added dropwise to convert all the active hydrogens on the surface of pigment particles to methyl groups. Hydroiodic acid having a specific gravity of 1.7 was added to the thus treated pigment, followed by heating to convert methyl groups into methyl iodide, which was vaporized. The methyl iodide vapor was trapped in a silver nitrate solution and precipitated as silver iodide. The amount of the original methyl group, i.e., active hydrogen was calculated from the weight of the silver iodide and expressed by molar amount per gram of the pigment (mmol/g).

Preparation of Black Pigment Particles Having Anionic Group on Surface "P1"

Fifteen parts of carbon black (MA-7, manufactured by Mitsubishi Chemical Corp.) were mixed with 200 parts of sulfolane and dispersed in Eiger Motor Mill M250 (manufactured by Eiger Japan) under conditions of a bead loading of 70% and a rotation speed of 5000 rpm for 1 hour. The mixed liquid of the dispersed pigment paste and the solvent was transferred to an evaporator, where it was heated to 120° C. under a reduced pressure of 30 mmHg or lower to remove as much water present in the system as possible and the temperature was then controlled at 150° C. Thereafter, 25 parts of sulfur trioxide was added and allowed to react for 6 hours. After completion of the reaction, the reaction mixture was washed several times with excess sulfolane and poured into water. Filtration yielded black pigment particles "P1".

The amount of the anionic group introduced on the black pigment particles "P1" was found to be 0.12 mmol/g.

Preparation of Black Pigment Particles Having Anionic Group on Surface "P2"

Three hundred grams of commercially available acidic carbon black (MA-100, Mitsubishi Chemical Corp.) was mixed well with 1000 ml of water, and 450 g of sodium hypochlorite (effective chlorine concentration: 12%) was added thereto dropwise, followed by stirring at 80° C. for 15 hours. The resulting slurry was filtered through filter paper (Toyo Roshi No. 2) with repetition of washing with ion-exchanged water. The repeated washing was carried out until addition of a 0.1N aqueous silver nitrate solution to a filtrate no longer caused turbidity. The resulting pigment slurry was re-dispersed in 2500 ml of water and desalted through a reverse osmosis membrane until the conductivity of the desalted product was decreased to 0.2 microsiemens or lower. The dispersion was further concentrated to give a pigment concentration of about 15% by weight.

The surface-treated pigment dispersion was treated with an aqueous hydrochloric acid solution, concentrated, dried, and pulverized to a powder. The amount of an anionic group (carboxylate anionic group) introduced on the black pigment particles "P2" was found to be 2.8 mmol/g.

Preparation of Cyan Pigment Particles Having Anionic Group on Surface "P3"

Twenty parts of phthalocyanine pigment (C.I. Pigment Blue 15:3) were mixed with 500 parts of quinoline in Eiger Motor Mill M250 (manufactured by Eiger Japan) under conditions of a bead loading of 70% and a rotation speed of 5000 rpm for 2 hours. The mixed liquid of the dispersed pigment paste and the solvent was transferred to an evaporator, where the mixture was heated to 120° C. under a reduced pressure of 30 mmHg or lower to remove as much water present in the system as possible. The temperature was maintained at 160° C., and 20 parts of a sulfonated pyridine complex was added and allowed to react for 8 hours. After completion of the reaction, the reaction mixture was washed several times with excess quinoline and poured into water. Filtration yielded cyan pigment particles having a hydrophilic group anionic group) on the surface "P3".

The amount of the anionic group introduced on the resulting cyan pigment particles "P3" was found to be 0.04 mmol/g.

Preparation of Yellow Pigment Particles Having Anionic Group on Surface "P4"

Yellow pigment particles having an anionic group on the surface "P4" were obtained in the same manner as in the preparation of the cyan pigment particles having an anionic group on the surface "P3", except for replacing 20 parts of the phthalocyanine pigment (C.I. Pigment Blue 15:3) with 20 parts of an isoindolinone pigment (C.I. Pigment Yellow 110).

The amount of the anionic group introduced on the resulting yellow pigment particles "P4" was found to be 0.045 mmol/g.

Preparation of Magenta Pigment Particles Having Anionic Group on Surface "P5"

Magenta pigment particles having an anionic group on the surface "P5" were obtained in the same manner as in the preparation of the cyan pigment particles having an anionic group on the surface "P3", except for replacing 20 parts of the phthalocyanine pigment (C.I. Pigment Blue 15:3) with 20 parts of an isoindolinone pigment (C.I. Pigment Yellow 122).

The amount of the anionic group introduced on the resulting yellow pigment particles "P5" was found to be 0.06 mmol/g.

Preparation of Microencapsulated Pigments "MCP1" to "MCP6"

Preparation of Microencapsulated Pigment "MCP1"

To an aqueous dispersion obtained by dispersing 15 g of the black pigment particles having an anionic group on the surface "P1" in 80 g of ion-exchanged water was added 0.4 g of dimethylaminoethyl methacrylate methyl chloride as a cationically polymerizable surface active agent. After mixing them, the mixture was irradiated with an ultrasonic wave for 15 minutes. Then, 2.1 g of Aqualon KH-10 as an anionically polymerizable surface active agent and 20 g of ion-exchanged water were added thereto and the whole was mixed, followed by irradiation with an ultrasonic wave for 30 minutes. The resulting mixture was charged into a reaction vessel equipped with a stirrer, a reflux condenser, a dropping funnel, a temperature regulator, a nitrogen inlet tube, and an ultrasonic generator. After inner temperature of the reaction vessel was elevated to 80° C., an aqueous potassium persulfate solution obtained by dissolving 0.03 g of potassium persulfate as a polymerization initiator in 10 g of ion-exchanged water was added dropwise thereto and polymerization was allowed to proceed at 80° C. for 6 hours under introduction of nitrogen. After completion of the polymerization, the mixture was adjusted to a pH of 8 with a 2 mol/L aqueous potassium hydroxide solution and filtered through a membrane filter having a pore size of 1 μm to remove coarse particles, and thereby a dispersion of aimed microencapsulated pigment "MCP1" was obtained.

The resulting dispersion was subjected to measurement of volume-average particle size using a Laser Doppler-type particle size distribution-measuring machine, Microtrac UP150 manufactured by Leeds & Northrup, and the size was found to be 100 nm. The dispersion was diluted 100 times with ion-exchanged water and the particles were observed on a scanning electron microscope after pre-treatment and an aspect ratio and Zingg index were determined by measuring minor diameter, major diameter, and thickness of the particles. The aspect ratio and the Zingg index were found to be 1.0 and 1.0, respectively. (KH-10)

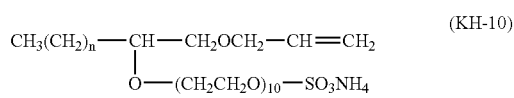

(KH-10)

Preparation of Microencapsulated Pigment "MCP2"

To an aqueous dispersion obtained by dispersing 20 g of the black pigment particles having an anionic group on the surface "P2" in 100 g of ion-exchanged water was added 7.9 g of dimethylaminoethyl methacrylate methyl chloride as a cationically polymerizable surface active agent. After mixing them, the mixture was irradiated with an ultrasonic wave for 15 minutes. Then, 24.4 g of Adeka Reasope SE-10N as an anionically polymerizable surface active agent and 20 g of ion-exchanged water were added thereto and the whole was mixed, followed by irradiation with an ultrasonic wave for 30 minutes. The resulting mixture was charged into a reaction vessel equipped with a stirrer, a reflux condenser, a dropping funnel, a temperature regulator, a nitrogen inlet tube, and an ultrasonic generator. After inner temperature of the reaction vessel was elevated to 80° C., an aqueous potassium persulfate solution obtained by dissolving 1.0 g of potassium persulfate as a polymerization initiator in 30 g of ion-exchanged water was added dropwise thereto and polymerization was allowed to proceed at 80° C. for 6 hours under introduction of nitrogen. After completion of the polymerization, the mixture was adjusted to a pH of 8 with a 2 mol/L aqueous potassium hydroxide solution and filtered through a membrane filter having a pore size of 1 μm to remove coarse particles, and thereby a dispersion of aimed microencapsulated pigment "MCP2" was obtained.

The resulting dispersion was subjected to measurement of volume-average particle size using a Laser Doppler-type particle size distribution-measuring machine, Microtrac UP150 manufactured by Leeds & Northrup, and the size was found to be 150 nm. The dispersion was diluted 100 times with ion-exchanged water and the particles were observed on a scanning electron microscope after pre-treatment and an aspect ratio and Zingg index were determined by measuring minor diameter, major diameter, and thickness of the particles. The aspect ratio and the Zingg index were found to be 1.0 and 1.0, respectively.

Preparation of Microencapsulated Pigment "MCP3"

To an aqueous dispersion obtained by dispersing 100 g of the cyan pigment particles having an anionic group on the surface "P3" in 500 g of ion-exchanged water was added 0.91 g of dimethylaminoethyl methacrylate methyl chloride as a cationically polymerizable surface active agent. After mixing them, the mixture was irradiated with an ultrasonic wave for 15 minutes. Then, 6.7 g of Aqualon KH-5 as an anionically polymerizable surface active agent, 2.07 g of 2-acrylamido-2-methylpropanesulfonic acid, and 50 g of ion-exchanged water were added thereto and the whole was mixed, followed by irradiation with an ultrasonic wave for 30 minutes. The resulting mixture was charged into a reaction vessel equipped with a stirrer, a reflux condenser, a dropping funnel, a temperature regulator, a nitrogen inlet tube, and an ultrasonic generator. After inner temperature of the reaction vessel was elevated to 80° C., an aqueous potassium persulfate solution obtained by dissolving 0.3 g of potassium persulfate as a polymerization initiator in 20 g of ion-exchanged water was added dropwise thereto and polymerization was allowed to proceed at 80° C. for 6 hours under introduction of nitrogen. After completion of the polymerization, the mixture was adjusted to a pH of 8 with a 2 mol/L aqueous potassium hydroxide solution and filtered through a membrane filter having a pore size of 1 μm to remove coarse particles, and thereby a dispersion of aimed microencapsulated pigment "MCP3" was obtained.

The resulting dispersion was subjected to measurement of volume-average particle size using a Laser Doppler-type particle size distribution-measuring machine, Microtrac UP150 manufactured by Leeds & Northrup, and the size was found to be 150 nm. The dispersion was diluted 100 times with ion-exchanged water and the particles were observed on a scanning electron microscope after pre-treatment and an aspect ratio and Zingg index were determined by measuring minor diameter, major diameter, and thickness of the particles. The aspect ratio and the Zingg index were found to be 1.0 and 1.0, respectively.

Preparation of Microencapsulated Pigment "MCP4"

To an aqueous dispersion obtained by dispersing 15 g of the yellow pigment particles having an anionic group on the surface "P4" in 80 g of ion-exchanged water was added 0.28 g of methacryloyloxyethyltrimethylammonium chloride as a cationically polymerizable surface active agent. After mixing them, the mixture was irradiated with an ultrasonic wave for 15 minutes. Then, 1.58 g of Aqualon KH-10 as an anionically polymerizable surface active agent and 20 g of ion-exchanged water were added thereto and the whole was mixed, followed by irradiation with an ultrasonic wave for 30 minutes. The resulting mixture was charged into a reaction vessel equipped with a stirrer, a reflux condenser, a dropping funnel, a temperature regulator, a nitrogen inlet tube, and an ultrasonic generator. After inner temperature of the reaction vessel was elevated to 80° C., an aqueous potassium persulfate solution obtained by dissolving 0.05 g of potassium persulfate as a polymerization initiator in 10 g of ion-exchanged water was added dropwise thereto and polymerization was allowed to proceed at 80° C. for 6 hours under introduction of nitrogen. After completion of the polymerization, the mixture was adjusted to a pH of 8 with a 2 mol/L aqueous potassium hydroxide solution and filtered through a membrane filter having a pore size of 1 μm to remove coarse particles, and thereby a dispersion of aimed microencapsulated pigment "MCP4" was obtained.

The resulting dispersion was subjected to measurement of volume-average particle size using a Laser Doppler-type particle size distribution-measuring machine, Microtrac UP150 manufactured by Leeds & Northrup, and the size was found to be 150 nm. The dispersion was diluted 100 times with ion-exchanged water and the particles were observed on a scanning electron microscope after pre-treatment and an aspect ratio and Zingg index were determined by measuring minor diameter, major diameter, and thickness of the particles. The aspect ratio and the Zingg index were found to be 1.0 and 1.0, respectively.

Preparation of Microencapsulated Pigment "MCP5"

To an aqueous dispersion obtained by dispersing 100 g of the magenta pigment particles having an anionic group on the surface "P5" in 500 g of ion-exchanged water was added 1.25 g of dimethylaminoethyl methacrylate methyl chloride as a cationically polymerizable surface active agent. After mixing them, the mixture was irradiated with an ultrasonic wave for 15 minutes. Then, 12 g of benzyl methacrylate, 8 g of dodecyl methacrylate, 3.9 g of Aqualon KH-10 as an anionically polymerizable surface active agent, 2.07 g of 2-acrylamido-2-methylpropanesulfonic acid as a hydrophilic monomer, and 50 g of ion-exchanged water were added thereto and the whole was mixed, followed by irradiation with an ultrasonic wave for 30 minutes. The resulting mixture was charged into a reaction vessel equipped with a stirrer, a reflux condenser, a dropping funnel, a temperature regulator, a nitrogen inlet tube, and an ultrasonic generator. After inner temperature of the reaction vessel was elevated to 80° C., an aqueous potassium persulfate solution obtained by dissolving 0.6 g of potassium persulfate as a polymerization initiator in 20 g of ion-exchanged water was added dropwise thereto and polymerization was allowed to proceed at 80° C. for 6 hours under introduction of nitrogen. After completion of the polymerization, the mixture was adjusted to a pH of 8 with a 2 mol/L aqueous potassium hydroxide solution and filtered through a membrane filter having a pore size of 1 μm to remove coarse particles, and thereby a dispersion of aimed microencapsulated pigment "MCP5" was obtained.

The resulting dispersion was subjected to measurement of volume-average particle size using a Laser Doppler-type particle size distribution-measuring machine, Microtrac UP150 manufactured by Leeds & Northrup, and the size was found to be 300 nm. The dispersion was diluted 100 times with ion-exchanged water and the particles were observed on a scanning electron microscope after pre-treatment and an aspect ratio and Zingg index were determined by measuring minor diameter, major diameter, and thickness of the particles. The aspect ratio and the Zingg index were found to be 1.0 and 1.0, respectively. The dispersion was dried at room temperature and then subjected to measurement of glass transition point of the coated polymer using a thermal scanning calorimeter (differential scanning calorimeter: DSC) DSC200 (manufactured by Seiko Instruments Inc.), whereby the point was found to be −7° C.

Preparation of Microencapsulated Pigment "MCP5B"

To an aqueous dispersion obtained by dispersing 100 g of the magenta pigment particles having an anionic group on the surface "P5" in 500 g of ion-exchanged water was added 1.25 g of dimethylaminoethyl methacrylate methyl chloride as a cationically polymerizable surface active agent. After mixing them, the mixture was irradiated with an ultrasonic wave for 15 minutes. Then, 12 g of benzyl methacrylate and 8 g of dodecyl methacrylate were added thereto and the whole was mixed. Thereafter, 3.9 g of Aqualon KH-10 as an anionically polymerizable surface active agent and 2.07 g of 2-acrylamido-2-methylpropanesulfonic acid as a hydrophilic monomer dissolved in 50 g of ion-exchanged water beforehand were added thereto and the whole was mixed, followed by irradiation with an ultrasonic wave for 30 minutes. The resulting mixture was charged into a reaction vessel equipped with a stirrer, a reflux condenser, a dropping funnel, a temperature regulator, a nitrogen inlet tube, and an ultrasonic generator. After inner temperature of the reaction vessel was elevated to 80° C., an aqueous potassium persulfate solution obtained by dissolving 0.6 g of potassium persulfate as a polymerization initiator in 20 g of ion-exchanged water was added dropwise thereto and polymerization was allowed to proceed at 80° C. for 6 hours under introduction of nitrogen. After completion of the polymerization, the mixture was adjusted to a pH of 8 with a 2 mol/L aqueous potassium hydroxide solution and filtered through a membrane filter having a pore size of 1 μm to remove coarse particles, and thereby a dispersion of aimed microencapsulated pigment "MCP5B" was obtained.

The resulting dispersion was subjected to measurement of volume-average particle size using a Laser Doppler-type particle size distribution-measuring machine, Microtrac UP150 manufactured by Leeds & Northrup, and the size was found to be 150 nm. The dispersion was diluted 100 times with ion-exchanged water and the particles were observed on a scanning electron microscope after pre-treatment and an aspect ratio and Zingg index were determined by measuring minor diameter, major diameter, and thickness of the particles. The aspect ratio and the Zingg index were found to be 1.0 and 1.0, respectively. The dispersion was dried at room temperature and then subjected to measurement of glass transition point of the coated polymer using a thermal scanning calorimeter (differential scanning calorimeter: DSC) DSC200 (manufactured by Seiko Instruments Inc.), whereby the point was found to be −7° C.

Preparation of Microencapsulated Pigment "MCP6"

To an aqueous dispersion obtained by dispersing 20 g of the black pigment particles having an anionic group on the surface "P1" in 80 g of ion-exchanged water was added 0.81 g of dimethylaminoethyl methacrylate methyl chloride as a cationically polymerizable surface active agent. After mixing them, the mixture was irradiated with an ultrasonic wave for 15 minutes. Then, 2.45 g of isobornyl methacrylate, 2.55 g of lauryl methacrylate, 3.37 g of Aqualon KH-10 as an anionically polymerizable surface active agent, and 30 g of ion-exchanged water were added thereto and the whole was mixed, followed by irradiation with an ultrasonic wave for 30 minutes. The resulting mixture was charged into a reaction vessel equipped with a stirrer, a reflux condenser, a dropping funnel, a temperature regulator, a nitrogen inlet tube, and an ultrasonic generator. After inner temperature of the reaction vessel was elevated to 80° C., an aqueous potassium persulfate solution obtained by dissolving 0.3 g of potassium persulfate as a polymerization initiator in 20 g of ion-exchanged water was added dropwise thereto and polymerization was allowed to proceed at 80° C. for 6 hours under introduction of nitrogen. After completion of the polymerization, the mixture was adjusted to a pH of 8 with a 2 mol/L aqueous potassium hydroxide solution and filtered through a membrane filter having a pore size of 1 μm to remove coarse particles, and thereby a dispersion of aimed microencapsulated pigment "MCP6" was obtained.

The resulting dispersion was subjected to measurement of volume-average particle size using a Laser Doppler-type particle size distribution-measuring machine, Microtrac UP150 manufactured by Leeds & Northrup, and the size was found to be 300 nm. The dispersion was diluted 100 times with ion-exchanged water and the particles were observed on a scanning electron microscope after pre-treatment and an aspect ratio and Zingg index were determined by measuring minor diameter, major diameter, and thickness of the particles. The aspect ratio and the Zingg index were found to be 1.0 and 1.0, respectively. The dispersion was dried at room temperature and then subjected to measurement of glass transition point of the coated polymer using a thermal scanning calorimeter (differential scanning calorimeter: DSC) DSC200 (manufactured by Seiko Instruments Inc.), whereby the point was found to be 5° C.

Preparation of Microencapsulated Pigment "MCP6B"

To an aqueous dispersion obtained by dispersing 20 g of the black pigment particles having an anionic group on the surface "P1" in 80 g of ion-exchanged water was added 0.81 g of dimethylaminoethyl methacrylate methyl chloride as a cationically polymerizable surface active agent. After mixing them, the mixture was irradiated with an ultrasonic wave for 15 minutes. Then, 2.45 g of isobornyl methacrylate and 2.55 g of lauryl methacrylate were added thereto and the whole was mixed. Thereafter, 3.37 g of Aqualon KH-10 as an anionically polymerizable surface active agent dissolved in 30 g of ion-exchanged water beforehand was added thereto and the whole was mixed, followed by irradiation with an ultrasonic wave for 30 minutes. The resulting mixture was charged into a reaction vessel equipped with a stirrer, a reflux condenser, a dropping funnel, a temperature regulator, a nitrogen inlet tube, and an ultrasonic generator. After inner temperature of the reaction vessel was elevated to 80° C., an aqueous potassium persulfate solution obtained by dissolving 0.3 g of potassium persulfate as a polymerization initiator in 20 g of ion-exchanged water was added dropwise thereto and polymerization was allowed to proceed at 80° C. for 6 hours under introduction of nitrogen. After completion of the polymerization, the mixture was adjusted to a pH of 8 with a 2 mol/L aqueous potassium hydroxide solution and filtered through a membrane filter having a pore size of 1 μm to remove coarse particles, and thereby a dispersion of aimed microencapsulated pigment "MCP6B" was obtained.

The resulting dispersion was subjected to measurement of volume-average particle size using a Laser Doppler-type particle size distribution-measuring machine, Microtrac UP150 manufactured by Leeds & Northrup, and the size was found to be 150 nm. The dispersion was diluted 100 times with ion-exchanged water and the particles were observed on a scanning electron microscope after pre-treatment and an aspect ratio and Zingg index were determined by measuring minor diameter, major diameter, and thickness of the particles. The aspect ratio and the Zingg index were found to be 1.0 and 1.0, respectively. The dispersion was dried at room temperature and then subjected to measurement of glass transition point of the coated polymer using a thermal scanning calorimeter (differential scanning calorimeter: DSC) DSC200 (manufactured by Seiko Instruments Inc.), whereby the point was found to be 5° C.

In this regard, each dispersion of the microencapsulated pigments "MCB5B" and "MCB6B" contained only a small amount of water-soluble oligomers and polymers and also high conversion of the monomers used into the polymer was observed.

Preparation of Microencapsulated Pigment "MCP11"

To an aqueous dispersion obtained by dispersing 100 g of the cyan pigment particles having an anionic group on the surface "P3" in 500 g of ion-exchanged water was added 1.0 g of dimethylaminoethyl methacrylate methyl chloride as a cationically polymerizable surface active agent. After mixing them, the mixture was irradiated with an ultrasonic wave for 15 minutes. Then, 17.5 g of benzyl methacrylate, 7.7 g of dodecyl methacrylate, and 0.05 g of diethylene glycol dimethacrylate were added thereto and the whole was mixed. Thereafter, 6.72 g of Aqualon KH-5 as an anionically polymerizable surface active agent and 2.07 g of 2-acrylamido-2-methylpropanesulfonic acid as a hydrophilic monomer dissolved in 50 g of ion-exchanged water beforehand were added thereto and the whole was mixed, followed by irradiation with an ultrasonic wave for 30 minutes. The resulting mixture was charged into a reaction vessel equipped with a stirrer, a reflux condenser, a dropping funnel, a temperature regulator, a nitrogen inlet tube, and an ultrasonic generator. After inner temperature of the reaction vessel was elevated to 80° C., an aqueous potassium persulfate solution obtained by dissolving 0.6 g of potassium persulfate as a polymerization initiator in 20 g of ion-exchanged water was added dropwise thereto and polymerization was allowed to proceed at 80° C. for 6 hours under introduction of nitrogen. After completion of the polymerization, the mixture was adjusted to a pH of 8 with a 2 mol/L aqueous potassium hydroxide solution and filtered through a membrane filter having a pore size of 1 μm to remove coarse particles, and thereby a dispersion of aimed microencapsulated pigment "MCP11" was obtained.

The resulting dispersion was subjected to measurement of volume-average particle size using a Laser Doppler-type particle size distribution-measuring machine, Microtrac UP150 manufactured by Leeds & Northrup, and the size was found to be 110 nm. The dispersion was diluted 100 times with ion-exchanged water and the particles were observed on a scanning electron microscope after pre-treatment and an aspect ratio and Zingg index were determined by measuring minor diameter, major diameter, and thickness of the particles. The aspect ratio and the Zingg index were found to be 1.0 and 1.0, respectively. The dispersion was dried at room temperature and then subjected to measurement of glass transition point of the coated polymer using a thermal scanning calorimeter (differential scanning calorimeter: DSC) DSC200 (manufactured by Seiko Instruments Inc.), whereby the point was found to be 7° C.

Preparation of Microencapsulated Pigment "MCP12"

To an aqueous dispersion obtained by dispersing 100 g of the magenta pigment particles having an anionic group on the surface "P5" in 500 g of ion-exchanged water was added 1.25 g of dimethylaminoethyl methacrylate methyl chloride as a cationically polymerizable surface active agent. After mixing them, the mixture was irradiated with an ultrasonic wave for 15 minutes. Then, 20 g of isobornyl methacrylate and 0.5 g of 1,6-hexanediol dimethacrylate were added thereto and the whole was mixed. Thereafter, 3.9 g of Aqualon KH-10 as an anionically polymerizable surface active agent and 2.07 g of 2-acrylamido-2-methylpropanesulfonic acid as a hydrophilic monomer dissolved in 50 g of ion-exchanged water beforehand were added thereto and the whole was mixed, followed by irradiation with an ultrasonic wave for 30 minutes. The resulting mixture was charged into a reaction vessel equipped with a stirrer, a reflux condenser, a dropping funnel, a temperature regulator, a nitrogen inlet tube, and an ultrasonic generator. After inner temperature of the reaction vessel was elevated to 80° C., an aqueous potassium persulfate solution obtained by dissolving 0.6 g of potassium persulfate as a polymerization initiator in 20 g of ion-exchanged water was added dropwise thereto and polymerization was allowed to proceed at 80° C. for 6 hours under introduction of nitrogen. After completion of the polymerization, the mixture was adjusted to a pH of 8 with a 2 mol/L aqueous potassium hydroxide solution and filtered through a membrane filter having a pore size of 1 μm to remove coarse particles, and thereby a dispersion of aimed microencapsulated pigment "MCP12" was obtained.

The resulting dispersion was subjected to measurement of volume-average particle size using a Laser Doppler-type particle size distribution-measuring machine, Microtrac UP150 manufactured by Leeds & Northrup, and the size was found to be 100 nm. The dispersion was diluted 100 times with ion-exchanged water and the particles were observed on a scanning electron microscope after pre-treatment and an aspect ratio and Zingg index were determined by measuring minor diameter, major diameter, and thickness of the particles. The aspect ratio and the Zingg index were found to be 1.0 and 1.0, respectively.

Preparation of Microencapsulated Pigment "MCP13"

To an aqueous dispersion obtained by dispersing 100 g of the magenta pigment particles having an anionic group on the surface "P5" in 500 g of ion-exchanged water was added 1.25 g of dimethylaminoethyl methacrylate methyl chloride as a cationically polymerizable surface active agent. After mixing them, the mixture was irradiated with an ultrasonic wave for 15 minutes. Then, 12 g of isobornyl methacrylate, 0.05 g of 1,6-hexanediol dimethacrylate, and 8 g of dodecyl methacrylate were added thereto and the whole was mixed. Thereafter, 3.9 g of Aqualon KH-10 as an anionically polymerizable surface active agent and 2.07 g of 2-acrylamido-2-methylpropanesulfonic acid as a hydrophilic monomer dissolved in 50 g of ion-exchanged water beforehand were added thereto and the whole was mixed, followed by irradiation with an ultrasonic wave for 30 minutes. The resulting mixture was charged into a reaction vessel equipped with a stirrer, a reflux condenser, a dropping funnel, a temperature regulator, a nitrogen inlet tube, and an ultrasonic generator. After inner temperature of the reaction vessel was elevated to 80° C., an aqueous potassium persulfate solution obtained by dissolving 0.6 g of potassium persulfate as a polymerization initiator in 20 g of ion-exchanged water was added dropwise thereto and polymerization was allowed to proceed at 80° C. for 6 hours under introduction of nitrogen. After completion of the polymerization, the mixture was adjusted to a pH of 8 with a 2 mol/L aqueous potassium hydroxide solution and filtered through a membrane filter having a pore size of 1 μm to remove coarse particles, and thereby a dispersion of aimed microencapsulated pigment "MCP13" was obtained.

The resulting dispersion was subjected to measurement of volume-average particle size using a Laser Doppler-type particle size distribution-measuring machine, Microtrac UP150 manufactured by Leeds & Northrup, and the size was found to be 110 nm. The dispersion was diluted 100 times with ion-exchanged water and the particles were observed on a scanning electron microscope after pre-treatment and an aspect ratio and Zingg index were determined by measuring minor diameter, major diameter, and thickness of the particles. The aspect ratio and the Zingg index were found to be 1.0 and 1.0, respectively. The dispersion was dried at room temperature and then subjected to measurement of glass transition point of the coated polymer using a thermal scanning calorimeter (differential scanning calorimeter: DSC) DSC200 (manufactured by Seiko Instruments Inc.), whereby the point was found to be 2° C.

Preparation of Microencapsulated Pigment "MCP14"

To an aqueous dispersion obtained by dispersing 100 g of the cyan pigment particles having an anionic group on the surface "P3" in 500 g of ion-exchanged water was added 1.0 g of dimethylaminoethyl methacrylate methyl chloride as a cationically polymerizable surface active agent. After mixing them, the mixture was irradiated with an ultrasonic wave for 15 minutes. Then, 7.0 g of Aqualon KH-5 as an anionically polymerizable surface active agent, 2.0 g of 2-acrylamido-2-methylpropanesulfonic acid as a hydrophilic monomer, and 50 g of ion-exchanged water were added thereto and the whole was mixed, followed by irradiation with an ultrasonic wave for 30 minutes. The resulting mixture was charged into a reaction vessel equipped with a stirrer, a reflux condenser, a dropping funnel, a temperature regulator, a nitrogen inlet tube, and an ultrasonic generator. After inner temperature of the reaction vessel was elevated to 80° C., an aqueous potassium persulfate solution obtained by dissolving 0.3 g of potassium persulfate as a polymerization initiator in 20 g of ion-exchanged water was added dropwise thereto and polymerization was allowed to proceed at 80° C. for 6 hours under introduction of nitrogen. After completion of the polymerization, the mixture was adjusted to a pH of 8 with a 2 mol/L aqueous potassium hydroxide solution and filtered through a membrane filter having a pore size of 1 μm to remove coarse particles, and thereby a dispersion of aimed microencapsulated pigment "MCP14" was obtained.

Part of the resulting microencapsulated pigment "MCP14" was subjected to centrifugal separation on a centrifugal machine at 20,000 rounds for 30 minutes. The supernatant obtained by the operation was diluted 100 times and absorbance thereof in the range of 200 to 400 nm was measured on a spectrophotometer. Using calibration curves of dimethylaminoethyl methacrylate methyl chloride, Aqualon KH-5, and 2-acrylamido-2-methylpropanesulfonic acid at a specific wavelength prepared beforehand, dissolved amounts of dimethylaminoethyl methacrylate methyl chloride, Aqualon KH-5, and 2-acrylamido-2-methylpropanesulfonic acid in the supernatant were calculated to determine unreacted amounts thereof. In the case of dimethylaminoethyl methacrylate methyl chloride, unreacted was 10% by weight of the charged amount. In the case of 2-acrylamido-2-methylpropanesulfonic acid, unreacted was also 10% by weight of the charged amount. In the case of Aqualon KH-5, unreacted was 40% by weight of the charged amount.

On the other hand, the resulting microencapsulated pigment "MCP14" was subjected to ultrafiltration by a cross-flow method on an ultrafiltration apparatus. Part of the dispersion after the ultrafiltration was subjected to the quantitative determination in the same manner as described above to determine unreacted amounts from dissolved amounts of dimethylaminoethyl methacrylate methyl chloride, Aqualon KH-5, and 2-acrylamido-2-methylpropanesulfonic acid in the supernatant. The total concentration of the unreacted dimethylaminoethyl methacrylate methyl chloride, 2-acrylamido-2-methylpropanesulfonic acid, and Aqualon KH-5 was found to be less than 10,000 ppm.

The resulting dispersion was subjected to measurement of volume-average particle size using a Laser Doppler-type particle size distribution-measuring machine, Microtrac UP150 manufactured by Leeds & Northrup, and the size was found to be 100 nm.

Preparation of Microencapsulated Pigment "MCP15"

To an aqueous dispersion obtained by dispersing 100 g of the magenta pigment particles having an anionic group on the surface "P5" in 500 g of ion-exchanged water was added 2.0 g of dimethylaminoethyl methacrylate methyl chloride as a cationically polymerizable surface active agent. After mixing them, the mixture was irradiated with an ultrasonic wave for 15 minutes. Then, 12 g of benzyl methacrylate, 8 g of dodecyl methacrylate, 4.0 g of Aqualon KH-10 as an anionically polymerizable surface active agent, 2.0 g of 2-acrylamido-2-methylpropanesulfonic acid as a hydrophilic monomer, and 50 g of ion-exchanged water were added thereto and the whole was mixed, followed by irradiation with an ultrasonic wave for 30 minutes.

The resulting mixture was charged into a reaction vessel equipped with a stirrer, a reflux condenser, a dropping funnel, a temperature regulator, a nitrogen inlet tube, and an ultrasonic generator. After inner temperature of the reaction vessel was elevated to 80° C., an aqueous potassium persulfate solution obtained by dissolving 0.6 g of potassium persulfate as a polymerization initiator in 20 g of ion-exchanged water was added dropwise thereto and polymerization was allowed to proceed at 80° C. for 6 hours under introduction of nitrogen. After completion of the polymerization, the mixture was adjusted to a pH of 8 with a 2 mol/L aqueous potassium hydroxide solution and filtered through a membrane filter having a pore size of 1 μm to remove coarse particles, and thereby a dispersion of aimed microencapsulated pigment "MCP15" was obtained.

Part of the resulting microencapsulated pigment "MCP15" was subjected to centrifugal separation on a centrifugal machine at 20,000 rounds for 30 minutes. The supernatant obtained by the operation was diluted 100 times and absorbance thereof in the range of 200 to 400 nm was measured on a spectrophotometer. Using calibration curves of dimethylaminoethyl methacrylate methyl chloride, Aqualon KH-10, and 2-acrylamido-2-methylpropanesulfonic acid at a specific wavelength prepared beforehand, dissolved amounts of dimethylaminoethyl methacrylate methyl chloride, Aqualon KH-10, and 2-acrylamido-2-methylpropanesulfonic acid in the supernatant were calculated to determine unreacted amounts thereof. In the case of dimethylaminoethyl methacrylate methyl chloride, unreacted was 10% by weight of the charged amount. In the case of 2-acrylamido-2-methylpropanesulfonic acid, unreacted was also 10% by weight of the charged amount. In the case of Aqualon KH-10, unreacted was 40% by weight of the charged amount. Moreover, part of the dispersion "MCP15" was mixed with n-hexane and the organic solvent phase was collected and absorbance thereof in the range of 200 to 400 nm was measured on a spectrophotometer. Using calibration curves of benzyl methacrylate and dodecyl methacrylate at a specific wavelength prepared beforehand, unreacted amounts thereof were determined from the dissolved amount of benzyl methacrylate and dodecyl methacrylate in the n-hexane extract.

On the other hand, the resulting microencapsulated pigment "MCP 15" was subjected to ultrafiltration by a cross-flow method on an ultrafiltration apparatus. Part of the dispersion after the ultrafiltration was subjected to the quantitative determination in the same manner as described above to determine unreacted amounts from dissolved amounts of dimethylarnino ethyl methacrylate methyl chloride, Aqualon KH- 10, and 2-acrylaniido-2-methylpropanesulfonic acid in the dispersion. Moreover, part of the dispersion after the ultrafiltration was mixed with n-hexane, the organic solvent phase was collected, and absorbance thereof in the range of 200 to 400 nm was measured on a spectrophotometer. Using calibration curves of benzyl methacrylate and dodecyl methacrylate at a specific wavelength prepared beforehand, unreacted amounts thereof were determined from the dissolved amount of benzyl methacrylate and dodecyl methacrylate in the n-hexane extract. The total concentration of the unreacted dimethylaminoethyl methacrylate methyl chloride, 2-acrylamido-2-methylpropanesulfonic acid, Aqualon KH- 10, benzyl methacrylate, and dodecyl methacrylate was found to be less than 10,000 ppm.

The resulting dispersion was subjected to measurement of volume-average particle size using a Laser Doppler-type particle size distribution-measuring machine, Microtrac UP150 manufactured by Leeds & Northrup, and the size was found to be 100 nm. Moreover, the obtained polymer emulsion was dried at room temperature and then subjected to measurement of glass transition point using a thermal scanning calorimeter (differential scanning calorimeter: DSC) DSC200 (manufactured by Seiko Instruments Inc.), whereby the point was found to be –7° C.

As a result of measurement of aspect ratios and Zingg indices of the microencapsulated pigments "MCP1" to "MCP6B" and "MCP11" to "MCP15", the aspect ratios and Zingg indices were found to be all 1.0, which indicated that the pigment particles were in the form of about a true sphere.

Preparation of Microencapsulated Pigment "MCP7" to "MCP10"

MCP7 (microencapsulated black pigment), MCP8 (microencapsulated cyan pigment), MCP9 (microencapsulated magenta pigment), and MCP10 (microencapsulated yellow pigment) were prepared in accordance with the process described in JP-A-10-140065.

<Preparation of "MCP7">

Into a flask was put 250 g of methyl ethyl ketone and heated up to 75° C. while stirring under a nitrogen seal. A mixture consisting of 85 g of n-butyl methacrylate, 90 g of n-butyl acrylate, 40 g of 2-hydroxyethyl methacrylate, 25 g of methacrylic acid, and 20 g of a polymerization initiator Perbutyl O (t-butyl peroxyoctoate available from NOF Corp.) was added thereto dropwise over a period of 2 hours. After the dropwise addition, the reaction was continued for further 15 hours to obtain a solution of a vinyl polymer.

In a stainless steel beaker were charged 8 g of the above polymer solution, 0.4 g of dimethylethanolamine, and 8 g of a black pigment (MA-100 manufactured by Mitsubishi Chemical Corp.), and ion-exchanged water was added to make the total amount 40 g. The mixture was kneaded in a sand mill together with 250 g of zirconia beads having an average particle size of 0.5 mm for 4 hours. After completion of the kneading, the zirconia beads were separated by filtration to give an aqueous dispersion in which a dispersion of the base-neutralized carboxyl group-containing polymer and the pigment was dispersed in water. The dispersion was put into a dispersing machine, and a 1N aqueous hydrochloric acid solution was added thereto while stirring at room temperature until the resin was insolubilized and adsorbed onto the pigment. At that time, the pH was found to be 3 to 5. The aqueous medium containing the polymer-adsorbed pigment was filtered by suction, and the filter cake was washed with water to obtain a wet cake. A 10% aqueous sodium hydroxide solution was added to the wet cake while stirring in a dispersing machine until the pH rose to 8.5 to 9.5. After stirring for an additional 1 hour, ion-exchanged water was added to give a solids content of 20% to obtain microencapsulated pigment of carbon black MCP7, which was found to have an aspect ratio of 1.4 and a Zingg index of 1.4.

<Preparation of "MCP8">

Into a flask was put 250 g of methyl ethyl ketone and heated up to 75° C. while stirring under a nitrogen seal. A mixture consisting of 155 g of n-butyl methacrylate, 20 g of n-butyl acrylate, 35 g of 2-hydroxyethyl methacrylate, 40 g of methacrylic acid, and 5 g of a polymerization initiator Perbutyl O was added thereto dropwise over a period of 2 hours. After the dropwise addition, the reaction was continued for further 15 hours to obtain a solution of a vinyl polymer.

Ten grams of the above polymer solution, 7 g of a cyan pigment (C.I. Pigment Blue 15:3), 40 g of methyl ethyl ketone, and 150 g of ceramic beads having an average particle size of 0.5 mm were put into a stainless steel container and dispersed using a bead mill. The ceramic beads were separated by filtration to obtain a paste for microencapsulated pigment preparation.

Twenty grams of the resulting paste for microencapsulated pigment preparation and 0.2 g of diethanolamine were mixed to make an organic solvent phase. While the organic solvent phase was stirred under ultrasonication, 25 g of ion-exchanged water was added thereto dropwise over 20 minutes to cause phase inversion emulsification to obtain an aqueous dispersion containing a microencapsulated pigment.

The resulting dispersion was distilled at 85° C. to remove the solvent to yield a microencapsulated pigment of C.I. Pigment Blue 15:3, MCP8, which was found to have an aspect ratio of 1.4 and a Zingg index of 1.4.

<Preparation of "MCP9">

Into a flask was put 250 g of methyl ethyl ketone and heated up to 75° C. while stirring under a nitrogen seal. A mixture consisting of 170 g of n-butyl methacrylate, 58 g of n-butyl acrylate, 35 g of 2-hydroxyethyl methacrylate, 35 g of acrylic acid, and 20 g of a polymerization initiator Perbutyl O was added thereto dropwise over a period of 2 hours. After the dropwise addition, the reaction was continued for 15 hours to obtain a vinyl polymer solution.

In a stainless steel beaker were charged 15 g of the above polymer solution, 0.8 g of dimethylethanolamine, and 15 g of a magenta pigment (C.I. Pigment Red 122), and ion-exchanged water was added to make the total amount 75 g. The mixture was kneaded in a sand mill together with 250 g of zirconia beads having an average particle size of 0.5 nm for 4 hours. The zirconia beads were separated by filtration to give an aqueous dispersion in which a dispersion of the base-neutralized carboxyl-containing polymer and the pigment was dispersed in water. A 1N aqueous hydrochloric acid solution was added to the dispersion while stirring at room temperature until the resin was insolubilized and adsorbed onto the pigment. At that time, the pH was found to be 3 to 5. The aqueous medium containing the polymer-adsorbed pigment was filtered by suction, and the filter cake was washed with water to obtain a wet cake. A 10% sodium hydroxide aqueous solution was added to the wet cake while stirring in a dispersing machine until the pH rose to 8.5 to 9.5. The stirring was continued for an additional 1 hour, and ion-exchanged water was added to give a solids content of 20% to obtain a microencapsulated pigment of C.I. Pigment Red 122, MCP9, which was found to have an aspect ratio of 1.4 and a Zingg index of 1.4.

<Preparation of "MCP10">

Into a flask was put 250 g of methyl ethyl ketone and heated up to 75° C. while stirring under a nitrogen seal. A mixture consisting of 170 g of n-butyl methacrylate, 5 g of n-butyl acrylate, 35 g of 2-hydroxyethyl methacrylate, 35 g of acrylic acid, and 20 g of a polymerization initiator Perbutyl O was added thereto dropwise over 2 hours. After the dropwise addition, the reaction was continued for an additional 15 hours period to obtain a vinyl polymer solution.

In a stainless steel beaker were charged 15 g of the above polymer solution, 0.8 g of dimethylethanolamine, and 15 g of a yellow pigment (C.I. Pigment Yellow 110), and ion-exchanged water was added to make the total amount 75 g. The mixture was kneaded in a sand mill together with 250 g of zirconia beads having an average particle size of 0.5 mm for 4 hours. The zirconia beads were separated by filtration to give an aqueous dispersion in which a dispersion of the base-neutralized carboxyl-containing polymer and the pigment was dispersed in water. While the dispersion was stirred in a dispersing machine at ambient temperature, a 1N aqueous hydrochloric acid solution was added thereto until the resin was insolubilized and adsorbed onto the pigment. At that time the pH was found to be 3 to 5. The aqueous solvent containing the polymer-adsorbed pigment was filtered by suction, and the filter cake was washed with water to obtain a wet cake. A 10% sodium hydroxide aqueous solution was added to the wet cake while stirring in a dispersing machine until the pH rose to 8.5 to 9.5. The stirring was continued for an additional 1 hour, and ion-exchanged water was added to give a solids content of 20% to obtain microencapsulated pigment of C.I. Pigment Yellow 110, MCP10, which was found to have an aspect ratio of 1.4 and a Zingg index of 1.4.

As mentioned above, the microencapsulated pigments "MCP1" to "MCP6B" and "MCP11" and "MCP13" of Examples each had an aspect ratio of 1.0 and a Zingg index of 1.0 and was like a real sphere, but the microencapsulated pigments "MCP7" to "MCP10" of Comparative Examples each had an aspect ratio of more than 1.3 and a Zingg index of more than 1.3 and was not like a real sphere. The aspect ratio and Zingg index were determined by diluting an aqueous dispersion 100 times with ion-exchanged water, drying it observing particles on a transmission electron microscope (TEM) and a scanning electron microscope (SEM), and measuring minor diameter, major diameter, and thickness of the particles.

Preparation of "Polymer Fine Particles 1 to 4"

<Preparation of "Polymer Fine Particles 1">

In a reaction vessel equipped with a stirrer, reflux condenser, a dropping apparatus, and a thermometer were put 90 g of ion-exchanged water and 1 g of an anionically polymerizable surface active agent Aqualon KH-5, the whole was warmed to 70° C. under stirring while purging with nitrogen. The inner temperature was maintained at 70° C. and 2 g of potassium persulfate was added thereto and dissolved. Then, an emulsion obtained by stirring 1 g of an anionically polymerizable surface active agent Aqualon KH-5, 43.5 g of styrene, 47.5 g of n-butyl acrylate, and 5 g of 2-acrylamido-2-methylpropanesulfonic acid in 45 g of ion-exchanged water beforehand was continuously added dropwise into the reaction vessel over a period of 3 hours. After completion of the dropwise addition, the reaction was continued for further 3 hours. The resulting polymer emulsion was cooled to room temperature and then ion-exchanged water and a 2 mol/L aqueous potassium hydroxide solution were added to prepare an emulsion having a solid matter of 35% by weight and a pH of 8. The concentration of polymer fine particles of the resulting polymer emulsion was adjusted to 0.1% by weight. Three parts by volume thereof and 1 part by volume of a 1 mol/L aqueous magnesium nitrate solution were brought into contact with each other in a cell of a spectrophotometer U-3300 (manufactured by Hitachi Ltd.), whereby the time required for decreasing the transmittance at a wavelength of 700 nm to 50% of the initial value was found to be 90 second.

The emulsion was subjected to measurement of volume-average particle size using a Laser Doppler-type particle size distribution-measuring machine, Microtrac UP150 manufactured by Leeds & Northrup, and the size was found to be 100 nm. The polymer emulsion was dried at room temperature and then subjected to measurement of glass transition point of the coated polymer using a thermal scanning calorimeter (differential scanning calorimeter: DSC) DSC200 (manufactured by Seiko Instruments Inc.), whereby the point was found to be 0° C. Moreover, the lowest film-forming temperature was 10° C. The concentration of polymer fine particles of the resulting polymer emulsion was adjusted to 10% by weight and a contact angle thereof with a polytetrafluoroethylene plate was measured to be 85°. Furthermore, a surface tension of the resulting polymer emulsion measured on a tensiometer CBVP-Z (manufactured by Kyowa Interface Science Co. Ltd.) was found to be $55 \times 10^{-3}$ N/m (55 dyne/cm).

<Preparation of "Polymer Fine Particles 2">

In a reaction vessel equipped with a stirrer, reflux condenser, a dropping apparatus, and a thermometer were put 90 g of ion-exchanged water and 1 g of an anionically polymerizable surface active agent Aqualon KH-5, the whole was warmed to 70° C. under stirring while purging with nitrogen. The inner temperature was maintained at 70° C. and 2 g of potassium persulfate was added thereto and dissolved. Then, an emulsion obtained by stirring 1 g of an anionically polymerizable surface active agent Aqualon KH-5, 43.5 g of styrene, 47.5 g of n-butyl acrylate, 0.3 g of diethylene glycol dimethacrylate, and 5 g of 2-acrylamido-2-methylpropanesulfonic acid in 45 g of ion-exchanged water beforehand was continuously added dropwise into the reaction vessel over a period of 3 hours. After completion of the dropwise addition, the reaction was continued for further 3 hours. The resulting polymer emulsion was cooled to room temperature and then ion-exchanged water and a 2 mol/L aqueous potassium hydroxide solution were added to prepare an emulsion having a solid matter of 35% by weight and a pH of 8. The concentration of polymer fine particles of the resulting polymer emulsion was adjusted to 0.1% by weight. Three parts by volume thereof and 1 part by volume of a 1 mol/L aqueous magnesium nitrate solution were brought into contact with each other in a cell of a spectrophotometer U-3300 (manufactured by Hitachi Ltd.), whereby time required for decreasing the transmittance at a wavelength of 700 nm to 50% of the initial value was found to be 80 second. Moreover, the emulsion was subjected to measurement of volume-average particle size using a Laser Doppler-type particle size distribution-measuring machine, Microtrac UP150 manufactured by Leeds & Northrup, and the size was found to be 100 nm.

The polymer emulsion was dried at room temperature and then subjected to measurement of glass transition point of the coated polymer using a thermal scanning calorimeter (differential scanning calorimeter: DSC) DSC200 (manufactured by Seiko Instruments Inc.), whereby the point was found to be 3° C. Moreover, the lowest film-forming temperature was 15° C. The concentration of polymer fine particles of the resulting polymer emulsion was adjusted to 10% by weight and a contact angle thereof with a polytetrafluoroethylene plate was measured to be 89°. Furthermore, a surface tension of the resulting polymer emulsion measured on a tensiometer CBVP-Z (manufactured by Kyowa Interface Science Co. Ltd.) was found to be $57 \times 10^{-3}$ N/m (57 dyne/cm).

<Preparation of "Polymer Fine Particles 3">

In a reaction vessel equipped with a stirrer, reflux condenser, a dropping apparatus, and a thermometer were put 90 g of ion-exchanged water and 1 g of an anionically polymerizable surface active agent Aqualon KH-5, the whole was warmed to 70° C. under stirring while purging with nitrogen. The inner temperature was maintained at 70° C. and 2 g of potassium persulfate was added thereto and dissolved. Then, an emulsion obtained by stirring 1 g of an anionically polymerizable surface active agent Aqualon KH-5, 43.5 g of styrene, 47.5 g of n-butyl acrylate, 3 g of ethylene glycol dimethacrylate, and 5 g of 2-acrylamido-2-methylpropanesulfonic acid in 45 g of ion-exchanged water beforehand was continuously added dropwise into the reaction vessel over a period of 3 hours. After completion of the dropwise addition, the reaction was continued for further 3 hours. The resulting polymer emulsion was cooled to room temperature and then ion-exchanged water and a 2 mol/L aqueous potassium hydroxide solution were added to prepare an emulsion having a solid matter of 35% by weight and a pH of 8. The concentration of polymer fine particles of the resulting polymer emulsion was adjusted to 0.1% by weight. Three parts by volume thereof and 1 part by volume of a 1 mol/L aqueous magnesium nitrate solution were brought into contact with each other in a cell of a spectrophotometer U-3300 (manufactured by Hitachi Ltd.), whereby time required for decreasing the transmittance at a wavelength of 700 nm to 50% of the initial value was found to be 10 second.

Moreover, the emulsion was subjected to measurement of volume-average particle size using a Laser Doppler-type particle size distribution-measuring machine, Microtrac UP150 manufactured by Leeds & Northrup, and the size was found to be 90 nm.

The polymer emulsion was dried at room temperature and then subjected to measurement of glass transition point of the coated polymer using a thermal scanning calorimeter (differential scanning calorimeter: DSC) DSC200 (manufactured by Seiko Instruments Inc.), whereby the point was found to be 8° C. Moreover, the lowest film-forming temperature was 20° C. The concentration of polymer fine particles of the resulting polymer emulsion was adjusted to 10% by weight and a contact angle thereof with a polytetrafluoroethylene plate was measured to be 110°. Furthermore, a surface tension of the resulting polymer emulsion measured on a tensiometer CBVP-Z (manufactured by Kyowa Interface Science Co. Ltd.) was found to be $59 \times 10^{-3}$ N/m (59 dyne/cm).

<Preparation of "Polymer Fine Particles 4">

In a reaction vessel equipped with a stirrer, reflux condenser, a dropping apparatus, and a thermometer were put 900 g of ion-exchanged water and 4 g of sodium lauryl sulfate, the whole was warmed to 70° C. under stirring while purging with nitrogen. The inner temperature was maintained at 70° C. and 2 g of potassium persulfate was added thereto and dissolved. Then, an emulsion obtained by stirring 20 g of acrylamide, 435 g of styrene, 475 g of n-butyl acrylate, and 30 g of methacrylic acid with 450 g of ion-exchanged water and 3 g of sodium lauryl sulfate beforehand was continuously added dropwise into the reaction vessel over a period of 3 hours. After completion of the dropwise addition, the reaction was continued for further 3 hours. The resulting polymer emulsion was cooled to room temperature and then ion-exchanged water and a 2 mol/L aqueous potassium hydroxide solution were added to prepare an emulsion having a solid matter of 35% by weight and a pH of 8. The concentration of polymer fine particles of the resulting polymer emulsion was adjusted to 0.1% by weight. Three parts by volume thereof and 1 part by volume of a 1 mol/L aqueous magnesium nitrate solution were brought into contact with each other in a cell of a spectrophotometer U-3300 (manufactured by Hitachi Ltd.), whereby time required for decreasing the transmittance at a wavelength of 700 nm to 50% of the initial value was found to be 70 second.

Moreover, the emulsion was subjected to measurement of volume-average particle size using a Laser Doppler-type particle size distribution-measuring machine, Microtrac UP150 manufactured by Leeds & Northrup, and the size was found to be 90 nm. The polymer emulsion was dried at room temperature and then subjected to measurement of glass transition point of the coated polymer using a thermal scanning calorimeter (differential scanning calorimeter: DSC) DSC200 (manufactured by Seiko Instruments Inc.), whereby the point was found to be 12° C. Moreover, the lowest film-forming temperature was 22° C. The concentration of polymer fine particles of the resulting polymer emulsion was adjusted to 10% by weight and a contact angle thereof with a polytetrafluoroethylene plate was measured to be 89. Furthermore, a surface tension of the resulting polymer emulsion measured on a tensiometer CBVP-Z (manufactured by Kyowa Interface Science Co. Ltd.) was found to be $57 \times 10^{-3}$ N/M (57 dyne/cm).

Examples 1 to 30

Preparation of Ink Jet Recording Inks

Ink jet recording inks of Examples 1 to 30 were prepared according to the formulations shown in Tables 1 to 4.

TABLE 1

Ink formulations of ink jet recording inks in Examples

|  |  | Example 1 | Example 2 | Example 3 | Example 4 | Example 5 | Example 6 | Example 7 | Example 7B | Example 8 | Example 9 | Example 9B |
|---|---|---|---|---|---|---|---|---|---|---|---|---|
| Micro- encapsulated pigment | MCP1 | 8 | 8 | 8 |  |  |  |  |  |  |  |  |
|  | MCP2 |  |  |  | 8 |  |  |  |  |  |  |  |
|  | MCP3 |  |  |  |  | 8 |  |  |  |  |  |  |
|  | MCP4 |  |  |  |  |  | 8 |  |  |  |  |  |
|  | MCP5 |  |  |  |  |  |  | 8 |  |  |  |  |
|  | MCP5B |  |  |  |  |  |  |  | 8 |  |  |  |
|  | MCP6 |  |  |  |  |  |  |  |  | 8 | 8 |  |
|  | MCP6B |  |  |  |  |  |  |  |  |  |  | 8 |
| Wetting agent | Glycerin | 15 | 13 | 13 | 14 | 13 | 13 | 13 | 13 | 15 | 13 | 13 |
| Penetrant | Diethylene glycol monobutyl ether |  | 5 |  |  | 5 |  | 5 | 5 |  | 5 | 5 |
|  | Triethylene glycol monobutyl ether |  |  | 5 | 5 |  | 5 |  |  |  |  |  |
|  | 1,2-Hexane-diol |  |  | 3 | 4 | 5 | 3 | 5 | 5 |  | 2 | 2 |
| Solid wetting agent | Trimethylol propane | 5 | 7 |  |  | 8 | 4 | 8 | 8 | 7 | 8 | 8 |
|  | 1,2,8-Hexanetriol |  |  | 7 | 7 |  | 4 |  |  |  |  |  |
| Polar solvent | 2-Pyrrolidone | 2 |  |  | 2 | 2 | 1 | 2 | 2 | 2 |  |  |
| Surfactant | Olfine E1010 |  | 1 |  | 1 | 1 |  | 1 | 1 |  | 1 | 1 |
|  | Surfynol 465 |  |  | 1 |  |  | 1 |  |  |  |  |  |
| pH Aduster | Potassium hydroxide | 0.1 | 0.1 | 0.1 | 0.1 | 0.1 | 0.1 | 0.1 | 0.1 | 0.1 | 0.1 | 0.1 |
| Antiseptic | Proxel XL-2 | 0.05 | 0.05 | 0.05 | 0.05 | 0.05 | 0.05 | 0.05 | 0.05 | 0.05 | 0.05 | 0.05 |
| Water | Ion-exchanged water | Balance | Balance | Balance | Balance | Balance | Balance | Balance | Balance | Balance | Balance | Balance |

Every amount added is expressed by wt %.
Microencapsulated pigment is expressed by concentration of solid matter.

TABLE 2

Ink formulations of ink jet recording inks in Examples

|  |  | Example 10 | Example 11 | Example 12 | Example 13 | Example 14 | Example 15 | Example 16 |
|---|---|---|---|---|---|---|---|---|
| Micro- encapsulated pigment | MCP1 | 8 |  |  |  |  |  |  |
|  | MCP2 |  | 8 |  |  |  |  |  |
|  | MCP3 |  |  | 8 |  |  |  |  |
|  | MCP4 |  |  |  | 8 |  |  |  |
|  | MCP5 |  |  |  |  | 8 |  |  |
|  | MCP5B |  |  |  |  |  | 8 |  |
|  | MCP6B |  |  |  |  |  |  | 8 |
| Wetting agent | Glycerin | 13 | 13 | 13 | 13 | 13 | 13 | 13 |
| Penetrant | Diethylene glycol monobutyl ether | 5 |  |  | 5 |  | 5 | 5 |
|  | Triethylene glycol monobutyl ether |  | 5 |  |  | 5 |  |  |
|  | 1,2-Hexane-diol |  | 3 | 5 | 3 | 3 | 5 | 2 |
| Solid wetting agent | Trimethylol propane | 7 |  |  | 7 | 5 | 8 | 6 |
|  | 1,2,8-Hexanetriol |  | 7 | 7 |  |  |  |  |
| Polar solvent | 2-Pyrrolidone |  |  | 1 | 1 |  | 2 | 1 |
| pH Adjuster | Potassium hydroxide | 0.1 | 0.1 | 0.1 | 0.1 | 0.1 | 0.1 | 0.1 |
| Antiseptic | Proxel XL-2 | 0.05 | 0.05 | 0.05 | 0.05 | 0.05 | 0.05 | 0.05 |
| Water | Ion-exchanged water | Balance | Balance | Balance | Balance | Balance | Balance | Balance |

Every amount added is expressed by wt %.
Microencapsulated pigment is expressed by concentration of solid matter.

TABLE 3

Ink formulations of ink jet recording inks in Examples

| | | Example 17 | Example 18 | Example 19 | Example 20 | Example 21 | Example 22 | Example 23 | Example 24 | Example 24B |
|---|---|---|---|---|---|---|---|---|---|---|
| Micro-encapsulated pigment | MCP11 | 8 | | | | 8 | | | | |
| | MCP12 | | 8 | 8 | | | 8 | 8 | | |
| | MCP13 | | | | 8 | | | | 8 | 8 |
| Wetting agent | Glycerin | 13 | 13 | 13 | 13 | 13 | 13 | 13 | 13 | 13 |
| Penetrant | Diethylene glycol monobutyl ether | 5 | | 5 | | 5 | | 5 | | |
| | Triethylene glycol monobutyl ether | | 5 | | 5 | | 5 | | 5 | 5 |
| | 1,2-Hexane-diol | | 3 | 5 | 3 | | 3 | 5 | 3 | 3 |
| Solid wetting agent | Trimethylol propane | 7 | | 8 | 7 | 7 | | 8 | 7 | 2 |
| | 1,2,8-Hexanetriol | | 7 | | | | 7 | | | |
| | Xylitol | | | | | | | | | 5 |
| Polar solvent | 2-Pyrrolidone | | | 2 | 2 | | | 2 | 2 | 2 |
| Surfactant | Olfine E1010 | 1 | | 1 | | | | | | |
| | Surfynol 465 | | 1 | | | 1 | | | | |
| pH Adjuster | Potassium hydroxide | 0.1 | 0.1 | 0.1 | 0.1 | 0.1 | 0.1 | 0.1 | 0.1 | 0.1 |
| Antiseptic | Proxel XL-2 | 0.05 | 0.05 | 0.05 | 0.05 | 0.05 | 0.05 | 0.05 | 0.05 | 0.05 |
| Water | Ion-exchanged water | Balance | Balance | Balance | Balance | Balance | Balance | Balance | Balance | Balance |

Every amount added is expressed by wt %.
Microencapsulated pigment is expressed by concentration of solid matter.

TABLE 4

Ink formulations of ink jet recording inks in Examples

| | | Example 25 | Example 26 | Example 27 | Example 28 | Example 29 | Example 30 |
|---|---|---|---|---|---|---|---|
| Micro-encapsulated pigment | MCP1 | 5 | | | | | 5 |
| | MCP2 | | 5 | | | | |
| | MCP3 | | | 5 | | | |
| | MCP4 | | | | 5 | | |
| | MCP12 | | | | | 5 | |
| Polymer fine particles | Polymer fine particles 1 | 3 | | | 3 | | |
| | Polymer fine particles 2 | | 3 | | | | |
| | Polymer fine particles 3 | | | 3 | | 3 | |
| | Polymer fine particles 4 | | | | | | 3 |
| Wetting agent | Glycerin | 13 | 13 | 13 | 13 | 13 | 13 |
| Penetrant | Diethylene glycol monobutyl ether | 5 | 5 | | | 5 | 5 |
| | Triethylene glycol monobutyl ether | | | 5 | 5 | | |
| | 1,2-Hexanediol | 3 | 3 | 3 | 3 | 3 | 3 |
| Solid wetting agent | Trimethylol propane | 7 | 7 | | 7 | 5 | 7 |
| | 1,2,8-Hexanetriol | | | 7 | | 2 | |
| Polar solvent | 2-Pyrrolidone | | | | 1 | | |
| Surfactant | Olfine E1010 | | 1 | | 1 | 1 | 1 |
| | Surfynol 465 | | | 1 | | | |
| pH Adjuster | Potassium hydroxide | 0.1 | 0.1 | 0.1 | 0.1 | 0.1 | 0.1 |
| Antiseptic | Proxel XL-2 | 0.05 | 0.05 | 0.05 | 0.05 | 0.05 | 0.05 |
| Water | Ion-exchanged water | Balance | Balance | Balance | Balance | Balance | Balance |

Every amount added is expressed by wt %.
Microencapsulated pigment is expressed by concentration of solid matter.

Comparative Examples 1 to 26

Ink jet recording inks of Comparative Examples 1 to 26 were prepared according to the formulations shown in Tables 5 to 8.

TABLE 5

Ink formulations of ink jet recording inks in Comparative Examples

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Micro-encap- | MCP7 | 4 | | | | 8 | | | |
| | MCP8 | | 2 | | | | 4 | | |

TABLE 5-continued

Ink formulations of ink jet recording inks in Comparative Examples

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| sulated pigment | MCP9 | | | 2 | | | | 8 | |
| | MCP10 | | | | 2 | | | | 6 |
| Wetting agent | Glycerin | 15 | 15 | 12 | 12 | 15 | 10 | 10 | 15 |
| | Diethylene glycol | | | | | | 5 | 5 | |
| Penetrant | Diethylene glycol monobutyl ether | 6 | 6 | | | 7.5 | | 6 | |
| | 1,2-Hexanediol | | | 6 | 6 | | 7.5 | | 6 |
| Surfactant | Surfynol 465 | 1 | 0.5 | 1 | 0.5 | 1 | 1 | 1 | 1 |
| | Polyoxyethylene nonylphenyl ether | | | | | 0.5 | 0.5 | | |
| pH Adjuster | Potassium hydroxide | | | | | | | | 0.1 |
| | Propanolamine | 2 | 3 | 3 | 3 | 3 | 3 | 3 | |
| Antiseptic | Proxel XL-2 | 0.05 | 0.05 | | | 0.05 | | 0.05 | |
| | 4,4'-Dimethyloxazolidine | | | 1 | 1 | | 1 | | 1 |
| Water | Ion-exchanged water | Balance | Balance | Balance | Balance | Balance | Balance | Balance | Balance |

Every amount added is expressed by wt %.
Microencapsulated pigment is expressed by concentration of solid matter.

TABLE 6

Ink formulations of ink jet recording inks in Comparative Examples

| | | Comparative Example 9 | Comparative Example 10 | Comparative Example 11 | Comparative Example 12 | Comparative Example 13 |
|---|---|---|---|---|---|---|
| Micro-encapsulated pigment | P1 | 6 | | | | |
| | P2 | | 4 | | | |
| | P3 | | | 6 | | |
| | P4 | | | | 10 | |
| | P5 | | | | | 8 |
| Wetting agent | Glycerin | 15 | 10 | 10 | 12 | 15 |
| | Diethylene glycol | | 2 | 2 | | |
| Penetrant | Diethylene glycol monobutyl ether | 6 | 3 | | 7.5 | |
| | 1,2-Hexanediol | | 3 | 6 | | 7.5 |
| Surfactant | Surfynol 465 | 1 | 1 | 1 | 1 | 1 |
| | Polyoxyethylene nonylphenyl ether | | | 0.5 | 0.5 | |
| pH Adjuster | Potassium hydroxide | 0.5 | 0.5 | | | |
| | Propanolamine | | | 1 | 1 | 1 |
| Antiseptic | Proxel XL-2 | 0.05 | 0.05 | | | 0.05 |
| | 4,4'-Dimethyloxazolidine | | | 1 | 1 | |
| Water | Ion-exchanged water | Balance | Balance | Balance | Balance | Balance |

Every amount added is expressed by wt %.
Microencapsulated pigment is expressed by concentration of solid matter.

TABLE 7

Ink formulations of ink jet recording inks in Comparative Examples

| | | Comparative Example 14 | Comparative Example 15 | Comparative Example 16 | Comparative Example 17 | Comparative Example 18 |
|---|---|---|---|---|---|---|
| Micro-encapsulated pigment | Carbon black | 8 | 6 | | | |
| | C.I. Pigment Red 122 | | | 6 | | |
| | C.I. Pigment Blue 15:3 | | | | 6 | |
| | C.I. Pigment Yellow 185 | | | | | 6 |
| Ammonium salt of styrene-acrylic acid copolymer (molecular weigh 70000, polymer component 38%) | | 1 | 1 | 1 | 1 | 1 |
| Glycerin | | 15 | 10 | 10 | 15 | 10 |
| Diethylene glycol | | 10 | 8 | 8 | 10 | 8 |
| 1,2-Hexanediol | | | | | | 5 |
| 2-Pyrrolidone | | | 2 | 2 | | 2 |
| Olfine E1010 | | | 1 | 1 | | |

TABLE 7-continued

Ink formulations of ink jet recording inks in Comparative Examples

|  | Comparative Example 14 | Comparative Example 15 | Comparative Example 16 | Comparative Example 17 | Comparative Example 18 |
|---|---|---|---|---|---|
| Potassium hydroxide | 0.1 | 0.1 | 0.1 | 0.1 | 0.1 |
| Proxel XL-2 | 0.05 | 0.05 | 0.05 | 0.05 | 0.05 |
| Ion-exchanged water | Balance | Balance | Balance | Balance | Balance |

Every amount added is expressed by wt %.
Microencapsulated pigment is expressed by concentration of solid matter.

TABLE 8

Ink formulations of ink jet recording inks in Comparative Examples

|  |  | Comparative Example 19 | Comparative Example 20 | Comparative Example 21 | Comparative Example 22 | Comparative Example 23 | Comparative Example 24 | Comparative Example 25 | Comparative Example 26 |
|---|---|---|---|---|---|---|---|---|---|
| Micro-encapsulated pigment | MCP7(black) | 4 |  |  |  | 8 |  |  |  |
|  | MCP8(cyan) |  | 3 |  |  |  | 8 |  |  |
|  | MCP9(magenta) |  |  | 3 |  |  |  | 8 |  |
|  | MCP10(yellow) |  |  |  | 3 |  |  |  | 8 |
| Glycerin |  | 15 | 15 | 15 | 15 | 15 | 10 | 10 | 15 |
| Diethylene glycol |  |  |  |  |  |  | 5 | 5 |  |
| Trimethylolpropane |  |  |  |  |  |  | 6 | 6 | 6 |
| Diethylene glycol monobutyl ether |  |  |  |  |  | 8 |  |  |  |
| 1,3-Dimethyl-2-imidazolidinone |  |  |  | 2 | 2 |  |  |  |  |
| 2-Pyrrolidone |  | 2 | 2 |  |  |  |  |  |  |
| Surfynol 465 |  | 1 | 1 | 1 | 1 | 1 | 1 | 1 | 1 |
| Potassium hydroxide |  | 0.1 | 0.1 | 0.1 | 0.1 | 0.1 | 0.1 | 0.1 | 0.1 |
| Proxel XL-2 |  | 0.05 | 0.05 | 0.05 | 0.05 | 0.05 | 0.05 | 0.05 | 0.05 |
| Ion-exchanged water |  | Balance | Balance | Balance | Balance | Balance | Balance | Balance | Balance |

Every amount added is expressed by wt %.
Microencapsulated pigment is expressed by concentration of solid matter Evaluation The ink jet recording inks of Examples 1 to 30 and Comparative Examples 1 to 26 and recorded matters printed with these inks were evaluated according to the following methods.

<Evaluation 1-1: Dispersibility 1>

Each of the ink jet recording inks prepared in Examples and Comparative Examples was set in a rheometer (Physica MCR300, manufactured by Paar Physica), and the storage modulus (Pa) was measured using a corn/plate (CP 75-1 manufactured by Paar Physica) having a corn radius of 37.5 mm, a corn angle of 1° and a measuring gap of 0.05 mm at 20° C. at an angular speed varying from 0.5 to 5 rad/sec. The storage moduli at 0.6 rad/sec and 0.8 rad/sec were referred to $G'_{\omega=0.6}$ and $G'_{\omega=0.8}$, respectively. The ink dispersibility was evaluated according to the following standard.

A: The value of $(\log G'_{\omega=0.8} - \log G'_{\omega=0.6})/(\log 0.8 - \log 0.6)$ is 1.8 to 2.0.
B: The value of $(\log G'_{\omega=0.8} - \log G'[_{\omega=0.6})/(\log 0.8 - \log 0.6)$ is 1.6 to 1.8.
C: The value of $(\log G'_{\omega=0.8} - \log G'_{\omega=0.6})/(\log 0.8 - \log 0.6)$ is 1.2 to 1.6.
D: The value of $(\log G'_{\omega=0.8} - \log G'_{\omega=0.6})/(\log 0.8 - \log 0.6)$ is less than 1.2.

<Evaluation 1-2: Dispersibility 2>

The viscosity of an ink jet recording ink of each of Examples and Comparative Examples was measured with a rolling ball viscometer AMVn at 20° C. using a capillary having an inner diameter of 0.9 mm and a steel ball having a diameter of 0.794 mm and a density of 7.850 g/cm at an inclining angle of 70°, 60°, 50°, 40°, and 30°. The sin θ was plotted as abscissa and the viscosity as ordinate and the slope of the resulting sin θ-viscosity curve was determined. The dispersibility of the ink was evaluated according to the following standard.

A: The slope of the sin θ-viscosity curve is 0 to −0.05, indicating Newtonian flow behavior and excellent dispersibility.
B: The slope of the sin θ-viscosity curve is −0.05 to −0.1, indicating nearly Newtonian flow behavior and good dispersibility.
C: The slope of the sin θ-viscosity curve is −0.1 to −0.15, indicating non-Newtonian flow behavior but slightly good dispersibility.
D: The slope of the sin θ-viscosity curve is smaller than −0.15, indicating non-Newtonian flow behavior. The ink easily settles and exhibits poor dispersibility.

<Evaluation 2: Dispersion Stability>

Each of the ink jet recording inks prepared in Examples and Comparative Examples was put into a glass bottle, sealed, and allowed to stand at 60° C. for 2 weeks. The viscosity of the ink before and after the standing was measured with Physica MCR 300 (manufactured by Paar Physica) using a corn/plate (CP 75-1 manufactured by Paar Physica) having a corn radius of 37.5 mm, a corn angle of 1° and a measuring gap of 0.05 mm at 20° C. at a shear rate of 150 s$^{-1}$. The thus obtained results were evaluated according to the following standard.

A: The change is smaller than ±0.1 mPa·s.
B: The change is ±0.1 mPa·s or greater and smaller than ±0.3 mPa·s.
C: The change is ±0.3 mPa·s or greater.

<Evaluation 3: Settling Property>

With regard to each of the ink jet recording inks prepared in Examples and Comparative Examples, settling property of the colorant in an ink were evaluated from the back scattered and transmitted light intensity distributions in the height direction of a sample as measured at 20° C. with TURBISCAN 2000, manufactured by FORMUL ACTION, whose measuring principle was as follows. When a glass tube containing the ink was set at a predetermined position of the apparatus and measurement was started, a stage placed surrounding the glass tube (radial direction) vertically moves along the glass tube. A light source and a detector for scattered and transmitted light placed on the stage measure strength distribution of scattered and transmitted light every 40 μm in the vertical direction of the glass tube with the vertical movement of the stage. This movement is repeated over and over at arbitrary time intervals so that any movement of particles or change in particle diameter can be observed as light intensity with time. Evaluation was conducted according to the following standard.

A: No settling occurs for more than 2 weeks.
B: Settling occurs after 2 weeks.

<Evaluation 4: Print Density>

Plain paper Xerox P, Xerox 4024 (from Xerox Corp.) was printed solid on an inkjet printer PM-720C (manufactured by Seiko Epson Corp.) loaded with an ink cartridge filled with each of the ink jet recording inks prepared in Examples and Comparative Examples. The density (optical density, OD) of the solid printed area was measured with a spectrophotometer GRETAG SPM-50 (manufactured by Gretag Macbeth GmbH) and the thus obtained results were evaluated according to the following standard.

(In Case of Black Ink)
AA: The OD value of black ink is 1.5 or higher.
A: The OD value of black ink is 1.4 or higher and lower than 1.5.
B: The OD value of black ink is 1.3 or higher and lower than 1.4.
C: The OD value of black ink is lower than 1.3.

(In Case of Color Ink)
AA: The OD value of color ink is 1.25 or higher.
A: The OD value of color ink is 1.2 or higher and lower than 1.25.
B: The OD value of color ink is 1.15 or higher and lower than 1.2.
C: The OD value of color ink is lower than 1.15.

<Evaluation 5: Print Quality>

Large and small alphabet letters (24 letters each) were printed on various kinds of plain paper (including regenerated paper in part) using the Epson inkjet printer PM-720C (manufactured by Seiko Epson Corp.) loaded with an ink cartridge filled with each of the ink jet recording inks prepared in Examples and Comparative Examples. The printed letters were observed with the naked eye and evaluated according to the following standard.

AA: No blurring occurs on any paper.
A: Blurring is hardly observed on all papers.
B: Slight blurring is observed on two or three papers.
C: Slight blurring is observed on all papers.
D: Appreciable blurring is observed on all papers.

Printing papers used for the evaluation were 12 types of paper, i.e., Conqueror, Favorit, Modo, Rapid Copy, EPSON EPP, Xerox P, Xerox 4042, Xerox 10, Neenha Bond, Ricopy 6200, Yamayuri (regenerated paper), and Xerox R (regenerated paper).

<Evaluation 6: Color Developability (chroma)>

MC Semigloss Photo Paper (manufactured by Seiko Epson Corp.), Xerox P, Xerox 4024 (from Xerox Corp.), EPSON EPP, and PM Photo Paper (gloss) (manufactured by Seiko Epson Corp.) were each printed solid on the Epson inkjet printer PM-720C loaded with an ink cartridge filled with each of the ink jet printing inks prepared in Examples and Comparative Examples. The C* value of the solid printed area was measured. The color developability was evaluated according to the following standard.

A: 45 or higher
B: 35 or higher and lower than 45
C: lower than 35

<Evaluation 7: Abrasion Resistance>

Super Fine Glossy Film (designed for inkjets, manufactured by Seiko Epson Corp.) was printed solid (printing duty ratio: 100%) in an area of 10 mm×10 mm on the Epson inkjet printer PM-720C loaded with an ink cartridge filled with each of the ink jet printing inks of Examples and Comparative Examples. After the printed matter was left to stand at 25° C. for 1 hour, the printed area was abraded with a water-based, fluorescent yellow marker pen ZEBRA PEN 2 (manufactured by Zebra Pen Corp.) under a load of 500 g at a stroke speed of 10 mm/sec, and occurrence of smearing was observed. The results were evaluated according to the following standard.

A: Two strokes causes no smearing.
B: One stroke causes no smearing, but two strokes causes smearing.
C: One stroke causes smearing.

<Evaluation 8: Water Resistance>

One milliliter of ion-exchanged water was dropped on the printed area of the printed matter obtained in the evaluation of print density of Evaluation 4. After 20 minutes, the condition of the printed area was observed with the naked eye and evaluated according to the following standard.

A: No change occurs on all papers.
B: The colorant slightly dissolves from the printed area but it is possible to recognize letters.
C: The colorant dissolves from the printed area and it is difficult to recognize letters owing to blurred letters.

<Evaluation 9: Ejection Stability>

Ruling lines 1 mm thick were printed on Super Fine Paper (designed for inkjets, manufactured by Seiko Epson Corp.) by use of the Epson inkjet printer PM-720 loaded with each of the ink jet recording inks of Examples and Comparative Examples. Print defects, such as dot missing and dot placement errors, were observed with the naked eye and evaluation was conducted according to the following standard.

A: Neither dot missing nor dot placement errors occur in obtaining 10000 or more prints.
B: Dot missing or dot placement errors occur in obtaining 1000 or more prints and less than 10000 prints.
C: Dot missing or dot placement errors occur in obtaining 100 or more prints and less than 1000 prints.
D: Dot missing or dot placement errors occur in obtaining less than 100 prints.

<Evaluation 10: Non-Clogging Reliability>

After the printing in the above Evaluation 5, the inkjet printer was switched off. After one week suspension, the same printing test was carried out. The condition of ink ejection was observed with the naked eye and evaluated according to the following standard.

A: Printing is resumed normally on inputting image signals without requiring a cleaning operation.

B: Normal printing starts after three or fewer cleaning operations.
C: Normal printing starts after six or fewer cleaning operations.
D: Normal printing does not start even after seven or more cleaning operations.

<Evaluation 11: White Blank>

Each of the plain papers used in Evaluation 5 was printed solid on the Epson ink jet printer PM-720C loaded with an ink cartridge filled with each of the inks prepared in Examples and Comparative Examples. The solid printed area was inspected with the naked eye and evaluated according to the following standard.
A: Small spots where the background color of the paper is exposed without attachment of ink (referred to as white blanks herein) are not observed.
B: Small spots where the background color of the paper is exposed without attachment of ink are slightly observed.
C: Small spots where the background color of the paper is exposed without attachment of ink are observed.
D: A number of small spots where the background color of the paper is exposed without attachment of ink are observed.

<Evaluation 12: Gloss>

Super Fine Glossy paper (designed for inkjets, available from Seiko Epson Corp.) was printed solid (printing duty ratio: 100%) in an area of 50 mm×50 mm on the Epson inkjet printer PM-720C (manufactured by Seiko Epson Corp.) loaded with an ink cartridge filled with each of the ink jet recording inks prepared in Examples and Comparative Examples. After the printed matter was left to stand at 25° C. for 1 hour, the presence of gloss was observed with the naked eye and evaluation was conducted according to the following standard.
A: Much gloss is observed (highly glossy).
B: Gloss is observed but is inferior to A.
C: Slight gloss is observed.
D: No gloss is observed.

TABLE 9

| | Evaluation 1-1 Dispersibility 1 | Evaluation 1-2 Dispersibility 2 | Evaluation 2 Dispersion Stability | Evaluation 3 Settling Property | Evaluation 4 Print density | Evaluation 5 Print Quality |
|---|---|---|---|---|---|---|
| Ex. 1 | A | A | A | A | AA | AA |
| Ex. 2 | A | A | A | A | AA | AA |
| Ex. 3 | A | A | A | A | AA | AA |
| Ex. 4 | A | A | A | A | AA | AA |
| Ex. 5 | A | A | A | A | AA | AA |
| Ex. 6 | A | A | A | A | AA | AA |
| Ex. 7 | A | A | A | A | AA | AA |
| Ex. 7B | A | A | A | A | AA | AA |
| Ex. 8 | A | A | A | A | AA | AA |
| Ex. 9 | A | A | A | A | AA | AA |
| Ex. 9B | A | A | A | A | AA | AA |
| Ex. 10 | A | A | A | A | AA | AA |
| Ex. 11 | A | A | A | A | AA | AA |
| Ex. 12 | A | A | A | A | AA | AA |
| Ex. 13 | A | A | A | A | AA | AA |
| Ex. 14 | A | A | A | A | AA | AA |
| Ex. 15 | A | A | A | A | AA | AA |
| Ex. 16 | A | A | A | A | AA | AA |
| Ex. 17 | A | A | A | A | AA | AA |
| Ex. 18 | A | A | A | A | AA | AA |
| Ex. 19 | A | A | A | A | AA | AA |
| Ex. 20 | A | A | A | A | AA | AA |
| Ex. 21 | A | A | A | A | AA | AA |
| Ex. 22 | A | A | A | A | AA | AA |
| Ex. 23 | A | A | A | A | AA | AA |
| Ex. 24 | A | A | A | A | AA | AA |
| Ex. 24B | A | A | A | A | AA | AA |
| Ex. 25 | A | A | A | A | AA | AA |
| Ex. 26 | A | A | A | A | AA | AA |
| Ex. 27 | A | A | A | A | AA | AA |
| Ex. 28 | A | A | A | A | AA | AA |
| Ex. 29 | A | A | A | A | AA | AA |
| Ex. 30 | A | A | A | A | AA | AA |
| Ex. 31 | A | A | A | A | AA | AA |
| Ex. 32 | A | A | A | A | AA | AA |

| | Evaluation 6 Color Developability | Evaluation 7 Abrasion Resistance | Evaluation 8 Water Resistance | Evaluation 9 Ejection Stability | Evaluation 10 Non-Clogging Reliability | Evaluation 11 White Blank | Evaluation 12 Gloss |
|---|---|---|---|---|---|---|---|
| Ex. 1 | — | B | A | A | A | A | C |
| Ex. 2 | — | B | A | A | A | A | C |
| Ex. 3 | — | B | A | A | A | A | C |
| Ex. 4 | — | B | A | A | A | A | C |
| Ex. 5 | A | B | A | A | A | A | C |

TABLE 9-continued

| | | | | | | | |
|---|---|---|---|---|---|---|---|
| Ex. 6 | A | B | A | A | A | A | C |
| Ex. 7 | A | A | A | A | A | A | B |
| Ex. 7B | A | A | A | A | A | A | B |
| Ex. 8 | — | A | A | A | A | A | B |
| Ex. 9 | — | A | A | A | A | A | B |
| Ex. 9B | — | A | A | A | A | A | B |
| Ex. 10 | — | B | A | A | A | A | C |
| Ex. 11 | — | B | A | A | A | A | C |
| Ex. 12 | A | B | A | A | A | A | C |
| Ex. 13 | A | B | A | A | A | A | C |
| Ex. 14 | A | A | A | A | A | A | B |
| Ex. 15 | A | A | A | A | A | A | B |
| Ex. 16 | — | A | A | A | A | A | B |
| Ex. 17 | A | A | A | A | A | A | B |
| Ex. 18 | A | B | A | A | A | A | C |
| Ex. 19 | A | B | A | A | A | A | C |
| Ex. 20 | A | A | A | A | A | A | B |
| Ex. 21 | A | A | A | A | A | A | B |
| Ex. 22 | A | B | A | A | A | A | C |
| Ex. 23 | A | B | A | A | A | A | C |
| Ex. 24 | A | A | A | A | A | A | B |
| Ex. 24B | A | A | A | A | A | A | B |
| Ex. 25 | — | A | A | A | A | A | B |
| Ex. 26 | — | A | A | A | A | A | B |
| Ex. 27 | A | A | A | A | A | A | B |
| Ex. 28 | A | A | A | A | A | A | B |
| Ex. 29 | A | A | A | A | A | A | B |
| Ex. 30 | — | A | A | A | A | A | B |
| Ex. 31 | A | B | A | A | A | A | B |
| Ex. 32 | A | A | A | A | A | A | A |

TABLE 10

| | Evaluation 1-1 Dispersibility 1 | Evaluation 1-2 Dispersibility 2 | Evaluation 2 Dispersion Stability | Evaluation 3 Settling Property | Evaluation 4 Print density | Evaluation 5 Print Quality |
|---|---|---|---|---|---|---|
| Comp. Ex. 1 | B | B | B | A | C | D |
| Comp. Ex. 2 | A | A | A | A | C | D |
| Comp. Ex. 3 | A | A | A | A | C | D |
| Comp. Ex. 4 | A | A | A | A | C | D |
| Comp. Ex. 5 | C | C | C | B | C | D |
| Comp. Ex. 6 | B | B | B | A | B | D |
| Comp. Ex. 7 | C | C | C | B | B | D |
| Comp. Ex. 8 | C | C | C | B | B | D |
| Comp. Ex. 9 | B | B | B | A | B | B |
| Comp. Ex. 10 | A | A | A | A | A | B |
| Comp. Ex. 11 | B | B | B | A | A | B |
| Comp. Ex. 12 | C | C | C | B | A | B |
| Comp. Ex. 13 | C | C | C | B | A | B |
| Comp. Ex. 14 | D | D | D | B | C | C |
| Comp. Ex. 15 | D | D | D | B | C | D |
| Comp. Ex. 16 | D | D | D | B | C | D |
| Comp. Ex. 17 | D | D | D | B | C | C |
| Comp. Ex. 18 | D | D | D | B | C | D |
| Comp. Ex. 19 | B | B | B | A | C | D |
| Comp. Ex. 20 | A | A | A | A | C | D |
| Comp. Ex. 21 | A | A | A | A | C | D |
| Comp. Ex. 22 | A | A | A | A | C | D |
| Comp. Ex. 23 | C | C | C | B | B | D |
| Comp. Ex. 24 | C | C | C | B | B | D |
| Comp. Ex. 25 | C | C | C | B | B | D |
| Comp. Ex. 26 | C | C | C | B | B | D |

| | Evaluation 6 Color Developability | Evaluation 7 Abrasion Resistance | Evaluation 8 Water Resistance | Evaluation 9 Ejection Stability | Evaluation 10 Non-Clogging Reliability | Evaluation 11 White Blank | Evaluation 12 Gloss |
|---|---|---|---|---|---|---|---|
| Comp. Ex. 1 | — | B | B | B | C | C | C |
| Comp. Ex. 2 | C | C | B | A | B | C | B |
| Comp. Ex. 3 | C | B | B | A | B | C | B |
| Comp. Ex. 4 | C | C | B | A | B | C | B |
| Comp. Ex. 5 | — | B | B | D | D | C | D |

TABLE 10-continued

| | | | | | | | |
|---|---|---|---|---|---|---|---|
| Comp. Ex. 6 | B | C | B | B | C | C | C |
| Comp. Ex. 7 | B | B | B | D | D | C | D |
| Comp. Ex. 8 | B | C | B | C | D | C | D |
| Comp. Ex. 9 | — | C | C | B | A | B | D |
| Comp. Ex. 10 | — | C | C | A | A | B | D |
| Comp. Ex. 11 | C | C | C | B | A | B | D |
| Comp. Ex. 12 | C | C | C | C | B | B | D |
| Comp. Ex. 13 | C | C | C | C | A | B | D |
| Comp. Ex. 14 | — | C | B | D | D | D | C |
| Comp. Ex. 15 | — | C | B | D | D | D | C |
| Comp. Ex. 16 | C | C | B | D | D | D | C |
| Comp. Ex. 17 | C | C | B | D | D | D | C |
| Comp. Ex. 18 | C | C | B | D | D | D | C |
| Comp. Ex. 19 | — | B | B | B | C | C | C |
| Comp. Ex. 20 | C | C | B | B | C | C | C |
| Comp. Ex. 21 | C | B | B | B | C | C | C |
| Comp. Ex. 22 | C | C | B | B | C | C | C |
| Comp. Ex. 23 | — | B | B | D | D | C | D |
| Comp. Ex. 24 | B | C | B | D | D | C | D |
| Comp. Ex. 25 | B | B | B | D | D | C | D |
| Comp. Ex. 26 | B | C | B | D | D | C | D |

As shown in Tables 9 and 10, the ink jet printing inks of Examples were proved superior in all the evaluated attributes.

The ink jet recording inks of Examples 1 to 30 containing the microencapsulated pigment of the invention and a solid wetting agent gave particularly satisfactory results in the test of non-clogging reliability.

The ink jet recording inks of Comparative Examples 14 to 18, in which the pigment is dispersed by a dispersant, are found insufficient in dispersibility, dispersion stability, print density, print quality, color developability, abrasion resistance, and ejection stability. The ink jet recording inks of Comparative Examples 2 to 4 and 20 to 22, which comprise a conventional microencapsulated pigment obtained by coating pigment particles that have not been treated with an anionic group-imparting agent with a polymer and which have a lower microencapsulated pigment content than the inks of Examples, are excellent in dispersion stability and ejection stability but fail to achieve sufficient print quality in terms of the evaluations on the resulting printed matters, i.e., print density, print quality, abrasion resistance, and color developability.

The ink jet recording inks of Comparative Examples 5 to 8 and 23 to 26, which comprise the conventional microencapsulated pigment as a colorant and has the same pigment content as the inks of Examples, are particularly inferior in dispersibility, dispersion stability, and ejection stability. The ink jet recording inks of Comparative Examples 9 to 11 and 13 containing pigment particles that have been treated with an anionic group-imparting agent are, while superior in dispersion stability and ejection stability, inferior in abrasion resistance.

Examples 31 and 32

Preparation of Ink Jet Printing Inks

Ink jet recording inks of Examples 31 and 32 were prepared according to the formulations shown in Table 11.

TABLE 11

| | | Example 31 | Example 32 |
|---|---|---|---|
| micro-encapsulated pigment | MCP14 | 8 | |
| | MCP15 | | 8 |
| Wetting agent | Glycerin | 12 | 13 |
| Penetrant | Diethylene glycol monobutyl ether | | 3 |
| | Triethylene glycol monobutyl ether | 4 | |
| | 1,2-Hexanediol | 3 | 2 |
| Solid wetting agent | Trimethylolpropane | 3 | 2 |
| | 1,2,8-hexanetriol | | 1 |
| Polar solvent | 2-Pyrrolidone | | 1 |
| Surfactant | Olfine E1010 | 1 | 1 |
| pH Adjuster | Potassium hydroxide | 0.1 | 0.1 |
| Antiseptic | Proxel XL-2 | 0.05 | 0.05 |
| Water | Ion-exchanged water | Balance | Balance |

Every amount added is expressed by wt %.
Microencapsulated pigment is expressed by concentration of solid matter.

Evaluation The ink jet recording inks of Examples 31 and 32 were evaluated according to the above Evaluations 1 to 12, and it was found that excellent ink jet recording inks were obtained as in Examples 1 to 30. The results were shown in Table 9.

Additionally, the viscosity of each of the inks prepared in Examples 31 and 32 and part of the above Comparative Examples was measured according to the following method. The results were shown in Table 12.

<Measurement of Viscosity>

Each of the ink jet recording inks prepared in Examples and Comparative Examples was set in a rheometer (Physica MCR300, manufactured by Paar Physica), and the viscosity (mPa·s) was measured using a corn/plate (CP 75-1 manufactured by Paar Physica) having a corn radius of 37.50 mm, a corn angle of 1° and a measuring gap of 0.05 mm at 20° C. at a shear rate of 20 sec$^{-1}$.

TABLE 12

| | Example 31 | Example 32 | Comparative Example 5 | Comparative Example 7 | Comparative Example 14 | Comparative Example 15 | Comparative Example 16 |
|---|---|---|---|---|---|---|---|
| Viscosity (mPa·s) | 2.50 | 2.80 | 6.00 | 5.50 | 8.00 | 7.50 | 6.80 |

| | Comparative Example 17 | Comparative Example 18 | Comparative Example 23 | Comparative Example 24 | Comparative Example 25 | Comparative Example 26 |
|---|---|---|---|---|---|---|
| Viscosity (mPa·s) | 7.20 | 6.50 | 5.80 | 5.70 | 5.70 | 5.90 |

From the above results, it is found that the viscosity of an ink jet recording ink can be remarkably lowered by purifying an aqueous dispersion containing a microencapsulated pigment.

While the invention has been described in detail and with reference to the specific embodiments thereof, it will be apparent to those skilled in the art that various changes and modifications can be made therein without departing from the spirit and the scope thereof.

This application is based on Japanese Patent Application Nos. 2002-287246 (filed Sep. 30, 2002), 2003-110787 (filed Apr. 5, 2003), 2003-307852 (filed Aug. 29, 2003) and 2003-335316 (filed Sep. 26, 2003), the contents thereof being herein incorporated by reference.

The invention claimed is:

1. A microencapsulated pigment comprising pigment particles having an anionic group on the surface thereof and being coated with a polymer, the polymer comprising a repeating structural unit derived from a cationically polymerizable surface active agent having a cationic group, a hydrophobic group and a polymerizable group and a repeating structural unit derived from an anionically polymerizable surface active agent having an anionic group, a hydrophobic group and a polymerizable group and optionally a hydrophilic monomer having an anionic group.

2. The microencapsulated pigment according to claim 1, wherein the polymer further comprises a repeating structural unit derived from a hydrophobic monomer.

3. The microencapsulated pigment according to claim 1, wherein the pigment constituting the pigment particles is carbon black or an organic pigment.

4. The microencapsulated pigment according to claim 1, wherein the anionic group on the surface of the pigment particles is a sulfonic acid anion group ($-SO_3^-$) and/or a sulfinic acid anion group $-RSO_2^-$: wherein R represents a $C_1$-$C_{12}$ alkyl group a phenyl group or a modified group of the alkyl or phenyl group.

5. The microencapsulated pigment according to claim 1, wherein the anionic group on the surface of the pigment particles is a carboxylic acid anion group ($-COO^-$).

6. The microencapsulated pigment according to claim 1, wherein the cationic group of the cationically polymerizable surface active agent is selected from the group consisting of a primary amine cation, a secondary amine cation, a tertiary amine cation, and a quaternary ammonium cation.

7. The microencapsulated pigment according to claim 1, wherein the hydrophobic group of the cationically polymerizable surface active agent is selected from the group consisting of an alkyl group, an aryl group, and a combined group thereof.

8. The microencapsulated pigment according to claim 1, wherein the polymerizable group of the cationically polymerizable surface active agent is a radically polymerizable unsaturated hydrocarbon group and is selected from the group consisting of a vinyl group, an allyl group, an acryloyl group, a methacryloyl group, a propenyl group, a vinylidene group, and a vinylene group.

9. An aqueous dispersion containing a microencapsulated pigment according to claim 1.

10. An ink jet recording ink comprising an aqueous dispersion according to claim 9.

11. The ink jet recording ink according to claim 10, which is produced by purification treatment of the aqueous dispersion, wherein the concentration of unreacted anionically polymerizable surface active agent and, if present, hydrophilic monomer having an anionic group after the purification treatment is 50,000 ppm or less based on the aqueous component in the aqueous dispersion.

12. The ink jet recording ink according to claim 10, which is produced by purification treatment of the aqueous dispersion, wherein the total concentration of unreacted anionically polymerizable surface active agent and, if present, hydrophilic monomer having an anionic group, and unreacted hydrophobic monomer after the purification treatment is 50,000 ppm or less based on the aqueous component in the aqueous dispersion.

13. The ink jet recording ink according to claim 10, which is produced by purification treatment of the aqueous dispersion, wherein the total concentration of unreacted cationically polymerizable surface active agent, unreacted anionically polymerizable surface active agent and, if present, hydrophilic monomer having an anionic group, and unreacted hydrophobic monomer after the purification treatment is 50,000 ppm or less based on the aqueous component in the aqueous dispersion.

14. The ink jet recording ink according to claim 13, wherein the total amount of unreacted cationically polymerizable surface active agent, unreacted anionically polymerizable surface active agent and, if present, hydrophilic monomer having an anionic group, and unreacted hydrophobic monomer before the purification treatment is 5 to 40% by weight based on the charged amount thereof.

15. The ink jet recording ink according to claim 10, further comprising polymer fine particles, wherein the polymer fine particles has an anionic group on the surface thereof, a glass transition temperature of 30° C. or lower, and a volume average particle size of 10 to 200 nm.

16. The ink jet recording ink according to claim 15, wherein the anionic group on the surface of the polymer fine particles is the same as the anionic group on the surface of the microencapsulated pigment.

17. The ink jet recording ink according to claim 15, wherein the polymer fine particles has such a reactivity with a bivalent metal salt that time required for decreasing the transmittance of a light having a wavelength of 700 nm to 50% of an initial value is $1\times10^4$ second or less when 3 parts by volume of a 0.1% by weight aqueous emulsion of the polymer fine particles is brought into contact with 1 part by volume of a 1 mol/l aqueous solution of the bivalent metal salt.

18. The ink jet recording ink according claim 10, further comprising a water-soluble organic solvent.

19. The ink jet recording ink according to claim 18, wherein the water-soluble organic solvent is a high-boiling water-soluble organic solvent having a boiling point of 180° C. or higher.

20. The ink jet recording ink according to claim 18, wherein the water-soluble organic solvent is glycerin.

21. The ink jet recording ink according to claim 18, wherein the water-soluble organic solvent is one or more compounds selected from the group consisting of an alkyl ether of a polyhydric alcohol and/or a 1,2-alkyldiol.

22. The ink jet recording ink according to claim 10, further comprising a solid wetting agent in an amount of 3 to 20% by weigh based on the total weight of the ink jet recording ink.

23. The ink jet recording ink according to claim 22, wherein the solid wetting agent is one or more compounds selected from the group consisting of trimethylolpropane, 1,2,6-hexanetriol, a saccharide, and a sugar alcohol.

24. An ink jet recording ink comprising at least a microencapsulated pigment according to claim 1 and water.

25. A microencapsulated pigment comprising pigment particles having an anionic group on the surface thereof and being coated with a polymer by polymerizing a cationically polymerizable surface active agent having a cationic group, a hydrophobic group and a polymerizable group with an anionically polymerizable surface active agent having an anionic group, a hydrophobic group and a polymerizable group and optionally a hydrophilic monomer having an anionic group in an aqueous dispersion in which the pigment particles are dispersed.

26. The microencapsulated pigment according to any one of claims 1 to 2, wherein the polymer further comprises a repeating structural unit derived from a crosslinkable monomer and/or a repeating structural unit derived from a monomer represented by the following general formula (1):

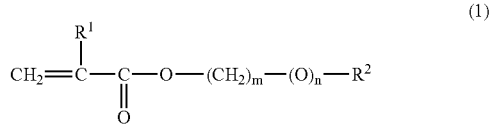

(1)

wherein $R^1$ represents a hydrogen atom or a methyl group, $R^2$ represents a t-butyl group, an alicyclic hydrocarbon group, an aromatic hydrocarbon group, or a heterocyclic group, m represents an integer of 0 to 3, and n represents an integer of 0 or 1.

27. A process for producing a microencapsulated pigment by coating pigment particles having an anionic group on the surface thereof with a polymer, which comprises:
 adding a cationically polymerizable surface active agent to an aqueous dispersion of the pigment particles having an anionic group on the surface thereof, followed by mixing;
 adding thereto an anionically polymerizable surface active agent and optionally a hydrophilic monomer having an anionic group to emulsify the mixture; and then
 adding thereto a polymerization initiator to carry out emulsion polymerization.

28. The process for producing a microencapsulated pigment according to claim 27, wherein the pigment constituting the pigment particles is carbon black or an organic pigment.

29. A process for producing a microencapsulated pigment by coating pigment particles having an anionic group on the surface thereof with a polymer, which comprises:
 adding a cationically polymerizable surface active agent to an aqueous dispersion of the pigment particles having an anionic group on the surface thereof, followed by mixing;
 adding thereto a hydrophobic monomer, followed by mixing;
 further adding thereto an anionically polymerizable surface active agent and optionally a hydrophilic monomer having an anionic group to emulsify the mixture; and then
 adding thereto a polymerization initiator to carry out emulsion polymerization.

30. The process for producing a microencapsulated pigment according to claim 29, comprising:
 a step of adding a cationically polymerizable surface active agent having a cationic group, a hydrophobic group and a polymerizable group to an aqueous dispersion of the pigment particles having an anionic group on the surface thereof, followed by mixing and treatment by irradiation with an ultrasonic wave;
 a step of adding a hydrophobic monomer, followed by mixing;
 a step of adding an anionically polymerizable surface active agent having an anionic group, a hydrophobic group and a polymerizable group and optionally the hydrophilic monomer having an anionic group, followed by mixing and treatment by irradiation with an ultrasonic wave; and
 a step of adding a polymerization initiator to carry out emulsion polymerization,
 wherein the process is carried out in the above order of the steps.

31. The process for producing a microencapsulated pigment according to claim 29, comprising:
 a step of adding a cationically polymerizable surface active agent having a cationic group, a hydrophobic group and a polymerizable group to an aqueous dispersion of the pigment particles having an anionic group on the surface thereof, followed by mixing and treatment by irradiation with an ultrasonic wave;
 a step of adding a hydrophobic monomer and a crosslinkable monomer and/or a monomer represented by general formula (1) shown below, followed by mixing;
 a step of adding an anionically polymerizable surface active agent having an anionic group, a hydrophobic group and a polymerizable group and optionally the hydrophilic monomer having an anionic group, followed by mixing and treatment by irradiation with an ultrasonic wave; and
 a step of adding a polymerization initiator to carry out emulsion polymerization,
 wherein the process is carried out in the above order of the steps:

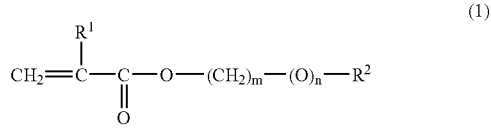

(1)

wherein $R^1$ represents a hydrogen atom or a methyl group, $R^2$ represents a t-butyl group, an alicyclic hydrocarbon group, an aromatic hydrocarbon group, or a heterocyclic group, m represents an integer of 0 to 3, and n represents an integer of 0 or 1.

* * * * *